US008716416B2

(12) United States Patent
Gu et al.

(10) Patent No.: US 8,716,416 B2
(45) Date of Patent: May 6, 2014

(54) MAGNESIUM-COMPOUND SUPPORTED NONMETALLOCENE CATALYST AND PREPARATION THEREOF

(75) Inventors: Yuefeng Gu, Nanjing (CN); Xiaoli Yao, Nanjing (CN); Chuanfeng Li, Nanjing (CN); Zhonglin Ma, Nanjing (CN); Feng Guo, Nanjing (CN); Bo Liu, Nanjing (CN); Yaming Wang, Nanjing (CN); Shaohui Chen, Nanjing (CN); Xiaoqiang Li, Nanjing (CN); Jiye Bai, Nanjing (CN)

(73) Assignee: Sinopec Yangzi Petrochemical Company Ltd., Nanjing, Jiangsu Province (CN)

( * ) Notice: Subject to any disclaimer, the term of this patent is extended or adjusted under 35 U.S.C. 154(b) by 233 days.

(21) Appl. No.: 12/671,654

(22) PCT Filed: Oct. 15, 2008

(86) PCT No.: PCT/CN2008/001739
§ 371 (c)(1),
(2), (4) Date: Apr. 8, 2010

(87) PCT Pub. No.: WO2009/052701
PCT Pub. Date: Apr. 30, 2009

(65) Prior Publication Data
US 2011/0237764 A1    Sep. 29, 2011

(30) Foreign Application Priority Data

Oct. 16, 2007   (CN) .......................... 2007 1 0162667
Oct. 16, 2007   (CN) .......................... 2007 1 0162676

(51) Int. Cl.
*C08F 4/50*   (2006.01)
(52) U.S. Cl.
USPC ..................................................... 526/124.3
(58) Field of Classification Search
USPC ..................................................... 526/124.3
See application file for complete search history.

(56) References Cited

U.S. PATENT DOCUMENTS

| | | | |
|---|---|---|---|
| 4,808,561 A | 2/1989 | Welborn, Jr. | |
| 4,871,705 A | 10/1989 | Hoel | |
| 5,122,492 A | 6/1992 | Albizzati et al. | |
| 5,240,894 A | 8/1993 | Burkhardt et al. | |
| 5,244,855 A | 9/1993 | Morini et al. | |
| 5,840,808 A | 11/1998 | Sugimura et al. | |
| 6,444,604 B1 | 9/2002 | Albizzati et al. | |
| 6,500,906 B1 * | 12/2002 | Kong et al. | 526/124.2 |
| 2008/0227936 A1 * | 9/2008 | Dai et al. | 526/124.3 |
| 2011/0152486 A1 | 6/2011 | Gu et al. | |

FOREIGN PATENT DOCUMENTS

| | | |
|---|---|---|
| CN | 1052681 | 7/1991 |
| CN | 1066274 | 11/1992 |
| CN | 1103069 | 5/1995 |
| CN | 1126480 | 7/1996 |
| CN | 1174849 | 3/1998 |
| CN | 1235166 | 11/1999 |
| CN | 1053673 | 6/2000 |
| CN | 1307594 | 8/2001 |
| CN | ZL01126323.7 | 1/2002 |
| CN | 1344749 | 4/2002 |
| CN | 1363537 | 8/2002 |
| CN | 1364817 | 8/2002 |
| CN | ZL02110844.7 | 8/2002 |
| CN | ZL02151294.9 | 6/2003 |
| CN | ZL01131136.3 | 8/2004 |
| CN | 1539855 | 10/2004 |
| CN | 1539856 | 10/2004 |
| CN | 1789290 | 6/2006 |
| CN | 1789291 | 6/2006 |
| CN | 1789292 | 6/2006 |
| CN | 1840549 | 10/2006 |
| CN | 1884253 | 12/2006 |
| CN | 200610026765.8 | 12/2006 |
| CN | 200610026766.2 | 12/2006 |
| CN | 200510119401.X | 5/2007 |
| CN | 200510080210.7 | 2/2009 |
| EP | 0206794 | 12/1986 |

(Continued)

OTHER PUBLICATIONS

Xiao, Yi-zhi et al. "Study on a novel $TiCl_4/Ni(acac)_2IL$ Supported Ligand Composite Catalyst in Ethylene Polymerization to Produce Branched Polyethylene", Zhongshan Daxue Xuebao: Natural Science Edition, 2003, 42(3):28.

(Continued)

*Primary Examiner* — Yong Chu
*Assistant Examiner* — Sonya Wright
(74) *Attorney, Agent, or Firm* — Fitch, Even, Tabin & Flannery, LLP

(57) ABSTRACT

The present invention relates to a magnesium compound-supported nonmetallocene catalyst, which is produced by directly contacting a catalytically active metallic compound with a nonmetallocene ligand-containing magnesium compound, or by directly contacting a nonmetallocene ligand with a catalytically active metal-containing magnesium compound, through an in-situ supporting process. The process is simple and flexible. In the process, there are many variables in response for adjusting the polymerization activity of the catalyst, and the margin for adjusting the catalyst load or the catalyst polymerization activity is broad. The magnesium compound-supported nonmetallocene catalyst according to this invention can be used for olefin homopolymerization/copolymerization, in combination with a comparatively less amount of the co-catalyst, to achieve a comparatively high polymerization activity. Further, the polymer product obtained therewith boasts high bulk density and adjustable molecular weight distribution.

28 Claims, No Drawings

(56) References Cited

FOREIGN PATENT DOCUMENTS

| | | |
|---|---|---|
| EP | 0260130 | 3/1988 |
| EP | 0434082 | 6/1991 |
| EP | 0435557 | 7/1991 |
| EP | 0506073 | 9/1992 |
| EP | 0685494 | 12/1995 |
| EP | 0708116 | 4/1996 |
| EP | 1229055 | 8/2002 |
| EP | 1829897 | 9/2007 |
| EP | 2039677 | 3/2009 |
| JP | 2000-273115 A | 10/2000 |
| JP | 2003-503589 A | 1/2003 |
| KR | 1020107003494 | 11/2003 |
| KR | 20040061490 | 7/2004 |
| WO | 01/00633 A1 | 1/2001 |
| WO | 03/010207 | 6/2003 |
| WO | 03/047751 | 6/2003 |
| WO | 03/047752 | 6/2003 |
| WO | WO 2005052010 A1 | 9/2005 |
| WO | 2006/063501 | 6/2006 |
| WO | 2007/134537 | 11/2007 |
| WO | 2009/052700 | 4/2009 |

OTHER PUBLICATIONS

Ochedzan-Siodlak, Wioletta et al. "Heterogeneous zirconocene catalyst on magnesium support $MgCl_2(THF)_3$ modified by $AlEt_2Cl$ for ethylene polymerization", European Polymer Journal, 2005, 41, 941 to 947.

Sun, Min et al., "In-site Synthesis of $CpTi(dbm)Cl_2/MgCl_2$ Catalyst and its Catalysis for Ethylene Polymerization", Acta Polymerica Sinica, 2009 (1) pp. 137-139.

Hungarian Search Report issued on Dec. 2, 2011, in Singapore Application No. 200906868-5.

European Search Report issued on Nov. 3, 2011, in European Patent Application No. 08842385.

Mingli Gao et al., Ethylene-Norbornene Copolymerization by New Titanium Complexes Bearing Tridentate Ligands. Sidearm Effects on Catalytic Activity, Macromolecular Rapid Communications, 2007, 28, 1511-1516.

Wei-Qiu Hu et al., Synthesis and Characterization of Novel Tridentate [NOP] Titanium Complexes and Their Application to Copolymerization and Polymerization of Ethylene, Organometallics 2004, 23, 1684-1688.

Gibson V C. and Spitzmesser S. K., "Advances in Non-Metallocene Olefin Polymerization Catalysis", Chem Rev 2003, 103, 283-315.

Britovsek, G. J. P., Gibson, V. C. and Wass, D. F. (1999), The Search for New-Generation Olefin Polymerization Catalysts: Life beyond Metallocenes. Angewandte Chemie International Edition, 38: 428-447.

Xiao Shijing and Yu Fusheng, "Olefin Coordination Polymerization Catalyst and Polyolefin", Beijing Industry University Press, Dec. 2002.

Huang qiang, Zhu Bochao, "Development in Olefin Polymerization Catalyst and Our Strategy in this Regard", Petrochemical Technology, 2001, vol. 30 supplement, 454-459.

Korean Intellectual Property Office Notification for Reasons for Rejection re Application No. 10-2010-7003494 dated May 22, 2012.

European Search Report issued on Jul. 6, 2012 in European Patent Application EP08841802.5.

Hungarian Intellectual Property Office Search Report issued Dec. 16, 2011, for Singapore Application No. 201000759-9.

Japan Patent Office Official Action mailed Jun. 18, 2013 for Japanese Patent Application No. 2010-529215 (6 pages), and informal partial English translation (1 page).

* cited by examiner

MAGNESIUM-COMPOUND SUPPORTED NONMETALLOCENE CATALYST AND PREPARATION THEREOF This is a National Phase application of International application PCT/CN2008/001739, filed Oct. 15, 2008, claiming priority to Chinese patent applications No. 200710162667.1, filed Oct. 16, 2007, and No. 200710162676.0, filed Oct. 16, 2007, the contents of which are fully incorporated by reference herein.

TECHNICAL FIELD

The present invention relates to a supported nonmetallocene catalyst for olefin polymerization. Specifically, this invention relates to a magnesium compound-supported nonmetallocene catalyst, which is produced by directly contacting a catalytically active metallic compound with a nonmetallocene ligand-containing magnesium compound, or by directly contacting a nonmetallocene ligand with a catalytically active metal-containing magnesium compound, through an in-situ supporting process. The magnesium compound-supported nonmetallocene catalyst according to this invention can be used for olefin homopolymerization/copolymerization, when in combination with such a co-catalyst as an aluminoxane or an alkylaluminum.

BACKGROUND ART

The nonmetallocene catalyst, also called as the post-metallocene catalyst, was discovered in middle and late 1990's, whose central atom involves nearly all of the transition metal elements. The nonmetallocene catalyst is comparative to, or exceeds, the metallocene catalyst in some aspects of the performance, and has been classified as the fourth generation catalyst for olefin polymerization, following the Ziegler catalyst, the Ziegler-Natta catalyst and the metallocene catalyst. Polyolefin products produced with such catalysts exhibit favorable properties and boast low production cost. The coordination atom of the nonmetallocene catalyst comprises oxygen, nitrogen, sulfur and phosphor, without containing a cyclopentadiene group or a derivative thereof (for example, an indene group or a fluorene group). The nonmetallocene catalyst is wherein its central atom shows comparatively strong electrophilicity and has a cis alkyl metal type or a metal halide type central structure, which facilitates olefin insertion and σ-bond transfer. Therefore, the central atom is easily subject to alkylation, and therefore facilitates formation of a cationic active center. The thus formed complex has a restricted geometrical configuration, and is stereoselective, electronegative and chiral adjustable. Further, the formed metal-carbon bond is easy to be polarized, which further facilitates homopolymerization and copolymerization of an olefin. For these reasons, it is possible to obtain an olefin polymer having a comparatively high molecular weight, even under a comparatively high polymerization temperature.

However, it is known that in the olefin polymerization, the homogeneous phase catalyst suffers from such problems as short service life, fouling, high consumption of methyl aluminoxane, and undesirably low or high molecular weight in the polymer product, and thus only finds limited use in the solution polymerization process or the high-pressure polymerization process, which hinders its wider application in industry.

Chinese patent Nos. ZL01126323.7, ZL02151294.9 and ZL02110844.7, and WO03/010207 disclose a catalyst or catalyst system finding a broad application in olefin polymerization, and suitable for many forms of polymerization process. However, the catalyst or catalyst system should be accompanied by a comparatively high amount of co-catalysts, to achieve an acceptable olefin polymerization activity. Further, the catalyst or catalyst system suffers from such a problem as fouling.

A conventional way is to have the nonmetallocene catalyst supported. By supporting, It is possible to avoid deactivation of the dual molecular in the homogeneous phase nonmetallocene catalyst, whereby improving the performance of the catalyst in the polymerization and the particle morphology of the polymer products. This is reflected by, moderate reduction of the initial activity of the catalyst, elongation of the serve life of the catalyst, alleviation or elimination of caking or flash reaction during the polymerization, improvement of the polymer morphology, and increase of the apparent density of the polymer, thus extending its use to other polymerization processes, for example, the gas phase polymerization or the slurry polymerization.

Aiming at the catalysts of the Chinese patent Nos. ZL01126323.7, ZL02151294.9 and ZL02110844.7, and WO03/010207, Chinese patent application Laid-Open Nos. CN1539855A, CN1539856A, CN1789291A, CN1789292A and CN1789290A, and WO2006/063501 and Chinese patent application No. 200510119401.x provide several ways to support same on a carrier so as to obtain a supported nonmetallocene catalyst. However, each of these applications relates to the technology of supporting a transition metal-containing nonmetallocene organic compound (or referred as a nonmetallocene catalyst, or a nonmetallocene complex) on a treated carrier. However, the bonding between the nonmetallocene catalyst and the carrier is rather limited, or the load of the nonmetallocene catalyst on the carrier is rather low.

Most of the prior art olefin polymerization catalysts are metallocene catalyst-based, for example, those according to U.S. Pat. No. 4,808,561 and U.S. Pat. No. 5,240,894, Chinese patent application Laid-Open Nos. CN1049439, CN1136239, CN1344749, CN1126480, CN1053673, CN1307594, CN1130932, CN1103069, CN1363537 and CN1060179, U.S. Pat. No. 574,417, EP 685494, U.S. Pat. No. 4,871,705 and EP0206794. Again, all of these applications relate to the technology of supporting a transition metal-containing metallocene catalyst on a treated carrier.

EP708116 discloses a process comprising treating gasified ZrCl4 with a carrier at a temperature ranging from 160° C. to 450° C. to support thereon, then reacting the supported ZrCl4 with the Li-salt of a ligand to obtain a supported metallocene catalyst, which is finally used for olefin polymerization in combination with a co-catalyst. The process is rather undesirable since the supporting procedure should be conducted at a high reaction temperature and under a high vacuum.

Chinese application patent No. ZL01131136.3 discloses a process for producing a supported metallocene catalyst, which comprises mixing a carrier with a Group IVB transition metal halide in a solvent under the normal pressure, then directly reacting with the cation ion of a ligand, so as to integrate synthesis and supporting of the metallocene catalyst in one step. However, according to this process, the transition metal and the ligand is used at a molar ratio of 1:1, and a proton acceptor (for example, butyl lithium) is required. Further, the ligand to be used is a bridged or non-bridged metallocene ligand containing a cyclopentadiene group.

According to Xiao's article "Study on a novel Ni(acac)$_2$/ TiCl4/L ligand composite catalyst in ethylene polymerization to produce branched polyethylene" (Zhongshan Daxue Xuebao: Natural Science Edition, 2003, 42(3):28), anhydrous MgCl2, Ni(acac)$_2$ and L are dissolved in a mixed solvent of tetrahydrofuran and ethanol, then silica gel is added thereto under stirring. Further, a determined amount of TiCl4 is added thereto to react for a predetermined duration. Then, a predetermined amount of Et$_2$AlCl is added thereto to react for another predetermined duration. Finally, the resultant is dried by suction to obtain a composite catalyst comprising MgCl2-silica as the carrier and an α-diimine ligand L-modified Ni(acac)2/TiCl4 supported thereon. By using said catalyst in ethylene homopolymerization, branched polyethylene can be obtained. Specifically, in case of the ligand L2, branched polyethylene having a branch degree of 4 to 12 branched chains/1000 C can be obtained.

By using a supported nonmetallocene catalyst comprising silica gel as the carrier or as a component of the carrier, a polymer product having desirable particle morphology and controlled polymer particle size distribution can be obtained. However, the thus obtained catalyst suffers from comparatively low polymerization activity. Further, since the ash contains silica gel, the polymer thus obtained finds only restricted application.

According to EUROPEAN POLYMER JOURNAL, 2005, 41, 941 to 947, a supported metallocene catalyst can be obtained by treating MgCl2(THF)2 with chloro ethyl aluminum, and supporting zirconocene dichloride thereon. Specifically, MgCl2 is dissolved in tetrahydrofuran, after precipitated by hexane and washed, the thus obtained solid is treated by chloro ethyl aluminum, and then supported with zirconocene dichloride.

According to Sun's article "Study of an in-situ process for preparing CpTi(dbm)Cl2/MgCl2 type catalyst and its use for catalyzing ethylene polymerization" (Gaofenzi Xuebao, 2004, (1):138), magnesium chloride (as the carrier) is prepared by the Grignard reagent process, and at the same time, CpTi(dbm)Cl2 is added thereto, so as to produce said CpTi(dbm)Cl2/MgCl2 type catalyst. According to said article, alkylation and supporting of the catalyst is conducted in one single step, and therefore the number of the steps for preparing the catalyst can be significantly reduced.

Chinese patent No. ZL200510080210.7 discloses a process for in-situ producing a supported vanadium-based nonmetallocene catalyst for olefin polymerization and use thereof, which comprises reacting dialkyl magnesium with acyl naphthol or a β-dione to form magnesium acyl naphthol or magnesium β-dione compound, then reacting with a chloride of vanadium (IV), so as to form the carrier and the active catalytic component simultaneously.

Chinese patent No. ZL200610026765.8 discloses a single site Zeigler-Natta catalyst for olefin polymerization. In this catalyst, a coordination group-containing salicylaldehyde or substituted salicylaldehyde derivative is used as the electron donor. The catalyst is produced by introducing a pre-treated carrier (for example, silica), a metallic compound (for example, TiCl4) and the electron donor into a magnesium compound (for example, MgCl2)/tetrahydrofuran solution and then post-treating the resultant.

Chinese patent No. ZL200610026766.2 is similar to this patent, and relates to an organic compound containing a hetero atom and use thereof for producing a Zeigler-Natta catalyst.

As can be seen from aforesaid, the prior art supported nonmetallocene catalyst suffers from low olefin polymerization activity, and there is no an easy way to adjust same. If one tries to increase the activity, he has to significantly increase the amount of the co-catalyst to be used. Further, the prior art catalyst contains such carrier as silica gel for supporting, and therefore the polymer obtained therewith contains brittle ash remains resulted from the silica gel. For this reason, the polymer finds only limited application in practice. Still further, the polymer product (for example, polyethylene) produced by using the prior art catalyst suffers from low polymer bulk density.

Therefore, there still exists a need for a supported nonmetallocene catalyst, which can be produced in a simple way and in an industrial scale, free of the problems associated with the prior art catalyst.

SUMMARY OF THE INVENTION

Therefore, an object of the present invention is to provide a magnesium compound-supported nonmetallocene catalyst on the basis of the prior art, which is produced by directly contacting a catalytically active metallic compound with a nonmetallocene ligand-containing magnesium compound, or by directly contacting a nonmetallocene ligand with a catalytically active metal compound-containing magnesium compound, through an in-situ supporting process. During its preparation, no proton acceptor and electron donor are needed, without the need of severe reaction requirements and reaction conditions. For these reasons, the magnesium compound-supported nonmetallocene catalyst according to this invention is easy to be produced and suitable for production in an industrial scale.

Specifically, this invention relates to a process for producing a magnesium compound-supported nonmetallocene catalyst, which comprises:

a contacting step of contacting a magnesium compound with one of the two: a chemical treating agent and a nonmetallocene ligand, to obtain a contact resultant, wherein the chemical treating agent is selected from the group consisting of a Group IVB metal compound; and a treating step of treating the contact resultant with the other of the two: the chemical treating agent and the nonmetallocene ligand, so as to obtain the magnesium compound-supported nonmetallocene catalyst.

According to a preferred embodiment of this invention, the nonmetallocene ligand is selected from the group consisting of a compound having the following structure.

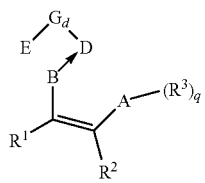

wherein:

q is 0 or 1;

d is 0 or 1;

A is selected from the group consisting of an oxygen atom, a sulfur atom, a selenium atom,

—NR$^{23}$R$^{24}$, —N(O)R$^{25}$R$^{26}$,

—PR$^{28}$R$^{29}$, —P(O)R$^{30}$OR$^{31}$, a sulfone group, a sulfoxide group and —Se(O)R$^{39}$;

B is selected from the group consisting of a nitrogen-containing group, a phosphor-containing group, and a C$_1$-C$_{30}$ hydrocarbyl;

D is selected from the group consisting of an oxygen atom, a sulfur atom, a selenium atom, a nitrogen-containing C$_1$-C$_{30}$ hydrocarbyl, a phosphor-containing C$_1$-C$_{10}$ hydrocarbyl, a sulfone group, a sulfoxide group,

—N(O)R$^{25}$R$^{26}$,

and —P(O)R$^{32}$(OR$^{33}$), wherein N, O, S, Se, and P each represent a coordination atom;

E is selected from the group consisting of a nitrogen-containing group, an oxygen-containing group, a sulfur-containing group, a selenium-containing group and a phosphor-containing group, wherein N, O, S, Se and P each represent a coordination atom;

G is selected from the group consisting of a C$_1$-C$_{30}$ hydrocarbyl, a substituted C$_1$-C$_{30}$ hydrocarbyl and an inert functional group;

→ represents a single bond or a double bond;

— represents a covalent bond or an ionic bond;

R$^1$ to R$^3$, R$^{22}$ to R$^{33}$, and R$^{39}$ are each independently selected from the group consisting of hydrogen, a C$_1$-C$_{30}$ hydrocarbyl, a halogen atom, a substituted C$_1$-C$_{30}$ hydrocarbyl and an inert functional group, wherein these groups could be identical to or different with each other, and any adjacent groups could form a bond or a ring altogether.

According to this invention, the nonmetallocene ligand is preferably selected from the group consisting of the following compounds.

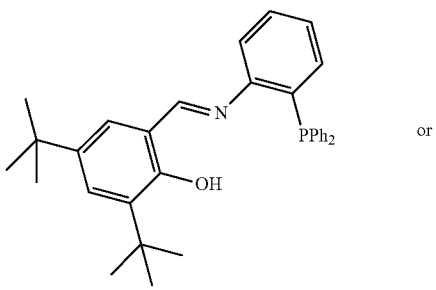

or

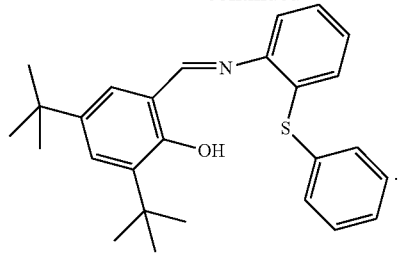

This invention further relates to a magnesium compound-supported nonmetallocene catalyst thus produced.

Effect of the Invention

The process for producing the magnesium compound-supported nonmetallocene catalyst according to this invention is simple and feasible, and it is easy to adjust the load of the nonmetallocene ligand on the magnesium compound, and therefore it is possible to significantly increase the load, leading to a significantly increased polymerization activity of the thus obtained catalyst.

Further, by using different amounts of the chemical treating agent and/or different amounts of the pre-treating agent (detailed hereinafter), it is possible to freely adjust the polymerization activity of the obtained supported nonmetallocene catalyst as needed, from low to high, thereby adapting same for different olefin polymerization requirements. For this reason, the process according to this invention is characterized by high process flexibility and high process controllability.

When a catalyst system is constituted by using the supported nonmetallocene catalyst according to this invention in combination with a co-catalyst (for example, methyl aluminoxane or triethyl aluminum), only a comparatively small amount of the co-catalyst is needed to achieve a comparatively high polymerization activity. Further, the supported nonmetallocene catalyst according to this invention boasts significant copolymerization effect.

When a catalyst system is constituted by using the supported nonmetallocene catalyst according to this invention in combination with a co-catalyst for olefin homopolymerization/copolymerization, the polymer product thus obtained boasts high polymer bulk density and freely adjustable molecular weight distribution.

DETAILED DESCRIPTION OF THE INVENTION

In the first place, this invention relates to a process for producing a magnesium compound-supported nonmetallocene catalyst, which comprises:

a contacting step of contacting a magnesium compound with one of the two: a chemical treating agent and a nonmetallocene ligand, to obtain a contact resultant, wherein the chemical treating agent is selected from the group consisting of a Group IVB metal compound; and a treating step of treating the contact resultant with the other of the two: the chemical treating agent and the nonmetallocene ligand, so as to obtain the magnesium compound-supported nonmetallocene catalyst.

The magnesium compound is used as the carrier of the supported nonmetallocene catalyst according to this invention, which is selected from the group consisting of a magnesium halide, an alkoxy magnesium halide, an alkoxy magnesium, an alkyl magnesium, an alkyl magnesium halide, an alkyl alkoxy magnesium or a mixture thereof.

Specifically, the magnesium halide for example, could be selected from the group consisting of magnesium chloride ($MgCl_2$), magnesium bromide ($MgBr_2$), magnesium iodide ($MgI_2$) and magnesium fluoride ($MgF_2$), etc., preferably magnesium chloride.

The alkoxy magnesium halide for example, could be selected from the group consisting of methoxy magnesium chloride ($Mg(OCH_3)Cl$), ethoxy magnesium chloride ($Mg(OC_2H_5)Cl$), propoxy magnesium chloride ($Mg(OC_3H_7)Cl$), n-butoxy magnesium chloride ($Mg(OC_4H_9)Cl$), isobutoxy magnesium chloride ($Mg(i-OC_4H_9)Cl$), methoxy magnesium bromide ($Mg(OCH_3)Br$), ethoxy magnesium bromide ($Mg(OC_2H_5)Br$), propoxy magnesium bromide ($Mg(OC_3H_7)Br$), n-butoxy magnesium bromide ($Mg(OC_4H_9)Br$), isobutoxy magnesium bromide ($Mg(i-OC_4H_9)Br$), methoxy magnesium iodide ($Mg(OCH_3)I$), ethoxy magnesium iodide ($Mg(OC_2H_5)I$), propoxy magnesium iodide ($Mg(OC_3H_7)I$), n-butoxy magnesium iodide ($Mg(OC_4H_9)I$) and isobutoxy magnesium iodide ($Mg(i-OC_4H_9)I$), etc., preferably methoxy magnesium chloride, ethoxy magnesium chloride and isobutoxy magnesium chloride.

The alkoxy magnesium for example, could be selected from the group consisting of methoxy magnesium ($Mg(OCH_3)_2$), ethoxy magnesium ($Mg(OC_2H_5)_2$), propoxy magnesium ($Mg(OC_3H_7)_2$), butoxy magnesium ($Mg(OC_4H_9)_2$), isobutoxy magnesium ($Mg(i-OC_4H_9)_2$) and 2-ethyl hexyloxy magnesium ($Mg(OCH_2CH(C_2H_5)C_4H_9)_2$), etc., preferably ethoxy magnesium and isobutoxy magnesium.

The alkyl magnesium for example, could be selected from the group consisting of methyl magnesium ($Mg(CH_3)_2$), ethyl magnesium ($Mg(C_2H_5)_2$), propyl magnesium ($Mg(C_3H_7)_2$), n-butyl magnesium ($Mg(C_4H_9)_2$) and isobutyl magnesium ($Mg(i-C_4H_9)_2$), etc., preferably ethyl magnesium and n-butyl magnesium.

The alkyl magnesium halide for example, could be selected from the group consisting of methyl magnesium chloride ($Mg(CH_3)Cl$), ethyl magnesium chloride ($Mg(C_2H_5)Cl$), propyl magnesium chloride ($Mg(C_3H_7)Cl$), n-butyl magnesium chloride ($Mg(C_4H_9)Cl$), isobutyl magnesium chloride ($Mg(i-C_4H_9)Cl$), methyl magnesium bromide ($Mg(CH_3)Br$), ethyl magnesium bromide ($Mg(C_2H_5)Br$), propyl magnesium bromide ($Mg(C_3H_7)Br$), n-butyl magnesium bromide ($Mg(C_4H_9)Br$), isobutyl magnesium bromide ($Mg(i-C_4H_9)Br$), methyl magnesium iodide ($Mg(CH_3)I$), ethyl magnesium iodide ($Mg(C_2H_5)I$), propyl magnesium iodide ($Mg(C_3H_7)I$), n-butyl magnesium iodide ($Mg(C_4H_9)I$) and isobutyl magnesium iodide ($Mg(i-C_4H_9)I$), etc., preferably methyl magnesium chloride, ethyl magnesium chloride and isobutyl magnesium chloride.

The alkyl alkoxy magnesium for example, could be selected from the group consisting of methyl methoxy magnesium ($Mg(OCH_3)(CH_3)$), methyl ethoxy magnesium ($Mg(OC_2H_5)(CH_3)$), methyl propoxy magnesium ($Mg(OC_3H_7)(CH_3)$), methyl n-butoxy magnesium ($Mg(OC_4H_9)(CH_3)$), methyl isobutoxy magnesium ($Mg(i-OC_4H_9)(CH_3)$), ethyl methoxy magnesium ($Mg(OCH_3)(C_2H_5)$), ethyl ethoxy magnesium ($Mg(OC_2H_5)(C_2H_5)$), ethyl propoxy magnesium ($Mg(OC_3H_7)(C_2H_5)$), ethyl n-butoxy magnesium ($Mg(OC_4H_9)(C_2H_5)$), ethyl isobutoxy magnesium ($Mg(i-OC_4H_9)(C_2H_5)$), propyl methoxy magnesium ($Mg(OCH_3)(C_3H_7)$), propyl ethoxy magnesium ($Mg(OC_2H_5)(C_3H_7)$), propyl propoxy magnesium ($Mg(OC_3H_7)(C_3H_7)$), propyl n-butoxy magnesium ($Mg(OC_4H_9)(C_3H_7)$), propyl isobutoxy magnesium ($Mg(i-OC_4H_9)(C_3H_7)$), n-butyl methoxy magnesium ($Mg(OCH_3)(C_4H_9)$), n-butyl ethoxy magnesium ($Mg(OC_2H_5)(C_4H_9)$), n-butyl propoxy magnesium ($Mg(OC_3H_7)(C_4H_9)$), n-butyl n-butoxy magnesium ($Mg(OC_4H_9)(C_4H_9)$), n-butyl isobutoxy magnesium ($Mg(i-OC_4H_9)(C_4H_9)$), isobutyl methoxy magnesium ($Mg(OCH_3)(i-C_4H_9)$), isobutyl ethoxy magnesium ($Mg(OC_2H_5)(i-C_4H_9)$), isobutyl propoxy magnesium ($Mg(OC_3H_7)(i-C_4H_9)$), isobutyl n-butoxy magnesium ($Mg(OC_4H_9)(i-C_4H_9)$) and isobutyl isobutoxy magnesium ($Mg(i-OC_4H_9)(i-C_4H_9)$), etc., preferably butyl ethoxy magnesium.

The magnesium compounds could be used with one kind or as a mixture of two or more kinds, without any limitation thereto. For example, if more than one magnesium compounds are used as a mixture, ratio by molar of one magnesium compound to another magnesium compound in the mixture could be, for example, 0.25 to 4, preferably 0.5 to 3, most preferably 1 to 2.

According to one preferred embodiment, the magnesium compound to be used with this invention could be a modified magnesium compound, which could be produced by, for example, introducing a precipitating agent into a solution of said magnesium compound in a mixed solvent of tetrahydrofuran and an alcohol to precipitate same. After precipitation, the solid is separated by a solid-liquid separation process (for example, filtration), so as to obtain the modified magnesium compound.

Specifically, the magnesium compound is added to tetrahydrofuran, then the alcohol is added thereto. The resultant is heated to a temperature ranging from 20 to a temperature 5 below the boiling point of the mixed solvent of tetrahydrofuran and the alcohol under stirring for a duration sufficient for the magnesium compound to completely dissolve, so as to obtain a magnesium compound solution. Then, the precipitating agent is added to the solution to precipitate same. After filtration, washing and drying, the modified magnesium compound is obtained.

The duration for dissolving the magnesium compound in preparation of the modified magnesium compound is not specifically limited, usually 0.5 to 24 hours. It is known that in case the dissolution is conducted at a comparatively low temperature, a comparatively long duration should be required, and in case the dissolution is conducted at a comparatively high temperature, a comparatively short duration should be required. During preparation of the modified magnesium compound, any stirring means could be used to facilitate dissolution of the magnesium compound in the mixed solvent and uniform dispersion of the precipitating agent throughout the magnesium compound solution, and eventually facilitate precipitation of the solid. The stirring means could be in any form, for example, as a stirring paddle, whose rotational speed could be 10 to 1000 r/min.

In the process for preparing the modified magnesium compound, the alcohol to be used could be one or more selected from the group consisting of an aliphatic alcohol, an aromatic alcohol and an alicyclic alcohol, wherein the alcohol could be optionally substituted by a substituent selected from the group consisting of an alkyl group, a halogen atom and an alkoxy group. The aliphatic alcohol is preferred.

For example, the aliphatic alcohol could be selected from the group consisting of methanol, ethanol, propanol, 2-propanol, butanol, pentanol, 2-methyl pentanol, 2-ethyl pentanol, 2-hexyl butanol, hexanol, 2-ethyl hexanol and the like, preferably ethanol, butanol and 2-ethyl hexanol. The aromatic alcohol could be selected from the group consisting of benzyl alcohol, benzene ethanol and methyl benzyl alcohol and the like, preferably phenyl ethanol. The alicyclic alcohol could be selected from the group consisting of cyclo hexanol, cyclo pentanol and cyclo octanol and the like, preferably cyclo hexanol. The alkyl-substituted alcohol could be for example, methyl cyclo pentanol, ethyl cyclo pentanol, propyl cyclo pentanol, methyl cyclo hexanol, ethyl cyclo hexanol, propyl cyclo hexanol, methyl cyclo octanol, ethyl cyclo octanol and propyl cyclo octanol and the like, preferably methyl hexanol. The halogen atom-substituted alcohol could be for example, trichloro methanol, trichloro ethanol and trichloro hexanol and the like, preferably trichloro methanol. The alkoxy-substituted alcohol could be for example, ethylene glycol ethyl ether, ethylene glycol n-butyl ether and 1-butoxy-2-propanol and the like, preferably ethylene glycol ethyl ether. Among these alcohols, ethanol and butanol are more preferred.

The alcohols could be used with one kind or as a mixture of two or more kinds.

In preparation of the magnesium compound solution, ratio by molar of the magnesium compound (based on Mg) to tetrahydrofuran could be 1 to 5-100, preferably 1 to 10-30, while ratio by molar of the magnesium compound (based on Mg) to the alcohol could be 1 to 0.5-20, preferably 1 to 1-8.

In preparation of said modified magnesium compound, the precipitating agent to be used could be any one that represents a bad solvent for the magnesium compound and a good solvent for the mixed solvent, which could be selected from the group consisting of one or more of an alkane, a cyclic alkane, a halogenated alkane and a halogenated cyclic alkane.

As the alkane, exemplified is pentane, hexane, heptane, octane, nonane and decane, and the like, preferably hexane, heptane and decane, most preferably hexane.

As the cyclic alkane, exemplified is cyclohexane, cyclo pentane, cyclo heptane, cyclo decane, cyclo nonane, and the like, preferably cyclo hexane.

As the halogenated alkane, exemplified is dichloro methane, dichloro hexane, dichloro heptane, trichloro methane, trichloro ethane, trichloro butane, dibromo methane, dibromo ethane, dibromo heptane, tribromo methane, tribromo ethane, tribromo butane, and the like.

As the halogenated cyclic alkane, exemplified is chlorinated cyclo hexane, chlorinated cyclo pentane, chlorinated cyclo heptane, chlorinated cyclo decane, chlorinated cyclo nonane, chlorinated cyclo octane, brominated cyclo hexane, brominated cyclo pentane, brominated cyclo heptane, brominated cyclo decane, brominated cyclo nonane, brominated cyclo octane, and the like.

The precipitating agent could be used with one kind or as a mixture of two or more kinds.

There is no limitation as to the amount of the precipitating agent to be used, however, ratio by volume of the precipitating agent to tetrahydrofuran is usually 1 to 0.5-6, preferably 1 to 1-4.

There is no limitation as to the temperature at which the precipitating agent is, however, preferably at the room temperature. Further, the precipitation is preferably conducted after the magnesium compound solution has cooled down to the room temperature.

Further, there is no special limitation to the aforesaid filtration, washing and drying of the resultant modified magnesium compound (the resultant precipitate), which could be determined by a person skilled in the art as needed.

The magnesium compound according to this invention (the term "magnesium compound" hereinafter refers to the magnesium compound as such and the modified magnesium compound) could be used directly for conducting the contacting step, however, in a preferred embodiment, prior to the contacting step, the magnesium compound could be pre-treated by an pre-treating agent selected from the group consisting of an aluminoxane, an alkylaluminum, or a combination thereof (hereinafter referred as the pre-treating step).

In the context of this invention, the term "magnesium compound as such" refers to a magnesium compound that has not been subjected to any treatment mentioned in this invention.

As the aluminoxane, exemplified is a linear aluminoxane $R_2$—Al—(Al(R)—O)$_n$—O—AlR$_2$ having the following formula (I), and a cyclic aluminoxane (Al(R)—O—)$_{n+2}$ having the following formula (II).

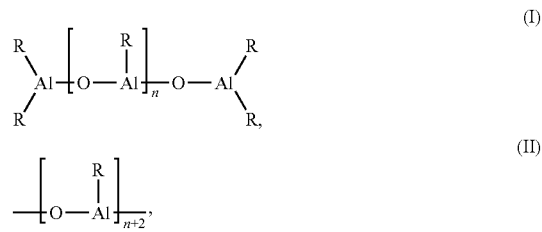

wherein R is each independently identical or different, preferably identical, and could be each independently selected from the group consisting of a $C_1$-$C_8$ alkyl, preferably methyl, ethyl, and isobutyl, most preferably methyl, n is an integer of 1 to 50, preferably 10 to 30.

Specifically, the aluminoxane could be preferably selected from the group consisting of methyl aluminoxane, ethyl aluminoxane, isobutyl aluminoxane and butyl aluminoxane, preferably methyl aluminoxane (MAO) and isobutyl aluminoxane (IBAO).

The aluminoxane could be used with one kind or as a mixture of two or more kinds.

The alkylaluminum is a compound having a general formula (III) as follows:

$$Al(R)_3 \qquad (III)$$

wherein R could be each independently identical or different, preferably identical, and could be each independently selected from the group consisting of a $C_1$-$C_8$ alkyl, preferably methyl, ethyl and isobutyl, most preferably methyl.

Specifically, the alkylaluminum could be selected from the group consisting of trimethyl aluminum (Al(CH$_3$)$_3$), triethyl aluminum (Al(CH$_3$CH$_2$)$_3$), tripropyl aluminum (Al(C$_3$H$_7$)$_3$), triisobutyl aluminum (Al(i-C$_4$H$_9$)$_3$), tri-n-butyl aluminum (Al(C$_4$H$_9$)$_3$), triisoamyl aluminum (Al(i-C$_5$H$_{11}$)$_3$), tri-n-amyl aluminum (Al(C$_5$H$_{11}$)$_3$), trihexyl aluminum (Al(C$_6$H$_{13}$)$_3$), tri-iso-hexyl aluminum (Al(i-C$_6$H$_{13}$)$_3$), diethyl methyl aluminum (Al(CH$_3$)(CH$_3$CH$_2$)$_2$) and ethyl dimethyl aluminum (Al(CH$_3$CH$_2$)(CH$_3$)$_2$), and the like, wherein preference is given to trimethyl aluminum, triethyl aluminum, triisobutyl aluminum and tripropyl aluminum, most preferably triethyl aluminum and triisobutyl aluminum.

The alkylaluminum could be used with one kind or as a mixture of two or more kinds.

According to this invention, as the pre-treating agent, used could be only the alkylaluminum or only the aluminoxane, or a mixture of the alkylaluminum and the aluminoxane. There is no limitation as to the ratio of the alkylaluminum and/or the aluminoxane in the combination, which could be determined by a person skilled in the art as needed.

In the pre-treating step according to this invention, ratio by molar of the magnesium compound (based on Mg) to the pre-treating agent (based on Al) could be 1:0.5-8, preferably 1:0.5-4, more preferably 1:1-4, and most preferably 1:1-2.

To conduct said pre-treating step, any process could be used, for example, as follows.

Firstly, a solution of said pre-treating agent in a solvent is prepared, then a predetermined amount of the solution (containing a predetermined amount of the pre-treating agent) is added to the magnesium compound at a temperature ranging from the room temperature to one below the boiling point of the solvent in the solution. The reaction continues for 0.5 to 6 hours (accompanied by any stirring means, if necessary), a mixture mass containing the pre-treated magnesium compound is obtained. The pre-treated magnesium compound could be separated from the thus obtained mixture mass by filtration and washing (1 to 6 times, preferably 1 to 3 times) for further use, and preferably eventually by drying, however, it is also acceptable to directly use the mixture mass in the next procedure (for example, the contacting step) without separation of the pre-treated magnesium compound therefrom.

To prepare the solution of the pre-treating agent, there is no limitation as to the solvent to be used, as long as the solvent can dissolve the pre-treating agent. For example, exemplified is a C5 to C12 alkane or a halogenated C5 to C12 alkane, a C6 to C12 aromatic hydrocarbon, or a halogenated C6 to C12 aromatic hydrocarbon, and the like, preferably pentane, hexane, heptane, octane, nonane, decane, undecane, dodecane, cyclo hexane, toluene, ethyl benzene, xylene, chlorinated pentane, chlorinated hexane, chlorinated heptane, chlorinated octane, chlorinated nonane, chlorinated decane, chlorinated undecane, chlorinated dodecane, chlorinated cyclo hexane, chlorinated toluene, chlorinated ethyl benzene, chlorinated xylene, and the like, more preferably pentane, hexane, decane, cyclo hexane, and toluene, most preferably hexane and toluene.

It should be noted that any solvent (for example, an ether type solvent, specifically, tetrahydrofuran) that can dissolve the magnesium compound can not be used herein.

The solvent could be used with one kind or as a mixture of two or more kinds.

Further, there is no limitation as to the concentration of the pre-treating agent in the solution, which could be determined by a person skilled in the art as needed, as long as it is sufficient for the solution to deliver the predetermined amount, by molar, of the pre-treating agent to pre-treat the magnesium compound.

As mentioned aforesaid, the magnesium compound according to this invention could be used directly in the contacting step, and also, could be used in the contacting step after has been pre-treated as aforesaid.

According to this invention, the chemical treating agent could be selected from the group consisting of a Group IVB metal compound. As said Group IVB metal compound, exemplified is a Group IVB metal halide, a Group IVB metal alkylate, a Group IVB metal alkoxylate, a Group IVB metal alkyl halide, and a Group IVB metal alkoxy halide.

As the Group IVB metal halide, the Group IVB metal alkylate, the Group IVB metal alkoxylate, the Group IVB metal alkyl halide and the Group IVB metal alkoxy halide, exemplified is a compound having the following general formula (IV).

$$M(OR^1)_m X_n R^2_{4-m-n} \quad (IV)$$

wherein, m is 0, 1, 2, 3, or 4, n is 0, 1, 2, 3, or 4,

M is a Group IVB metal, for example, titanium, zirconium, hafnium and the like,

X is a halogen atom, for example, F, Cl, Br, and I, $R^1$ and $R^2$ are each independently selected from the group consisting of a $C_1$-$C_{30}$ alkyl, for example, methyl, ethyl, propyl, n-butyl, isobutyl and the like, $R^1$ and $R^2$ could be each independently identical or different.

Specifically, said Group IVB metal halide could use for example, titanium tetrafluoride ($TiF_4$), titanium tetrachloride ($TiCl_4$), titanium tetrabromide ($TiBr_4$), titanium tetraiodide ($TiI_4$), zirconium tetrafluoride ($ZrF_4$), zirconium tetrachloride ($ZrCl_4$), zirconium tetrabromide ($ZrBr_4$), zirconium tetraiodide ($ZrI_4$), hafnium tetrafluoride ($HfF_4$), hafnium tetrachloride ($HfCl_4$), hafnium tetrabromide ($HfBr_4$), hafnium tetraiodide ($HfI_4$).

Said Group IVB metal alkylate could use for example, tetramethyl titanium ($Ti(CH_3)_4$), tetraethyl titanium ($Ti(CH_3CH_2)_4$), tetraisobutyl titanium ($Ti(i-C_4H_9)_4$), tetra-n-butyl titanium ($Ti(C_4H_9)_4$), triethylmethyl titanium ($Ti(CH_3)(CH_3CH_2)_3$), diethyldimethyl titanium ($Ti(CH_3)_2(CH_3CH_2)_2$), trimethylethyl titanium ($Ti(CH_3)_3(CH_3CH_2)$), triisobutylmethyl titanium ($Ti(CH_3)(i-C_4H_9)_3$), diisobutyldimethyl titanium ($Ti(CH_3)_2(i-C_4H_9)_2$), trimethylisobutyl titanium ($Ti(CH_3)_3(i-C_4H_9)$), triisobutylethyl titanium ($Ti(CH_3CH_2)(i-C_4H_9)_3$), diisobutyldiethyl titanium ($Ti(CH_3CH_2)_2(i-C_4H_9)_2$), triethylisobutyl titanium ($Ti(CH_3CH_2)_3(i-C_4H_9)$), tri-n-butylmethyl titanium ($Ti(CH_3)(C_4H_9)_3$), di-n-butyldimethyl titanium ($Ti(CH_3)_2(C_4H_9)_2$), trimethyl n-butyl titanium ($Ti(CH_3)_3(C_4H_9)$), tri-n-butylmethyl titanium ($Ti(CH_3CH_2)(C_4H_9)_3$), di-n-butyldiethyl titanium ($Ti(CH_3CH_2)_2(C_4H_9)_2$), triethyl n-butyl titanium ($Ti(CH_3CH_2)_3(C_4H_9)$) and the like, tetramethyl zirconium ($Zr(CH_3)_4$), tetraethyl zirconium ($Zr(CH_3CH_2)_4$), tetraisobutyl zirconium ($Zr(i-C_4H_9)_4$), tetra-n-butyl zirconium ($Zr(C_4H_9)_4$), triethylmethyl zirconium ($Zr(CH_3)(CH_3CH_2)_3$), diethyldimethyl zirconium ($Zr(CH_3)_2(CH_3CH_2)_2$), trimethylethyl zirconium ($Zr(CH_3)_3(CH_3CH_2)$), triisobutylmethyl zirconium ($Zr(CH_3)(i-C_4H_9)_3$), diisobutyldimethyl zirconium ($Zr(CH_3)_2(i-C_4H_9)_2$), trimethylisobutyl zirconium ($Zr(CH_3)_3(i-C_4H_9)$), triisobutylethyl zirconium ($Zr(CH_3CH_2)(i-C_4H_9)_3$), diisobutyldiethyl zirconium ($Zr(CH_3CH_2)_2(i-C_4H_9)_2$), triethylisobutyl zirconium ($Zr(CH_3CH_2)_3(i-C_4H_9)$), tri-n-butylmethyl zirconium ($Zr(CH_3)(C_4H_9)_3$), di-n-butyldimethyl zirconium ($Zr(CH_3)_2(C_4H_9)_2$), trimethyl n-butyl zirconium ($Zr(CH_3)_3(C_4H_9)$), tri-n-butylmethyl zirconium ($Zr(CH_3CH_2)(C_4H_9)_3$), di-n-butyldiethyl zirconium ($Zr(CH_3CH_2)_2(C_4H_9)_2$), triethyl n-butyl zirconium ($Zr(CH_3CH_2)_3(C_4H_9)$) and the like, tetramethyl hafnium ($Hf(CH_3)_4$), tetraethyl hafnium ($Hf(CH_3CH_2)_4$), tetraisobutyl hafnium ($Hf(i-C_4H_9)_4$), tetra-n-butyl hafnium ($Hf(C_4H_9)_4$), triethylmethyl hafnium ($Hf(CH_3)(CH_3CH_2)_3$), diethyldimethyl hafnium ($Hf(CH_3)_2(CH_3CH_2)_2$), trimethylethyl hafnium ($Hf(CH_3)_3(CH_3CH_2)$), triisobutylmethyl hafnium ($Hf(CH_3)(i-C_4H_9)_3$), diisobutyldimethyl hafnium ($Hf(CH_3)_2(i-C_4H_9)_2$), trimethylisobutyl hafnium ($Hf(CH_3)_3(i-C_4H_9)$), triisobutylethyl hafnium ($Hf(CH_3CH_2)(i-C_4H_9)_3$), diisobutyldiethyl hafnium ($Hf(CH_3CH_2)_2(i-C_4H_9)_2$), triethylisobutyl hafnium ($Hf(CH_3CH_2)_3(i-C_4H_9)$), tri-n-butylmethyl hafnium ($Hf(CH_3)(C_4H_9)_3$), di-n-butyldimethyl hafnium ($Hf(CH_3)_2(C_4H_9)_2$), trimethyl n-butyl hafnium ($Hf(CH_3)_3(C_4H_9)$), tri-n-butylmethyl hafnium ($Hf(CH_3CH_2)(C_4H_9)_3$), di-n-butyldiethyl hafnium ($Hf(CH_3CH_2)_2(C_4H_9)_2$), triethyl n-butyl hafnium ($Hf(CH_3CH_2)_3(C_4H_9)$) and the like.

Said Group IVB metal alkoxylate could use for example, tetramethoxy titanium ($Ti(OCH_3)_4$), tetraethoxy titanium ($Ti(OCH_3CH_2)_4$), tetraisobutoxy titanium ($Ti(i-OC_4H_9)_4$), tetra-n-butoxy titanium ($Ti(OC_4H_9)_4$), triethoxymethoxy titanium ($Ti(OCH_3)(OCH_3CH_2)_3$), diethoxydimethoxy titanium ($Ti(OCH_3)_2(OCH_3CH_2)_2$), trimethoxyethoxy titanium ($Ti(OCH_3)_3(OCH_3CH_2)$), triisobutoxymethoxy titanium ($Ti(OCH_3)(i-OC_4H_9)_3$), diisobutoxydimethoxy titanium ($Ti(OCH_3)_2(i-OC_4H_9)_2$), trimethoxyisobutoxy titanium ($Ti(OCH_3)_3(i-OC_4H_9)$), triisobutoxyethoxy titanium (Ti (OCH$_3$CH$_2$)(i-OC$_4$H$_9$)$_3$), diisobutoxydiethoxy titanium (Ti(OCH$_3$CH$_2$)$_2$(i-OC$_4$H$_9$)$_2$), triethoxyisobutoxy titanium (Ti(OCH$_3$CH$_2$)$_3$(i-OC$_4$H$_9$)), tri-n-butoxymethoxy titanium (Ti(OCH$_3$)(OC$_4$H$_9$)$_3$), di-n-butoxydimethoxy titanium (Ti(OCH$_3$)$_2$(OC$_4$H$_9$)$_2$), trimethoxy n-butoxy titanium (Ti(OCH$_3$)$_3$(OC$_4$H$_9$)), tri-n-butoxymethoxy titanium (Ti(OCH$_3$CH$_2$)(OC$_4$H$_9$)$_3$), di-n-butoxydiethoxy titanium (Ti(OCH$_3$CH$_2$)$_2$(OC$_4$H$_9$)$_2$), triethoxy n-butoxy titanium (Ti(OCH$_3$CH$_2$)$_3$(OC$_4$H$_9$)) and the like, tetramethoxy zirconium (Zr(OCH$_3$)$_4$), tetraethoxy zirconium (Zr(OCH$_3$CH$_2$)$_4$), tetraisobutoxy zirconium (Zr(i-OC$_4$H$_9$)$_4$), tetra-n-butoxy zirconium (Zr(OC$_4$H$_9$)$_4$), triethoxymethoxy zirconium (Zr(OCH$_3$)(OCH$_3$CH$_2$)$_3$), diethoxydimethoxy zirconium (Zr(OCH$_3$)$_2$(OCH$_3$CH$_2$)$_2$), trimethoxyethoxy zirconium (Zr(OCH$_3$)$_3$(OCH$_3$CH$_2$)), triisobutoxymethoxy zirconium (Zr(OCH$_3$)(i-OC$_4$H$_9$)$_3$), diisobutoxydimethoxy zirconium (Zr(OCH$_3$)$_2$(i-OC$_4$H$_9$)$_2$), trimethoxyisobutoxy zirconium (Zr(OCH$_3$)$_3$(i-C$_4$H$_9$)), triisobutoxyethoxy zirconium (Zr(OCH$_3$CH$_2$)(i-OC$_4$H$_9$)$_3$), diisobutoxydiethoxy zirconium (Zr(OCH$_3$CH$_2$)$_2$(i-OC$_4$H$_9$)$_2$), triethoxyisobutoxy zirconium (Zr(OCH$_3$CH$_2$)$_3$(i-OC$_4$H$_9$)), tri-n-butoxymethoxy zirconium (Zr(OCH$_3$)(OC$_4$H$_9$)$_3$), di-n-butoxydimethoxy zirconium (Zr(OCH$_3$)$_2$(OC$_4$H$_9$)$_2$), trimethoxy n-butoxy zirconium tri-n-butoxymethoxy zirconium (Zr(OCH$_3$)$_3$(OC$_4$H$_9$)), (Zr(OCH$_3$CH$_2$)(OC$_4$H$_9$)$_3$), di-n-butoxydiethoxy zirconium (Zr(OCH$_3$CH$_2$)$_2$(OC$_4$H$_9$)$_2$), triethoxy n-butoxy zirconium (Zr(OCH$_3$CH$_2$)$_3$(OC$_4$H$_9$)) and the like, tetramethoxy hafnium (Hf(OCH$_3$)$_4$), tetraethoxy hafnium (Hf(OCH$_3$CH$_2$)$_4$), tetraisobutoxy hafnium (Hf(i-OC$_4$H$_9$)$_4$), tetra-n-butoxy hafnium (Hf(OC$_4$H$_9$)$_4$), triethoxymethoxy hafnium (Hf(OCH$_3$)(OCH$_3$CH$_2$)$_3$), diethoxydimethoxy hafnium (Hf(OCH$_3$)$_2$(OCH$_3$CH$_2$)$_2$), trimethoxyethoxy hafnium (Hf(OCH$_3$)$_3$(OCH$_3$CH$_2$)), triisobutoxymethoxy hafnium (Hf(OCH$_3$)(i-OC$_4$H$_9$)$_3$), diisobutoxydimethoxy hafnium (Hf(OCH$_3$)$_2$(i-OC$_4$H$_9$)$_2$), trimethoxyisobutoxy hafnium (Hf(OCH$_3$)$_3$(i-OC$_4$H$_9$)), triisobutoxyethoxy hafnium (Hf(OCH$_3$CH$_2$)(i-OC$_4$H$_9$)$_3$), diisobutoxydiethoxy hafnium (Hf(OCH$_3$CH$_2$)$_2$(i-OC$_4$H$_9$)$_2$), triethoxyisobutoxy hafnium (Hf(OCH$_3$CH$_2$)$_3$(i-C$_4$H$_9$)), tri-n-butoxymethoxy hafnium (Hf(OCH$_3$)(OC$_4$H$_9$)$_3$), di-n-butoxydimethoxy hafnium (Hf(OCH$_3$)$_2$(OC$_4$H$_9$)$_2$), trimethoxy n-butoxy hafnium (Hf(OCH$_3$)$_3$(OC$_4$H$_9$)), tri-n-butoxymethoxy hafnium (Hf(OCH$_3$CH$_2$)(OC$_4$H$_9$)$_3$), di-n-butoxydiethoxy hafnium (Hf(OCH$_3$CH$_2$)$_2$(OC$_4$H$_9$)$_2$), triethoxy n-butoxy hafnium (Hf(OCH$_3$CH$_2$)$_3$(OC$_4$H$_9$)) and the like.

Said Group IVB metal alkyl halide could use for example, trimethylchloro titanium (TiCl(CH$_3$)$_3$), triethylchloro titanium (TiCl(CH$_3$CH$_2$)$_3$), triisobutylchloro titanium (TiCl(i-C$_4$H$_9$)$_3$), tri-n-butylchloro titanium (TiCl(C$_4$H$_9$)$_3$), dimethyldichloro titanium (TiCl$_2$(CH$_3$)$_2$), diethyldichloro titanium (TiCl$_2$(CH$_3$CH$_2$)$_2$), diisobutyldichloro titanium (TiCl$_2$(i-C$_4$H$_9$)$_2$), tri-n-butylchloro titanium (TiCl(C$_4$H$_9$)$_3$), methyltrichloro titanium (Ti(CH$_3$)Cl$_3$), ethyltrichloro titanium (Ti(CH$_3$CH$_2$)Cl$_3$), isobutyltrichloro titanium (Ti(i-C$_4$H$_9$)Cl$_3$), n-butyltrichloro titanium (Ti(C$_4$H$_9$)Cl$_3$), trimethylbromo titanium (TiBr(CH$_3$)$_3$), triethylbromo titanium (TiBr(CH$_3$CH$_2$)$_3$), triisobutylbromo titanium (TiBr(i-C$_4$H$_9$)$_3$), tri-n-butylbromo titanium (TiBr(C$_4$H$_9$)$_3$), dimethyldibromo titanium (TiBr$_2$(CH$_3$)$_2$), diethyldibromo titanium (TiBr$_2$(CH$_3$CH$_2$)$_2$), diisobutyldibromo titanium (TiBr$_2$(i-C$_4$H$_9$)$_2$), tri-n-butylbromo titanium (TiBr(C$_4$H$_9$)$_3$), methyl tribromo titanium (Ti(CH$_3$)Br$_3$), ethyl tribromo titanium (Ti(CH$_3$CH$_2$)Br$_3$), isobutyl tribromo titanium (Ti(i-C$_4$H$_9$)Br$_3$), n-butyl tribromo titanium (Ti(C$_4$H$_9$)Br$_3$), trimethylchloro zirconium (ZrCl(CH$_3$)$_3$), triethylchloro zirconium (ZrCl(CH$_3$CH$_2$)$_3$), triisobutylchloro zirconium (ZrCl(i-C$_4$H$_9$)$_3$), tri-n-butylchloro zirconium (ZrCl(C$_4$H$_9$)$_3$), dimethyldichloro zirconium (ZrCl$_2$(CH$_3$)$_2$), diethyldichloro zirconium (ZrCl$_2$(CH$_3$CH$_2$)$_2$), diisobutyldichloro zirconium (ZrCl$_2$(i-C$_4$H$_9$)$_2$), tri-n-butylchloro zirconium (ZrCl(C$_4$H$_9$)$_3$), methyltrichloro zirconium (Zr(CH$_3$)Cl$_3$), ethyltrichloro zirconium (Zr(CH$_3$CH$_2$)Cl$_3$), isobutyltrichloro zirconium (Zr(i-C$_4$H$_9$)Cl$_3$), n-butyltrichloro zirconium (Zr(C$_4$H$_9$)Cl$_3$), trimethylbromo zirconium (ZrBr(CH$_3$)$_3$), triethylbromo zirconium (ZrBr(CH$_3$CH$_2$)$_3$), triisobutylbromo zirconium (ZrBr(i-C$_4$H$_9$)$_3$), tri-n-butylbromo zirconium (ZrBr(C$_4$H$_9$)$_3$), dimethyldibromo zirconium (ZrBr$_2$(CH$_3$)$_2$), diethyldibromo zirconium (ZrBr$_2$(CH$_3$CH$_2$)$_2$), diisobutyldibromo zirconium (ZrBr$_2$(i-C$_4$H$_9$)$_2$), tri-n-butylbromo zirconium (ZrBr(C$_4$H$_9$)$_3$), methyl tribromo zirconium (Zr(CH$_3$)Br$_3$), ethyl tribromo zirconium (Zr(CH$_3$CH$_2$)Br$_3$), isobutyl tribromo zirconium (Zr(i-C$_4$H$_9$)Br$_3$), n-butyl tribromo zirconium (Zr(C$_4$H$_9$)Br$_3$), trimethylchloro hafnium (HfCl(CH$_3$)$_3$), triethylchloro hafnium (HfCl(CH$_3$CH$_2$)$_3$), triisobutylchloro hafnium (HfCl(i-C$_4$H$_9$)$_3$), tri-n-butylchloro hafnium (HfCl(C$_4$H$_9$)$_3$), dimethyldichloro hafnium (HfCl$_2$(CH$_3$)$_2$), diethyldichloro hafnium (HfCl$_2$(CH$_3$CH$_2$)$_2$), diisobutyldichloro hafnium (HfCl$_2$(i-C$_4$H$_9$)$_2$), tri-n-butylchloro hafnium (HfCl(C$_4$H$_9$)$_3$), methyltrichloro hafnium (Hf(CH$_3$)Cl$_3$), ethyltrichloro hafnium (Hf(CH$_3$CH$_2$)Cl$_3$), isobutyltrichloro hafnium (Hf(i-C$_4$H$_9$)Cl$_3$), n-butyltrichloro hafnium (Hf(C$_4$H$_9$)Cl$_3$), trimethylbromo hafnium (HfBr(CH$_3$)$_3$), triethylbromo hafnium (HfBr(CH$_3$CH$_2$)$_3$), triisobutylbromo hafnium (HfBr(i-C$_4$H$_9$)$_3$), tri-n-butylbromo hafnium (HfBr(C$_4$H$_9$)$_3$), dimethyldibromo hafnium (HfBr$_2$(CH$_3$)$_2$), diethyldibromo hafnium (HfBr$_2$(CH$_3$CH$_2$)$_2$), diisobutyldibromo hafnium (HfBr$_2$(i-C$_4$H$_9$)$_2$), tri-n-butylbromo hafnium (HfBr(C$_4$H$_9$)$_3$), methyl tribromo hafnium (Hf(CH$_3$)Br$_3$), ethyl tribromo hafnium (Hf(CH$_3$CH$_2$)Br$_3$), isobutyl tribromo hafnium (Hf(i-C$_4$H$_9$)Br$_3$), n-butyl tribromo hafnium (Hf(C$_4$H$_9$)Br$_3$).

Said Group IVB metal alkoxy halide could use for example, trimethoxychloro titanium (TiCl(OCH$_3$)$_3$), triethoxychloro titanium (TiCl(OCH$_3$CH$_2$)$_3$), triisobutoxychloro titanium (TiCl(i-OC$_4$H$_9$)$_3$), tri-n-butoxychloro titanium (TiCl(OC$_4$H$_9$)$_3$), dimethoxydichloro titanium (TiCl$_2$(OCH$_3$)$_2$), diethoxydichloro titanium (TiCl$_2$(OCH$_3$CH$_2$)$_2$), diisobutoxydichloro titanium (TiCl$_2$(i-OC$_4$H$_9$)$_2$), tri-n-butoxychloro titanium (TiCl(OC$_4$H$_9$)$_3$), methoxytrichloro titanium (Ti(OCH$_3$)Cl$_3$), ethoxytrichloro titanium (Ti(OCH$_3$CH$_2$)Cl$_3$), isobutoxytrichloro titanium (Ti(i-C$_4$H$_9$)Cl$_3$), n-butoxy trichloro titanium (Ti(OC$_4$H$_9$)Cl$_3$), trimethoxybromo titanium (TiBr(OCH$_3$)$_3$), triethoxybromo titanium (TiBr(OCH$_3$CH$_2$)$_3$), triisobutoxybromo titanium (TiBr(i-OC$_4$H$_9$)$_3$), tri-n-butoxybromo titanium (TiBr(OC$_4$H$_9$)$_3$), dimethoxydibromo titanium (TiBr$_2$(OCH$_3$)$_2$), diethoxydibromo titanium (TiBr$_2$(OCH$_3$CH$_2$)$_2$), diisobutoxydibromo titanium (TiBr$_2$(i-OC$_4$H$_9$)$_2$), tri-n-butoxybromo titanium (TiBr(OC$_4$H$_9$)$_3$), methoxy tribromo titanium (Ti(OCH$_3$)Br$_3$), ethoxy tribromo titanium (Ti(OCH$_3$CH$_2$)Br$_3$), isobutoxy tribromo titanium (Ti(i-C$_4$H$_9$)Br$_3$), n-butoxy tribromo titanium (Ti(OC$_4$H$_9$)Br$_3$), trimethoxychloro zirconium (ZrCl(OCH$_3$)$_3$), triethoxychloro zirconium (ZrCl(OCH$_3$CH$_2$)$_3$), triisobutoxychloro zirconium (ZrCl(i-OC$_4$H$_9$)$_3$), tri-n-butoxychloro zirconium (ZrCl(OC$_4$H$_9$)$_3$), dimethoxydichloro zirconium (ZrCl$_2$(OCH$_3$)$_2$), diethoxydichloro zirconium (ZrCl$_2$(OCH$_3$CH$_2$)$_2$), diisobutoxydichloro zirconium (ZrCl$_2$(i-OC$_4$H$_9$)$_2$), tri-n-butoxychloro zirconium (ZrCl(OC$_4$H$_9$)$_3$), methoxytrichloro zirconium (Zr(OCH$_3$)Cl$_3$), ethoxytrichloro zirconium (Zr(OCH$_3$CH$_2$)Cl$_3$), isobutoxytrichloro zirconium (Zr(i-C$_4$H$_9$)Cl$_3$), n-butoxytrichloro zirconium (Zr(OC$_4$H$_9$)Cl$_3$), trimethoxybromo zirconium (ZrBr(OCH$_3$)$_3$), triethoxybromo zirconium (ZrBr(OCH$_3$CH$_2$)$_3$), triisobutoxybromo zirconium (ZrBr(i-OC₄H₉)₃), tri-n-butoxybromo zirconium (ZrBr(OC₄H₉)₃), dimethoxydibromo zirconium (ZrBr₂(OCH₃)₂), diethoxydibromo zirconium (ZrBr₂(OCH₃CH₂)₂), diisobutoxydibromo zirconium (ZrBr₂(i-OC₄H₉)₂), tri-n-butoxybromo zirconium (ZrBr(OC₄H₉)₃), methoxy tribromo zirconium (Zr(OCH₃)Br₃), ethoxy tribromo zirconium (Zr(OCH₃CH₂)Br₃), isobutoxy tribromo zirconium (Zr(i-C₄H₉)Br₃), n-butoxy tribromo zirconium (Zr(OC₄H₉)Br₃), trimethoxychloro hafnium (HfCl(OCH₃)₃), triethoxychloro hafnium (HfCl(OCH₃CH₂)₃), triisobutoxychloro hafnium (HfCl(i-OC₄H₉)₃), tri-n-butoxychloro hafnium (HfCl(OC₄H₉)₃), dimethoxydichloro hafnium (HfCl₂(OCH₃)₂), diethoxydichloro hafnium (HfCl₂(OCH₃CH₂)₂), diisobutoxydichloro hafnium (HfCl₂(i-OC₄H₉)₂), tri-n-butoxychloro hafnium (HfCl(OC₄H₉)₃), methoxytrichloro hafnium (Hf(OCH₃)Cl₃), ethoxytrichloro hafnium (Hf(OCH₃CH₂)Cl₃), isobutoxytrichloro hafnium (Hf(i-C₄H₉)Cl₃), n-butoxytrichloro hafnium (Hf(OC₄H₉)Cl₃), trimethoxybromo hafnium (HfBr(OCH₃)₃), triethoxybromo hafnium (HfBr(OCH₃CH₂)₃), triisobutoxybromo hafnium (HfBr(i-OC₄H₉)₃), tri-n-butoxybromo hafnium (HfBr(OC₄H₉)₃), dimethoxydibromo hafnium (HfBr₂(OCH₃)₂), diethoxydibromo hafnium (HfBr₂(OCH₃CH₂)₂), diisobutoxydibromo hafnium (HfBr₂(i-OC₄H₉)₂), tri-n-butoxybromo hafnium (HfBr(OC₄H₉)₃), methoxy tribromo hafnium (Hf(OCH₃)Br₃), ethoxy tribromo hafnium (Hf(OCH₃CH₂)Br₃), isobutoxy tribromo hafnium (Hf(i-C₄H₉)Br₃), n-butoxy tribromo hafnium (Hf(OC₄H₉)Br₃).

As said Group IVB metal compound, preference is given to the Group IVB metal halide, more preferably TiCl₄, TiBr₄, ZrCl₄, ZrBr₄, HfCl₄ and HfBr₄, and most preferably TiCl₄ and ZrCl₄.

The Group IVB metal compound could be used with one kind or as a mixture of two or more kinds.

According to this invention, the nonmetallocene ligand is a compound having the following structure.

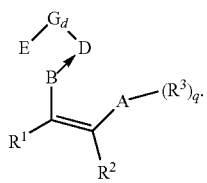

In a further embodiment, the nonmetallocene ligand is selected from the group consisting of the following structures (A) and (B).

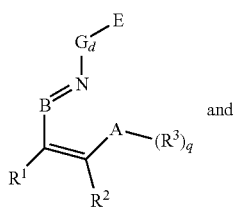

and (A)

(B)

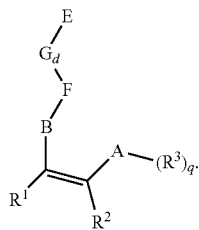

In a still further embodiment, the nonmetallocene ligand is selected from the group consisting of the following structures A-1 to A-4 and B-1 to B-4.

A-1

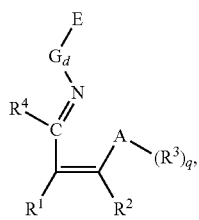

A-2

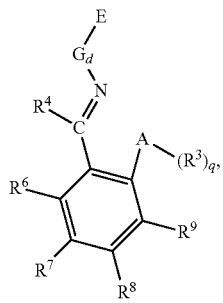

A-3

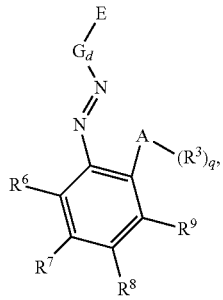

A-4

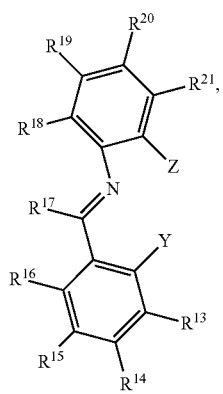

-continued

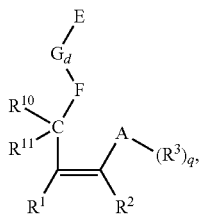

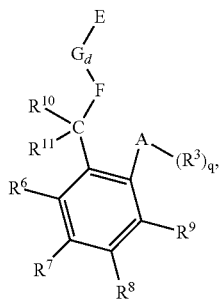

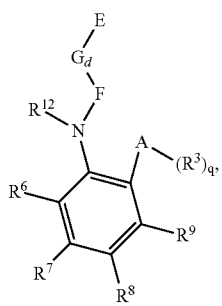

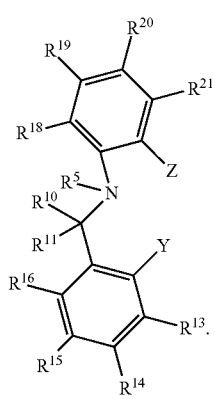

In all of the aforementioned structures:

q is 0 or 1;

d is 0 or 1;

A is selected from the group consisting of an oxygen atom, a sulfur atom, a selenium atom,

—$NR^{23}R^{24}$, —$N(O)R^{25}R^{26}$,

—$PR^{28}R^{29}$, —$P(O)R^{30}OR^{31}$, a sulfone group, a sulfoxide group and —$Se(O)R^{39}$;

B is selected from the group consisting of a nitrogen-containing group, a phosphor-containing group, and a $C_1$-$C_{30}$ hydrocarbyl;

D is selected from the group consisting of an oxygen atom, a sulfur atom, a selenium atom, a nitrogen-containing $C_1$-$C_{30}$ hydrocarbyl, a phosphor-containing $C_1$-$C_{30}$ hydrocarbyl, a sulfone group, a sulfoxide group,

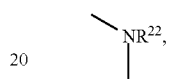

—$N(O)R^{25}R^{26}$,

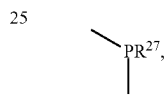

and —$P(O)R^{32}(OR^{33})$, wherein N, O, S, Se and P each represent a coordination atom;

E is selected from the group consisting of a nitrogen-containing group, an oxygen-containing group, a sulfur-containing group, a selenium-containing group and a phosphor-containing group, wherein N, O, S, Se and P each represent a coordination atom;

F is selected from the group consisting of a nitrogen-containing group, an oxygen-containing group, a sulfur-containing group, a selenium-containing group and a phosphor-containing group, wherein N, O, S, Se and P each represent a coordination atom;

G is selected from the group consisting of a $C_1$-$C_{30}$ hydrocarbyl, a substituted $C_1$-$C_{30}$ hydrocarbyl and an inert functional group;

Y and Z are each independently selected from the group consisting of a nitrogen-containing group, an oxygen-containing group, a sulfur-containing group, a selenium-containing group and a phosphor-containing group, for example, —$NR^{23}R^{24}$, —$N(O)R^{25}R^{26}$, —$PR^{28}R^{29}$, —$P(O)R^{30}R^{31}$, —$OR^{34}$, —$SR^{35}$, —$S(O)R^{36}$, —$SeR^{38}$ and —$Se(O)R^{39}$, wherein N, O, S, Se and P each represent a coordination atom;

→ represents a single bond or a double bond;

— represents a covalent bond or an ionic bond;

$R^1$ to $R^4$, $R^6$ to $R^{36}$ and $R^{38}$ to $R^{39}$ are each independently selected from the group consisting of hydrogen, a $C_1$-$C_{30}$ hydrocarbyl, a halogen atom, a substituted $C_1$-$C_{30}$ hydrocarbyl (preferably the corresponding halogenated hydrocarbyl, for example, —$CH_2Cl$ and —$CH_2CH_2Cl$) and an inert functional group, wherein these groups could be identical to or different with each other, and any adjacent groups, for example, $R^1$ with $R^2$ and $R^3$, $R^3$ with $R^4$, $R^6$, $R^7$, $R^8$ and $R^9$, $R^{23}$ with $R^{24}$, or $R^{25}$ with $R^{26}$, could form a bond or a ring altogether; and $R^5$ is selected from the group consisting of the lone pair electron on nitrogen atom, hydrogen, a $C_1$-$C_{30}$ hydrocarbyl, a substituted $C_1$-$C_{30}$ hydrocarbyl, an oxygen-containing group (including a hydroxyl group and an alkoxy group, for example, —$OR^{34}$ or -T-$OR^{34}$), a sulfur-containing group (for example, —SR³⁵, -T-SR³⁵), a selenium-containing group, a nitrogen-containing group (for example, —NR²³R²⁴, -T-NR²³R²⁴), and a phosphor-containing group (for example, —PR²⁸R²⁹, -T-PR²⁸R²⁹, -T-P(O)R³⁰R³¹), with proviso that when R⁵ is selected from the group consisting of the oxygen-containing group, the sulfur-containing group, the nitrogen-containing group, the selenium-containing group or the phosphor-containing group, N, O, S, P and Se in the group R⁵ each represent a coordination atom, and is able to coordinate with the Group IVB metal atom.

In the context of this invention, the halogen atom is selected from the group consisting of F, Cl, Br and I, the nitrogen-containing group is selected from the group consisting of

—NR²³R²⁴-T-NR²³R²⁴ and —N(O)R²⁵R²⁶, the phosphor-containing group is selected from the group consisting of

—PR²⁸R²⁹, —P(O)R³⁰R³¹ and —P(O)R³²(OR³³), the oxygen-containing group is selected from the group consisting of hydroxy and the alkoxy group, for example, —OR³⁴ and -T-OR³⁴, the sulfur-containing group is selected from the group consisting of —SR³⁵, -T-SR³⁵, —S(O)R³⁶ and -T-SO₂R³⁷, the selenium-containing group is selected from the group consisting of —SeR³⁸, -T-SeR³⁸, —Se(O)R³⁹ and -T-Se(O)R³⁹, the group T is selected from the group consisting of the C₁-C₃₀ hydrocarbyl, the substituted C₁-C₃₀ hydrocarbyl and the inert functional group, and R³⁷ is selected from the group consisting of hydrogen, the C₁-C₃₀ hydrocarbyl, the halogen atom, the substituted C₁-C₃₀ hydrocarbyl and the inert functional group.

According to this invention, the C₁-C₃₀ hydrocarbyl is selected from the group consisting of a C₁-C₃₀ alkyl group, a C₂-C₃₀ cyclic alkyl group, a C₂-C₃₀ alkenyl group, a C₂-C₃₀ alkynyl group, a C₆-C₃₀ aryl group, a C₈-C₃₀ fused-ring group or a C₄-C₃₀ heterocycle group, the substituted C₁-C₃₀ hydrocarbyl refers to a C₁-C₃₀ hydrocarbyl having one or more inert substituent(s). By inert, it means that the substituents show no substantial interference with the coordinating to the central metal atom. Unless otherwise specifically indicated, the substituted C₁-C₃₀ hydrocarbyl generally refers to a halogenated C₁-C₃₀ hydrocarbyl group, a halogenated C₆-C₃₀ aryl group, a halogenated C₈-C₃₀ fused-ring group or a halogenated C₄-C₃₀ heterocycle group, the inert functional group refers to any inert functional group other than a hydrocarbyl and a substituted hydrocarbyl. According to this invention, the inert functional group could be, for example, the halogen atom, the oxygen-containing group, the nitrogen-containing group, a silicon-containing group, a germanium-containing group, the sulfur-containing group or a tin-containing group, for example, an ether group (for example, —OR³⁴ or -TOR³⁵), a C₁-C₁₀ ester group, a C₁-C₁₀ amine group, a C₁-C₁₀ alkoxy group and a nitro group, and the like.

According to this invention, the inert functional group:
(1) does not interfere with the coordinating to the Group IVB metal atom;
(2) is different from each of the groups A, D, E, F, Y and Z in the structure, and
(3) is less liable to coordinate with the Group IVB metal atom than each of the groups A, D, E, F, Y and Z, and therefore will not coordinate with the Group IVB metal atom in place of these groups.

The silicon-containing group is selected from the group consisting of —SiR⁴²R⁴³R⁴⁴, and -T-SiR⁴⁵, the germanium-containing group is selected from the group consisting of —GeR⁴⁶R⁴⁷R⁴⁸, and -T-GeR⁴⁹, the tin-containing group is selected from the group consisting of —SnR⁵⁰R⁵¹R⁵², -T-SnR⁵³ and -T-Sn(O)R⁵⁴, and R⁴² to t R⁵⁴ are each independently selected from the group consisting of hydrogen, the C₁-C₃₀ hydrocarbyl, the halogen atom, the substituted C₁-C₃₀ hydrocarbyl and the inert functional group.

As the nonmetallocene ligand, exemplified is the following compounds.

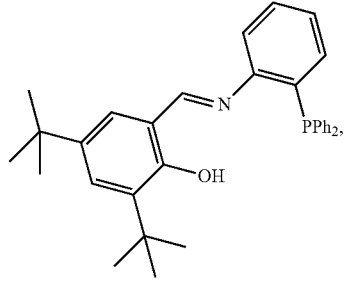

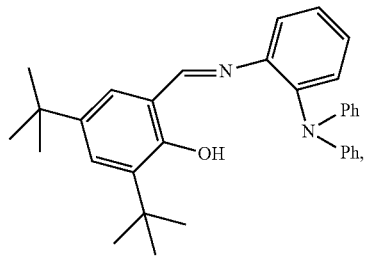

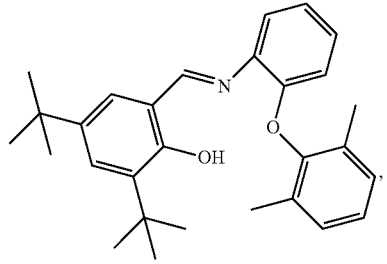

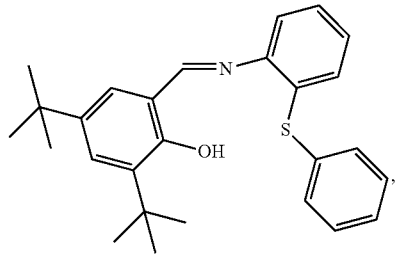

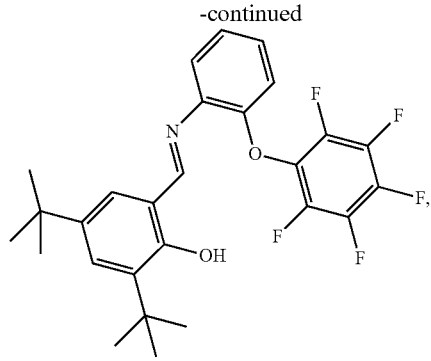
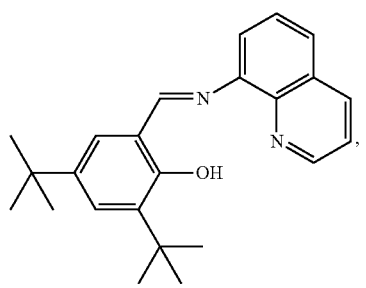
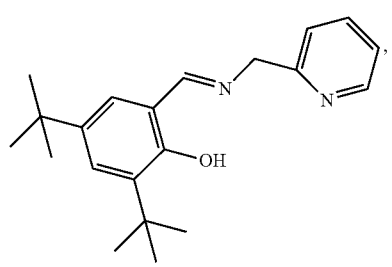
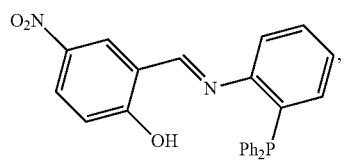
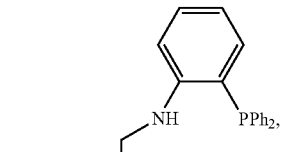
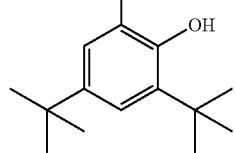
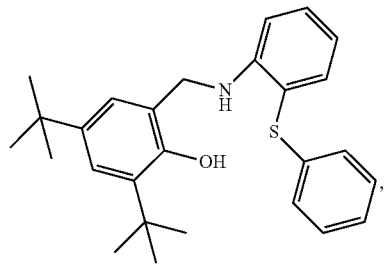
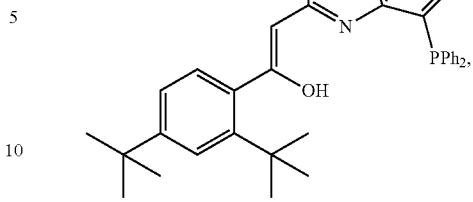
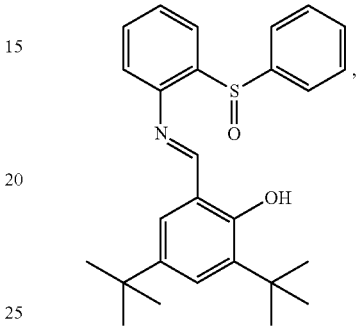
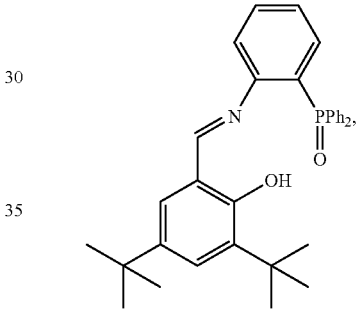
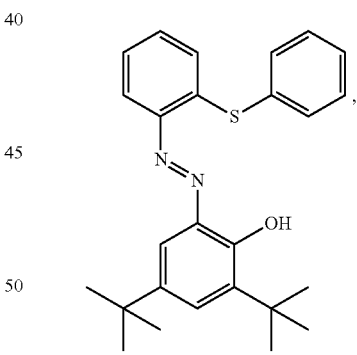
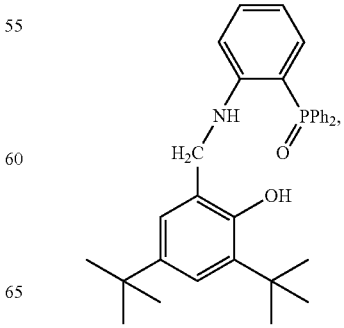

-continued
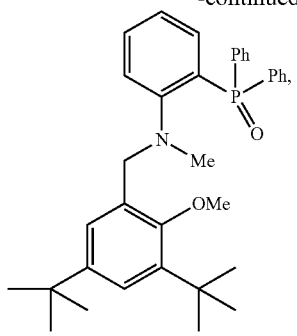
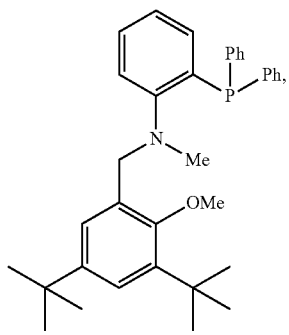
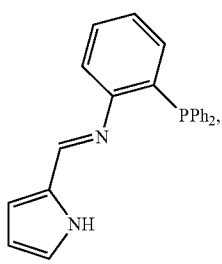
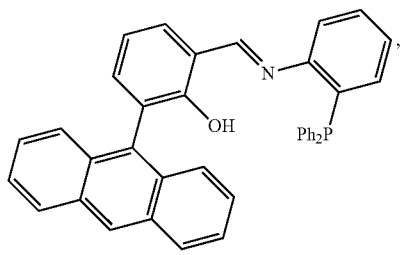
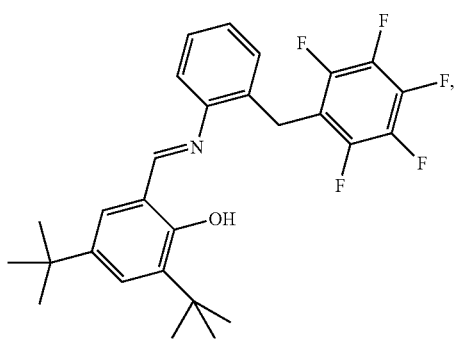
-continued
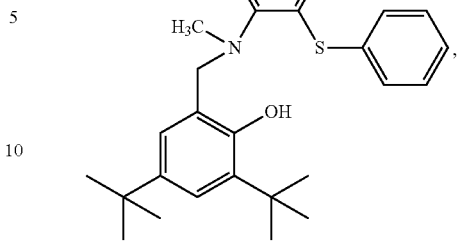
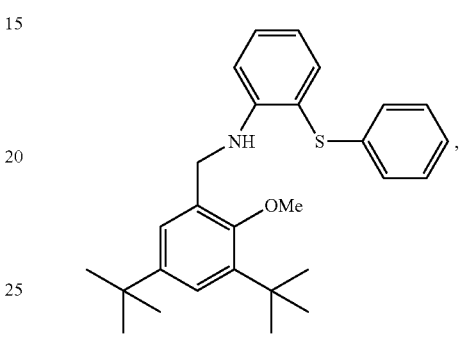
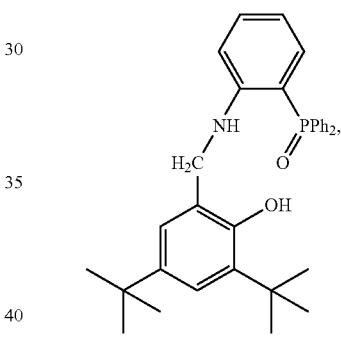
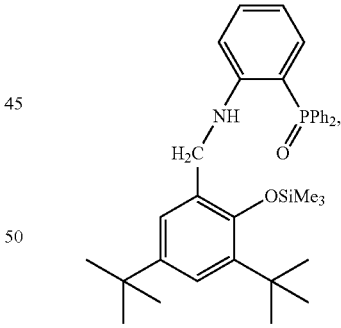
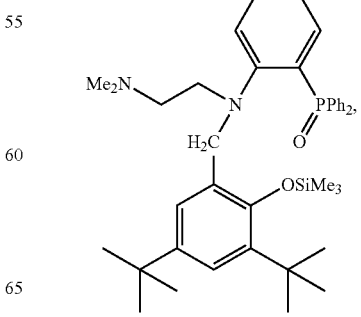

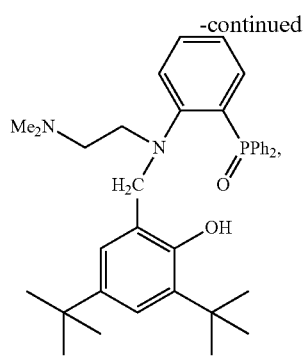
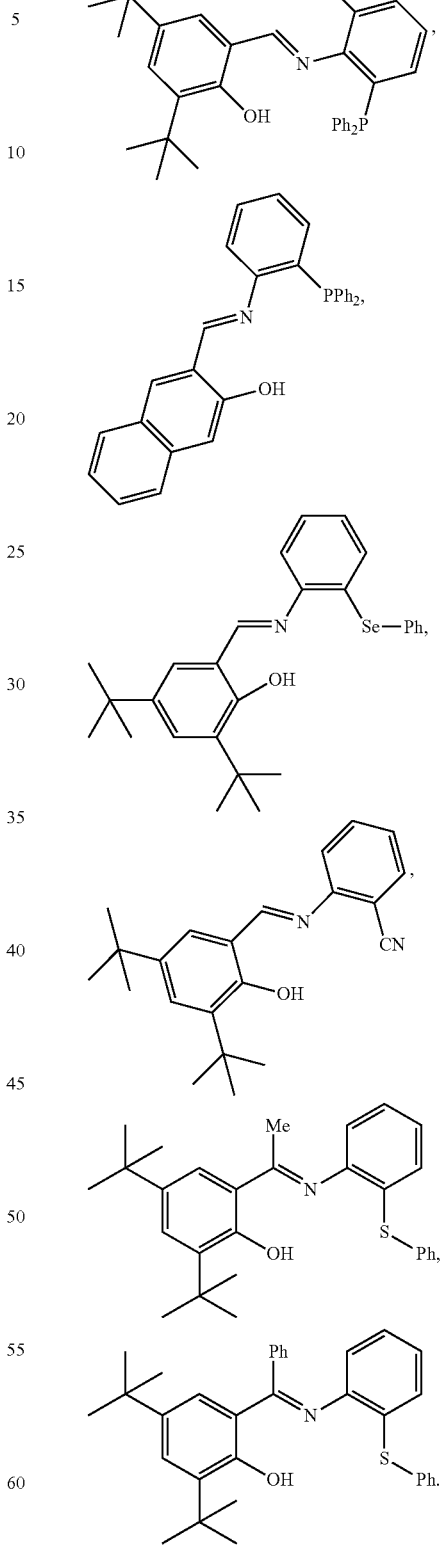
In a preferred embodiment, the nonmetallocene ligand is selected from the group consisting of the following compounds.

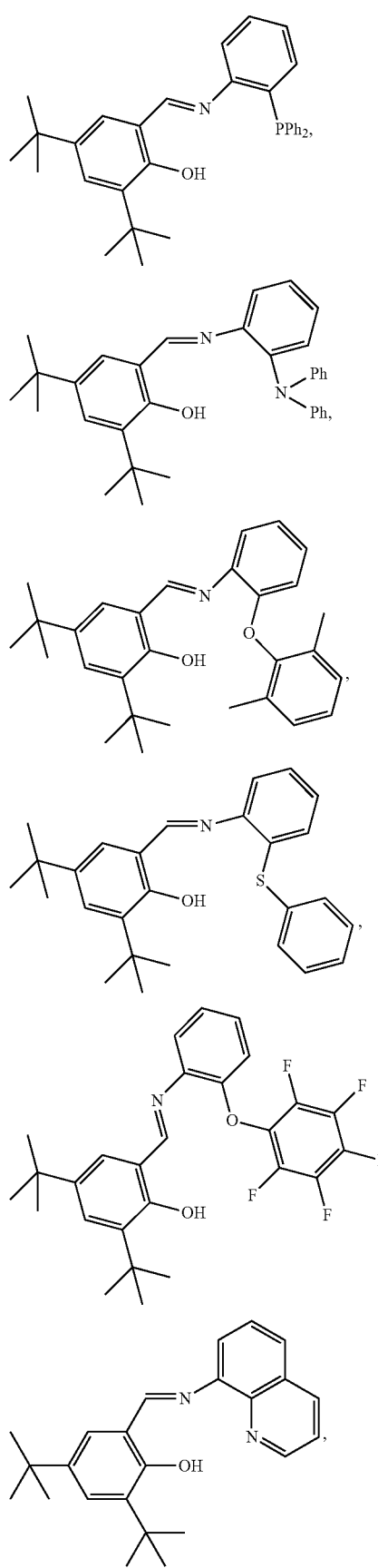
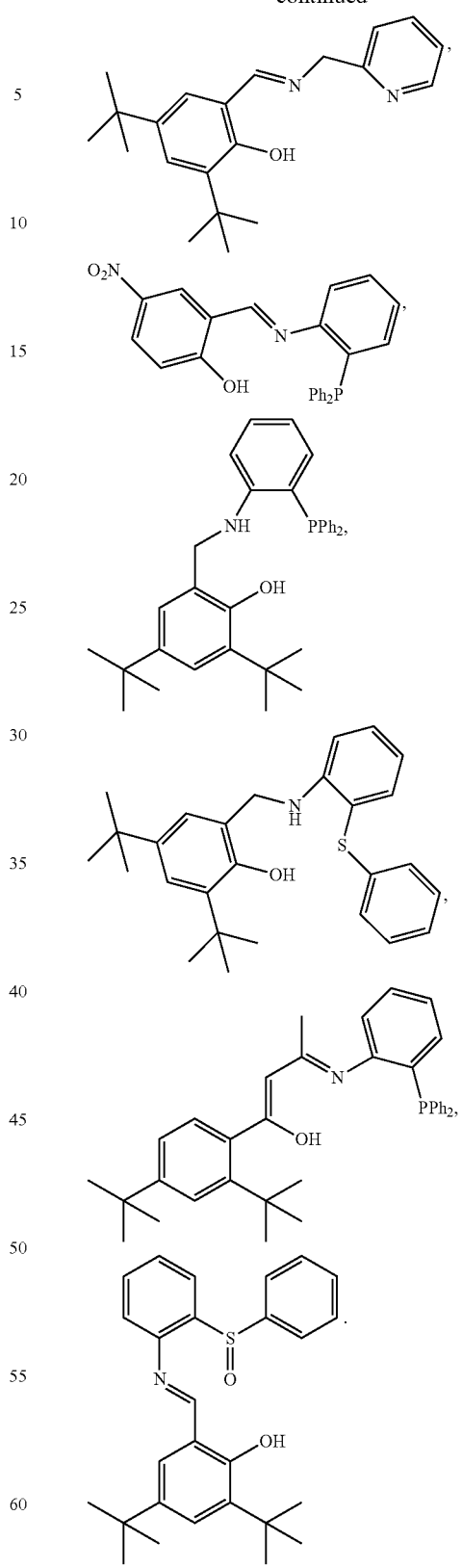
In a further preferred embodiment, the nonmetallocene ligand is selected from the group consisting of the following compounds.

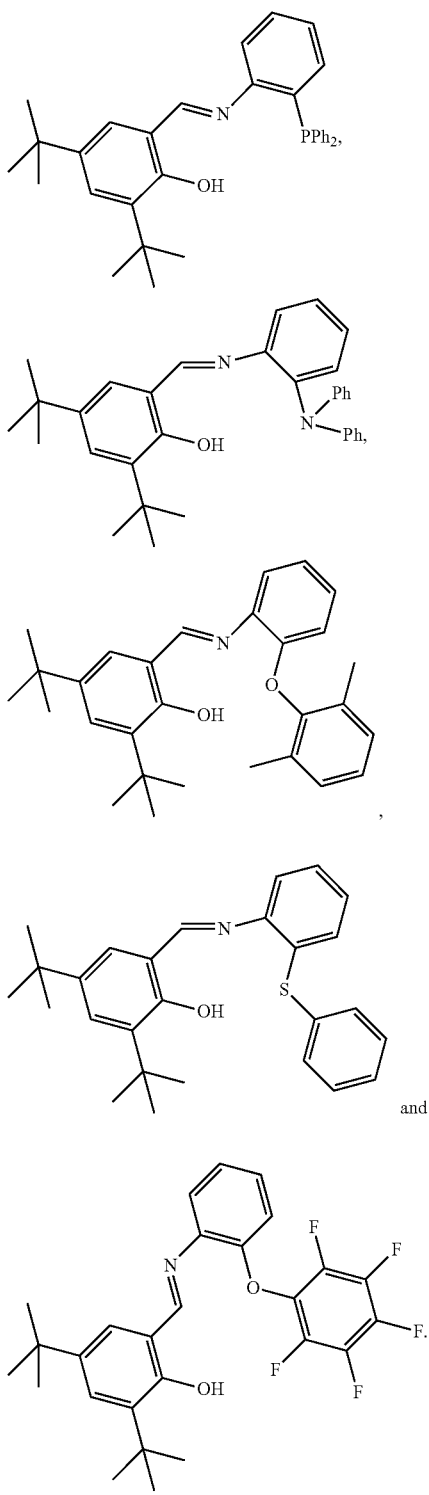

In a most preferred embodiment, the nonmetallocene ligand is selected from the group consisting of the following two compounds.

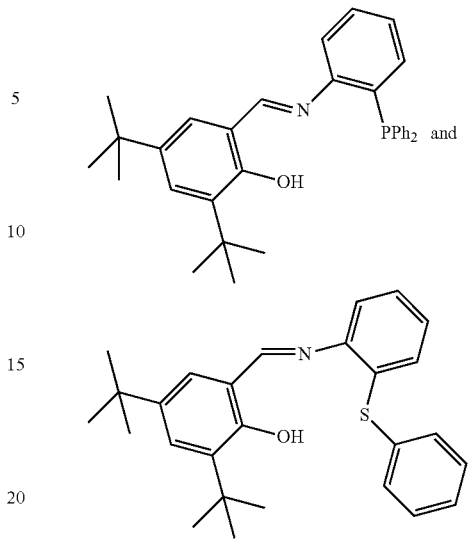

The nonmetallocene ligand could be used with one kind or as a mixture of two or more kinds.

According to one embodiment of this invention, to conduct the contacting step, the chemical treating agent is used to contact the magnesium compound (the term "magnesium compound" hereinafter is taken in its broadest sense, to refer to the magnesium compound as such, the modified magnesium compound, or further, a aforesaid pre-treated version thereof, unless otherwise specifically indicated), so as to obtain the contact resultant.

There is no limitation as to how to conduct said contacting step, as long as it is possible for the magnesium compound to contact with said chemical treating agent, so as to obtain the contact resultant, for example, as follows.

In case a solid chemical treating agent (for example ZrCl4) is used, first of all, a solution of said chemical treating agent is prepared, then the solution of the chemical treating agent is added (preferably dropwise) to the magnesium compound, with a predetermined amount of the chemical treating agent. In case a liquid chemical treating agent (for example TiCl4) is used, it is acceptable to add (preferably dropwise) a predetermined amount of the chemical treating agent as such (or after dissolved in a solvent) to the magnesium compound. The contacting reaction continues (facilitated by any stirring means, if necessary) for 0.5 to 24 hours, preferably 1 to 8 hours, more preferably 2 to 6 hours. Then, the resultant is filtrated, washed and dried, so as to obtain the contact resultant.

The filtration, washing (1 to 8 times, preferably 2 to 6 times, most preferably 2 to 4 times) and drying can be conducted in a conventional manner, wherein the washing solvent could be the same as that used for dissolving the chemical treating agent.

In the contacting step, ratio by molar of the chemical treating agent (based on the Group IVB metal) to the magnesium compound (based on Mg) could be 1:0.1 to 100, preferably 1:0.5-50.

In preparation of the solution of the chemical treating agent, there is no limitation as to the solvent to be used. For example, that for preparing the solution of the pre-treating agent can be used herein. Further, the solvent could be used with one kind or as a mixture of two or more kinds.

It should be noted that any solvent (for example, an ether type solvent, specifically, tetrahydrofuran) that can dissolve said magnesium compound can not be used in this step.

There is no limitation as to the concentration of the chemical treating agent in the solution, which could be determined by a person skilled in the art as needed, as long as it is sufficient for the solution to deliver the predetermined amount of the chemical treating agent to contact with the magnesium compound.

According to this invention, there is no limitation as to the temperature at which the contacting step is conducted. A high reaction temperature helps to promote the reaction of the chemical treating agent with the magnesium compound, and the reaction time could be decreased accordingly. In light of the fact that different solvents have different boiling points, it is well known for a person skilled in the art that the reaction temperature must be below the boiling point of the solvent used in the contacting step. For example, the reaction temperature could be at 20 to 65° C. for hexane, and 20 to 105° C. for toluene, and so on. Therefore, since the reaction temperature depends upon the solvent, one can not uniformly specify same in this regard. However, generally speaking, the reaction temperature could be that 5 to 10° C. below the boiling point of the solvent used, without any limitation to the lower limit of the reaction temperature. There is no special limitation to the reaction time, generally it could be 0.5 to 24 hours. In case of an elevated reaction temperature, the reaction time could be shortened accordingly.

It needs to be pointed out that in the contacting step, it is not always necessary to use a solvent. That is to say, the reaction of the chemical treating agent with the magnesium compound can be carried out in the absence of a solvent. To this end, the chemical treating agent must be in a liquid state. In this case, the reaction temperature and the reaction time could be predetermined as needed. Generally speaking, the reaction temperature could be at least 5 to 10° C. below the boiling point of the chemical treating agent, and the reaction time could be 2 to 24 hours. As a rule, the more drastic the reaction between the chemical treating agent and the magnesium compound is, the lower the reaction temperature should be set, resulting in a prolonged reaction time. For example, when the chemical treating agent is TiCl4, the reaction temperature could range from −30° C. to 126° C., the corresponding reaction time could be between 2 to 12 hours.

Further, in an embodiment according to this invention, the mixture mass (without separation of the pre-treated magnesium compound therefrom) obtained in the aforesaid pre-treating step, if any, could be used, instead of the magnesium compound, in the contacting step. In this case, since the mixture mass contains an amount of solvent, it is possible to reduce or eliminate use of solvent in the contacting step.

According to this invention, by treating the thus obtained contact resultant with the nonmetallocene ligand, the magnesium compound-supported nonmetallocene catalyst according to this invention can be obtained.

According to this invention, by treating said contact resultant obtained in the contacting step with said nonmetallocene ligand, reaction occurs between said nonmetallocene ligand with the Group IVB metal contained in said contact resultant, so as to in-situ form a nonmetallocene complex (hereinafter referred as the in-situ supporting reaction), whereby obtaining the magnesium compound-supported nonmetallocene catalyst according to this invention.

There is no limitation as to how to conduct said in-situ supporting reaction, as long as it is possible for the contact resultant to be treated with the nonmetallocene ligand, for example, as follows.

Firstly, a solution of said nonmetallocene ligand in a solvent is prepared. To facilitate dissolution of said nonmetallocene ligand in the solvent, heat could be applied during the dissolution, if necessary. Further, if needed, any stirring means could be used in the dissolution, whose rotational speed could be 10 to 500 r/min. To achieve the predetermined amount of the nonmetallocene ligand in the final supported nonmetallocene catalyst, taking into consideration of the dissolving ability of the solvent to the nonmetallocene ligand in this step, the concentration by mass of the nonmetallocene ligand in the solution is generally 10 to 250 g/L, preferably 50 to 160 g/L.

To prepare said solution, there is no limitation as to the solvent to be used, as long as the solvent can dissolve the nonmetallocene ligand. For example, exemplified is an alkane, for example, pentane, hexane, heptane, octane, nonane, or decane, and the like, a cyclic alkane, for example, cyclo pentane, cyclo hexane, cyclo heptane, cyclo nonane, or cyclo decane, and the like, a halogenated alkane, for example, dichloro methane, dichloro hexane, dichloro heptane, trichloro methane, trichloro ethane, trichloro butane, dibromo methane, dibromo ethane, dibromo heptane, tribromo methane, tribromo ethane, tribromo butane and the like, a halogenated cyclic alkane, for example, chlorinated cyclo hexane, chlorinated cyclo pentane, chlorinated cyclo heptane, chlorinated cyclo decane, chlorinated cyclo nonane, chlorinated cyclo octane, brominated cyclo hexane, brominated cyclo pentane, brominated cyclo heptane, brominated cyclo decane, brominated cyclo nonane, brominated cyclo octane, and the like, an aromatic hydrocarbon, for example, toluene, xylene, trimethyl benzene, ethyl benzene, diethyl benzene and the like, and a halogenated aromatic hydrocarbon, for example, chlorinated toluene, chlorinated ethyl benzene, brominated ethyl benzene, brominated toluene and the like.

Preference is given to the alkane, the halogenated alkane and the aromatic hydrocarbon, more preferably hexane, dichloro methane, and toluene.

The solvent could be used with one kind or as a mixture of two or more kinds.

It should be noted that any solvent (for example, an ether type solvent, specifically, tetrahydrofuran) that can dissolve the magnesium compound can not be used in this step.

Then, the contact resultant is added to the solution of the nonmetallocene ligand under a temperature ranging from the room temperature to that 5° C. below the boiling point of the solvent for dissolving said nonmetallocene ligand, under sufficient stirring, such that ratio by mass of the nonmetallocene ligand to the contact resultant is 0.01-0.50 to 1, preferably 0.10-0.30 to 1. The contacting reaction continues for 0.5 to 24 hours. The stirring means could be a ribbon stirrer, an anchor stirrer and the like. For the ribbon stirrer, the speed could be 5 to 50 r/min, while for the anchor stirrer, the speed could be 5 to 200 r/min.

Then, at the end of the reaction, the resultant mixture is subjected to filtration, washing and drying, or direct drying without filtration and washing, so as to obtain the magnesium compound-supported nonmetallocene catalyst according to this invention. Generally speaking, in case the resultant mixture has a low solid content, the former way is preferred, while the resultant mixture has a high solid content, the latter way is preferred. If needed, the washing could be conducted for 1 to 8 times, preferably 2 to 6 times, most preferably 2 to 4 times. The drying could be conducted in a conventional way, for example, drying under an inert gas atmosphere, vacuum drying, or vacuum drying under heat, preferably vacuum drying. Generally speaking, the drying duration could be 2 to 24 hours, however in practice, one could determine the end of the drying by sampling the mixture being dried and analyzing the weight loss of the sample by a thermal weight-loss method. Specifically, in case the temperature at which the resultant mixture is dried is 5 to 45° C. below the boiling point of the solvent used, a weight-loss of less than 5% could be determined as the end of the drying. In case a comparatively low boiling point solvent is used, a comparatively short drying duration is preferred, while a comparatively high boiling point solvent is used, a accordingly comparatively long drying duration is preferred. The drying temperature is generally 5° C. to 45° C. below the boiling point of the solvent used. For example, in case tetrahydrofuran is used as the solvent, the drying temperature could range from 23 to 63° C., in case toluene is used as the solvent, the drying temperature could range from 65 to 105° C., while in case dichloro methane is used, the drying temperature could range from 0 to 37° C., and so on.

Further, in favor of the interaction between the contact resultant and the nonmetallocene ligand, the resultant mixture obtained is usually aged for 0.5 to 24 hours under a sealed condition at the room temperature, so as to enhance the bonding strength therebetween.

According to another embodiment of this invention, to conduct the contacting step, the nonmetallocene ligand is used to contact the magnesium compound (the term "magnesium compound" hereinafter is taken in its broadest sense, to refer to the magnesium compound as such, the modified magnesium compound, or further, a aforesaid pre-treated version thereof, unless otherwise specifically indicated), so as to obtain the contact resultant.

There is no limitation as to how to conduct said contacting step, as long as it is possible for the magnesium compound to contact with said nonmetallocene ligand, so as to obtain the contact resultant, for example, as follows.

Firstly, a solution of said nonmetallocene ligand in a solvent is prepared. To facilitate dissolution of said nonmetallocene ligand in the solvent, heat could be applied during the dissolution, if necessary. Further, if needed, any stirring means could be used during the dissolution, whose rotational speed could be 10 to 500 r/min.

According to this invention, there is no limitation to the amount of the solvent to be used for dissolving the nonmetallocene ligand. In this connection, a person skilled in the art can determine a suitable amount as needed on the basis of the dissolving ability or solubility of the solvent to the nonmetallocene ligand, as long as a homogeneous solution can be formed and the slurry obtained by mixing the magnesium compound and the solution remains uniform. Generally speaking, the concentration by mass of the nonmetallocene ligand in the solution is generally 10 to 250 g/L, preferably 50 to 160 g/L.

In case a direct drying is conducted after the contacting step, the amount of the solvent to be used can be further reduced accordingly.

To prepare said solution, there is no limitation as to the solvent to be used, as long as the solvent can dissolve the nonmetallocene ligand. For example, exemplified is an alkane, for example, pentane, hexane, heptane, octane, nonane, or decane, and the like, a cyclic alkane, for example, cyclo pentane, cyclo hexane, cyclo heptane, cyclo nonane, or cyclo decane, and the like, a halogenated alkane, for example, dichloro methane, dichloro hexane, dichloro heptane, trichloro methane, trichloro ethane, trichloro butane, dibromo methane, dibromo ethane, dibromo heptane, tribromo methane, tribromo ethane, tribromo butane and the like, a halogenated cyclic alkane, for example, chlorinated cyclo hexane, chlorinated cyclo pentane, chlorinated cyclo heptane, chlorinated cyclo decane, chlorinated cyclo nonane, chlorinated cyclo octane, brominated cyclo hexane, brominated cyclo pentane, brominated cyclo heptane, brominated cyclo decane, brominated cyclo nonane, brominated cyclo octane, and the like, an aromatic hydrocarbon, for example, toluene, xylene, trimethyl benzene, ethyl benzene, diethyl benzene and the like, and a halogenated aromatic hydrocarbon, for example, chlorinated toluene, chlorinated ethyl benzene, brominated ethyl benzene, brominated toluene and the like.

Preference is given to the alkane, the halogenated alkane or the aromatic hydrocarbon, more preferably hexane, dichloro methane, and toluene.

It should be noted that any solvent (for example, an ether type solvent, specifically, tetrahydrofuran) that can dissolve the magnesium compound can not be used herein.

The solvent could be used with one kind or as a mixture of two or more kinds.

Then, the magnesium compound is added to the solution of the nonmetallocene ligand at a temperature equal to or below 35° C., under sufficient stirring, such that ratio by molar of the nonmetallocene ligand to the magnesium compound (based on Mg) is 1 to 1-10, preferably 1 to 3-7. The contacting reaction continues for 0.5 to 24 hours. An elongated reaction time is preferred, since same helps to achieve a tighter and stronger bonding between the nonmetallocene ligand and the magnesium compound.

The stirring means could be a ribbon stirrer, an anchor stirrer and the like. For the ribbon stirrer, the speed could be 5 to 50 r/min, while for the anchor stirrer, the speed could be 5 to 200 r/min.

Upon finish of the reaction, the resultant mixture is subjected to filtration and washing, or to filtration, washing and drying, or to direct drying without filtration and washing, so as to obtain the contact resultant.

The filtration and washing can be conducted in a conventional way. The washing solvent can be the same as that used for dissolving the nonmetallocene ligand. For example, the washing could be conducted for 1 to 8 times, preferably 2 to 6 times, most preferably 2 to 4 times.

The drying could be conducted in a conventional way, for example, drying under an inert gas atmosphere, vacuum drying, or vacuum drying under heat, preferably vacuum drying or drying under an inert gas atmosphere.

Further, in an embodiment according to this invention, the mixture mass (without separation of the pre-treated magnesium compound therefrom) obtained in the aforesaid pre-treating step could be used, instead of the magnesium compound, in the contacting step. In this case, since the mixture mass contains an amount of solvent, it is possible to reduce or eliminate use of solvent in the contacting step.

According to this invention, by treating the thus obtained contact resultant with the chemical treating agent, the magnesium compound-supported nonmetallocene catalyst according to this invention can be obtained.

According to this invention, by treating said contact resultant obtained in the contacting step with said chemical treating agent (i.e., the Group IVB metal compound), reaction occurs between the Group IVB metal compound and the nonmetallocene ligand contained in said contact resultant, so as to in-situ form a nonmetallocene complex (hereinafter referred as the in-situ supporting reaction), whereby obtaining the magnesium compound-supported nonmetallocene catalyst according to this invention.

There is no limitation as to how to conduct said in-situ supporting reaction, as long as it is possible for the contact resultant to be treated with the chemical treating agent, for example, as follows.

In case a solid chemical treating agent (for example ZrCl4) is used, first of all, a solution of said chemical treating agent is prepared, then the solution of the chemical treating agent is added (preferably dropwise) to the contact resultant at a temperature equal to or below 35° C. with a predetermined amount of the chemical treating agent. In case a liquid chemical treating agent (for example TiCl4) is used, it is acceptable to add (preferably dropwise) a predetermined amount of the chemical treating agent as such (or after dissolved in a solvent) to the contact resultant. The contacting reaction continues (facilitated by any stirring means, if necessary) at a temperature equal to or below 35° C. for 1 to 12 hours, preferably 2 to 8 hours. Then, the resultant is filtrated, washed and dried, or directly dried without filtration and washing, so as to obtain the magnesium compound-supported nonmetallocene catalyst.

The filtration, washing (1 to 8 times, preferably 2 to 6 times, most preferably 2 to 4 times) and drying can be conducted in a conventional manner, wherein the washing solvent could be the same as that used for dissolving the chemical treating agent.

In this step, ratio by molar of the chemical treating agent (based on the Group IVB metal) to the nonmetallocene ligand could be 1:0.1 to 1, preferably 1:0.3-0.9.

In preparation of the solution of the chemical treating agent, there is no limitation as to the solvent to be used. For example, that for preparing the solution of the pre-treating agent can be used herein. Further, the solvent could be used with one kind or as a mixture of two or more kinds.

It should be noted that any solvent (for example, an ether type solvent, specifically, tetrahydrofuran) that can dissolve said magnesium compound can not be used in this step.

There is no limitation as to the concentration of the chemical treating agent in the solution, which could be determined by a person skilled in the art as needed, as long as it is sufficient for the solution to deliver the predetermined amount of the chemical treating agent to treat the contact resultant.

It needs to be pointed out that in the treating step, it is not always necessary to use a solvent. That is to say, the reaction of the chemical treating agent with the contact resultant can be carried out in the absence of a solvent. To this end, the chemical treating agent must be in a liquid state.

It is well known that the aforementioned processes and steps are all required to be carried out under a substantial anhydrous condition in absence of oxygen. By substantial anhydrous condition in absence of oxygen, it means that the respective content of water and oxygen in the system concerned is continuously controlled to be less than 10 ppm. Further, the magnesium compound-supported nonmetallocene catalyst according to this invention, after prepared, is usually stored in a sealed container with a nitrogen seal under a slightly positive pressure before use.

In one embodiment, this invention relates to a magnesium compound-supported nonmetallocene catalyst produced as aforesaid.

In a further embodiment according to this invention, the magnesium compound-supported nonmetallocene catalyst according to this invention, in combination with a co-catalyst, constitutes a catalyst system for catalyzing olefin homopolymerization/copolymerization.

In this connection, the magnesium compound-supported nonmetallocene catalyst according to this invention is used as the main catalyst, one or more selected from the group consisting of an aluminoxane, an alkylaluminum, a halogenated alkyl aluminum, a fluoroborane, an alkylboron and an alkylboron ammonium salt is/are used as the co-catalyst, so as for catalyzing the olefin homopolymerization/copolymerization.

There is no limitation as to how to conduct said olefin homopolymerization/copolymerization, any conventional process that is familiar to a person skilled in the art can be used, for example, a slurry process, an emulsion process, a solution process, a bulk process or a gas phase process.

The olefins to be used is selected from the group consisting of a $C_2$ to $C_{10}$ mono-olefin, a diolefin, a cyclic olefin or other ethylenic unsaturated compounds. For example, as said $C_2$ to $C_{10}$ mono-olefin, exemplified is ethylene, propene, 1-butene, 1-hexene, 1-heptene, 4-methyl-1-pentene, 1-octene, 1-decene, 1-undecene, 1-dodecene, 1-cyclopentene, norbornene, norbornadiene, and styrene, as said diolefin, exemplified is 1,4-butadiene, 2,5-pentadiene, 1,6-hexadiene, and 1,7-octadiene, as said other ethylenic unsaturated compounds, exemplified is vinyl acetate, and (meth)acrylates. In this specification, it is required to point out that, by homopolymerization, it refers to the polymerization of a single kind of said olefin, by copolymerization, it refers to the polymerization of two or more of said olefins.

As aforesaid, the co-catalyst is selected from the group consisting of an aluminoxane, an alkylaluminum, a halogenated alkyl aluminum, a fluoroborane, an alkylboron and an alkylboron ammonium salt, preferably aluminoxane and alkylaluminum.

As the aluminoxane and the alkylaluminum, exemplified is that as aforesaid as the pre-treating agent, preferably methyl aluminoxane (MAO) and triethyl aluminum.

The process for producing the magnesium compound-supported nonmetallocene catalyst according to this invention is simple and feasible, and it is easy to adjust the load of the nonmetallocene ligand on the magnesium compound, and therefore it is possible to significantly increase the load, leading to a significantly increased polymerization activity of the thus obtained catalyst.

Further, by using different amounts of the chemical treating agent and/or different amounts of the pre-treating agent (detailed hereinafter), it is possible to freely adjust the polymerization activity of the obtained supported nonmetallocene catalyst as needed, from low to high, thereby adapting same for different olefin polymerization requirements. For this reason, the process according to this invention is characterized by high process flexibility and high process controllability.

When a catalyst system is constituted by using the supported nonmetallocene catalyst according to this invention in combination with a co-catalyst (for example, methyl aluminoxane or triethyl aluminum), only a comparatively small amount of the co-catalyst is needed to achieve a comparatively high polymerization activity. Further, the supported nonmetallocene catalyst according to this invention boasts significant copolymerization effect.

When a catalyst system is constituted by using the supported nonmetallocene catalyst according to this invention in combination with a co-catalyst for olefin homopolymerization/copolymerization, the polymer product thus obtained boasts high polymer bulk density and freely adjustable molecular weight distribution.

EXAMPLE

The present invention is further illustrated by using the following examples, but the present invention is not confined to same.

The bulk density of the polymer is measured according to the Chinese Standard GB 1636-79 (unit: g/cm³).

The respective content of Ti and Mg in the magnesium compound-supported nonmetallocene catalyst is determined by the ICP-AES method.

The polymerization activity of the catalyst is calculated as follows.

At the end of the polymerization, the polymer product in the reactor is filtered, dried and weighed for its weight (by mass). Then, the polymerization activity of the catalyst is expressed by a value obtained by dividing the weight of the polymer product by the amount (by mass) of the catalyst used in the polymerization (unit: kg polymer per g Cat).

The molecular distribution of the polymer is determined by the GPC model V2000 gel permeation chromatographer (WATERS Co., USA), using o-trichloro benzene as the solvent, and at a temperature of 150° C.

Example I-1

Anhydrous magnesium chloride was used as the magnesium compound, and TiCl4 was used as the chemical treating agent.

5 g of the anhydrous magnesium chloride was weighted, and 25 ml hexane was added thereto as the solvent for preparing the contact resultant so as to have the magnesium chloride dispersed therein. Then, TiCl4 was dropwise added thereto over a period of 30 minutes under stirring, and was reacted for 4 hours at 60. The resultant was then filtered, washed by hexane for 3 times (25 ml per time), and vacuum-dried, so as to obtain the contact resultant.

In this step, the ratio by molar of TiCl4 to the magnesium compound was 1:2.

A nonmetallocene ligand of the structure

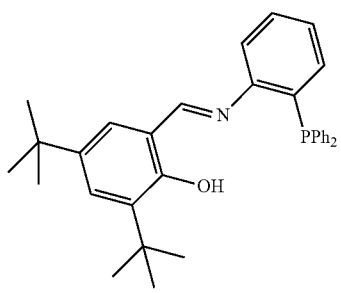

was dissolved in hexane (as the solvent for dissolving the nonmetallocene ligand), then the contact resultant was added thereto under stirring, and the reaction continued for 4 hours. After filtrated, washed by hexane for 2 times (25 ml per time), and dried at 25° C. for 6 hours, a magnesium compound-supported nonmetallocene catalyst was obtained.

In this step, the concentration by mass of the nonmetallocene ligand was 100 g/L, and the ratio by mass of the nonmetallocene ligand to the contact resultant was 0.11:1.

The catalyst obtained was named as CAT-I-1, in which the content by mass of Ti was 8.4%, and the content by mass of Mg was 13.7%.

Example I-1-1

Substantially the same as the Example I-1, except for the following changes:

The magnesium compound was changed to magnesium bromide, the chemical treating agent was changed to TiBr4, and the ratio by molar of TiBr4 to the magnesium compound was 1:4.5.

The solvent for preparing the contact resultant was changed to decane.

The nonmetallocene ligand was changed to

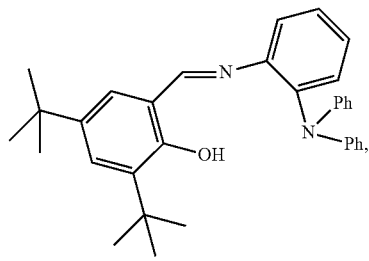 [SMILES: CC(C)(C)c1cc(/C=N/c2ccccc2N(c2ccccc2)c2ccccc2)c(O)c(C(C)(C)C)c1]

and the solvent for dissolving the nonmetallocene ligand was changed to decane.

In this example, the concentration by mass of the nonmetallocene ligand was 50 g/L, and the ratio by mass of the nonmetallocene ligand to the contact resultant was 0.22:1.

Example I-1-2

Substantially the same as the Example I-1, except for the following changes:

The magnesium compound was changed to ethoxy magnesium chloride (MgCl(OC$_2$H$_5$)), the chemical treating agent was changed to ZrCl$_4$ (in toluene), the ratio by molar of ZrCl$_4$ to the magnesium compound was 1:1, and the solvent for preparing the contact resultant was changed to toluene.

The nonmetallocene ligand was changed to

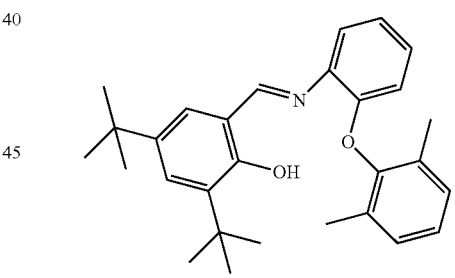

and the solvent for dissolving the nonmetallocene ligand was changed to toluene.

In this example, the concentration by mass of the nonmetallocene ligand was 170 g/L, and the ratio by mass of the nonmetallocene ligand to the contact resultant was 0.29:1.

Example I-1-3

Substantially the same as the Example I-1, except for the following changes:

The magnesium compound was changed to butoxy magnesium bromide (MgBr(OC4H9)), the chemical treating agent was changed to ZrBr$_4$, the ratio by molar of ZrBr$_4$ to the magnesium compound was 1:30, and the solvent for preparing the contact resultant was changed to pentane.

The nonmetallocene ligand was changed to

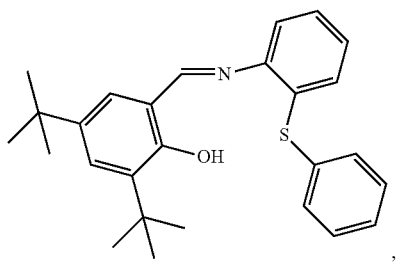 [SMILES: CC(C)(C)c1cc(/C=N/c2ccccc2Sc2ccccc2)c(O)c(C(C)(C)C)c1]

and the solvent for dissolving the nonmetallocene ligand was changed to pentane.

In this example, the concentration by mass of the nonmetallocene ligand was 90 g/L, and the ratio by mass of the nonmetallocene ligand to the contact resultant was 0.48:1.

Example I-1-4

Substantially the same as the Example I-1, except for the following changes:

The magnesium compound was changed to ethoxy magnesium (Mg(OC2H5)2), the chemical treating agent was changed to tetraethyl titanium, the ratio by molar of said tetraethyl titanium to the magnesium compound was 1:25, and the solvent for preparing the contact resultant was changed to dichloro methane.

The nonmetallocene ligand was changed to

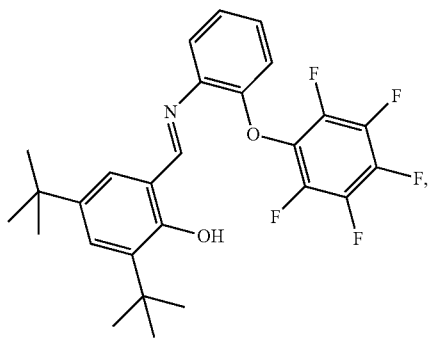 [SMILES: CC(C)(C)c1cc(/C=N/c2ccccc2Oc2c(F)c(F)c(F)c(F)c2F)c(O)c(C(C)(C)C)c1]

and the solvent for dissolving the nonmetallocene ligand was changed to dichloro methane.

In this example, the concentration by mass of the nonmetallocene ligand was 214 g/L, and the ratio by mass of the nonmetallocene ligand to the contact resultant was 0.15:1.

Upon finish of the reaction, the resultant was directly dried at 25° C. under vacuum without being subjected to a filtration.

Example I-1-5

Substantially the same as the Example I-1, except for the following changes:

The magnesium compound was changed to isobutoxy magnesium (Mg(i-OC4H9)2), the chemical treating agent was changed to tetrabutyl titanium (Ti(C$_4$H$_9$)$_4$), the ratio by molar of said tetrabutyl titanium to the magnesium compound was 1:7.5, and the solvent for preparing the contact resultant was changed to xylene.

The nonmetallocene ligand was changed to

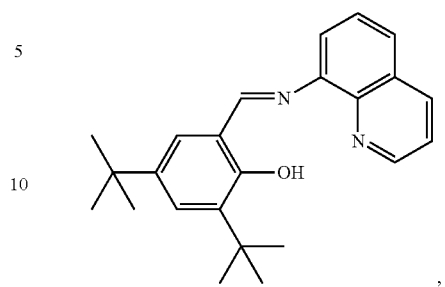

and the solvent for dissolving the nonmetallocene ligand was changed to xylene.

Example I-1-6

Substantially the same as the Example I-1, except for the following changes:

The magnesium compound was changed to ethyl magnesium (Mg(C2H5)2), the chemical treating agent was changed to tributyl titanium chloride (TiCl(C$_4$H$_9$)$_3$), the ratio by molar of said chemical treating agent to the magnesium compound was 1:20, and the solvent for preparing the contact resultant was changed to cyclohexane.

The nonmetallocene ligand was changed to

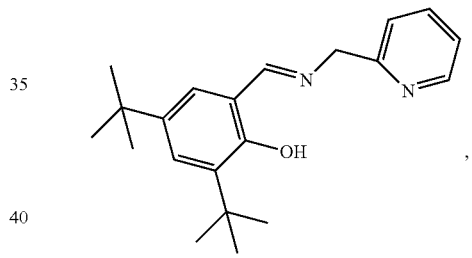

and the solvent for dissolving the nonmetallocene ligand was changed to cyclohexane.

Example I-1-7

Substantially the same as the Example I-1, except for the following changes:

The magnesium compound was changed to isobutyl magnesium (Mg(i-C4H9)2), the chemical treating agent was changed to tetra isobutoxy titanium (Ti(i-C$_4$H$_9$)$_4$), and the solvent for preparing the contact resultant was changed to methyl cyclohexane.

The nonmetallocene ligand was changed to

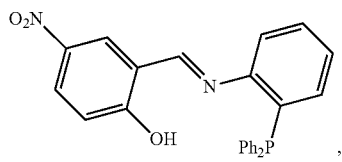

and the solvent for dissolving the nonmetallocene ligand was changed to methyl cyclohexane.

Example I-1-8

Substantially the same as the Example I-1, except for the following changes:

The magnesium compound was changed to ethyl magnesium chloride (Mg(C$_2$H$_5$)Cl), the chemical treating agent was changed to triisobutoxy ethyl zirconium (Zr(CH$_3$CH$_2$)(i-C$_4$H$_9$)$_3$), and the solvent for preparing the contact resultant was changed to chloro hexane.

The nonmetallocene ligand was changed to

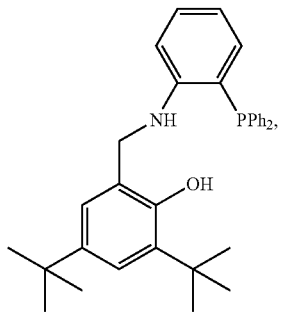

and the solvent for dissolving the nonmetallocene ligand was changed to chloro hexane.

Example I-1-9

Substantially the same as the Example I-1, except for the following changes:

The magnesium compound was changed to butyl magnesium chloride (Mg(C$_4$H$_9$)Cl), the chemical treating agent was changed to diethoxy titanium dichloride (TiCl$_2$(OCH$_3$CH$_2$)$_2$), and the solvent for preparing the contact resultant was changed to chloro toluene.

The nonmetallocene ligand was changed to

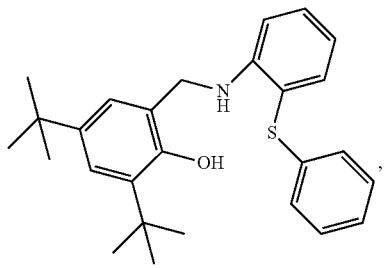

and the solvent for dissolving the nonmetallocene ligand was changed to chloro toluene.

Example I-1-10

Substantially the same as the Example I-1, except for the following changes:

The magnesium compound was changed to butyl ethoxy magnesium (Mg(OC$_2$H$_5$)(C$_4$H$_9$)).

The nonmetallocene ligand was changed to

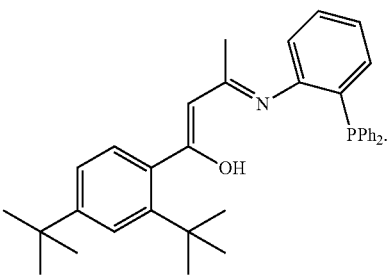

Example I-1-11

Substantially the same as the Example I-1, except for the following changes:

The magnesium compound was changed to a combination of magnesium chloride (MgCl$_2$) and ethoxy magnesium (Mg(OC$_2$H$_5$)$_2$) at a ratio by molar of 1:2.

The nonmetallocene ligand was changed to

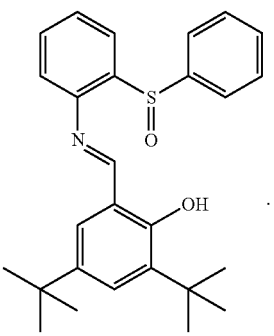 [SMILES: CC(C)(C)c1cc(/C=N/c2ccccc2S(=O)c2ccccc2)c(O)c(C(C)(C)C)c1 ; "."]

Example I-1-12

Substantially the same as the Example I-1, except for the following changes:

The magnesium compound was changed to a combination of ethoxy magnesium (Mg(OC$_2$H$_5$)$_2$) and butyl magnesium (Mg(C$_4$H$_9$)$_2$) at a ratio by molar of 0.5:1.

The nonmetallocene ligand was changed to

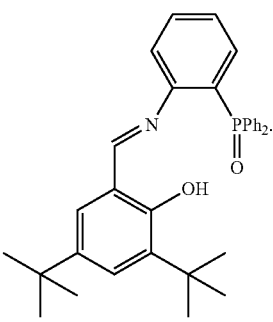

Example I-1-13

Substantially the same as the Example I-1, except for the following changes:

The magnesium compound was changed to a combination of magnesium chloride (MgCl$_2$) and magnesium bromide (MgBr$_2$) at a ratio by molar of 1:4.

The nonmetallocene ligand was changed to

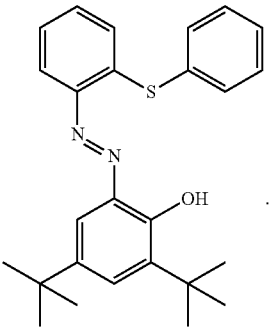 [SMILES: CC(C)(C)c1cc(/N=N/c2ccccc2Sc2ccccc2)c(O)c(C(C)(C)C)c1 ; "."]

Example I-1-14

Substantially the same as the Example I-1, except for the following changes:

The magnesium compound was changed to a combination of ethoxy magnesium chloride (Mg(OC$_2$H$_5$)Cl) and ethyl butoxy magnesium (Mg(C$_2$H$_5$)(OC$_4$H$_9$)) at a ratio by molar of 0.5:1.

The nonmetallocene ligand was changed to

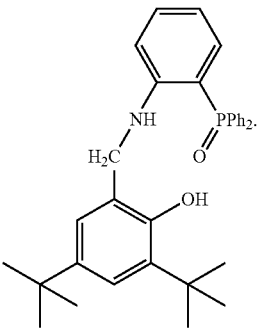

Reference Example I-1-1

Substantially the same as the Example I-1, except for the following changes:

The ratio by mass of the nonmetallocene ligand to the contact resultant was 0.30:1.

The catalyst obtained was named as CAT-I-A, in which the content by mass of Ti was 7.9%, and the content by mass of Mg was 12.3%.

As can be seen from this Reference Example, the same process was used for producing the contact resultant while the respective content of Ti and Mg in the resultant supported catalyst was reduced, which was achieved by increasing the load of the supported nonmetallocene catalyst as a result of an increased amount of the nonmetallocene ligand introduced. The result indicates that by using the process according to this invention, it is possible to freely adjust the load of the nonmetallocene ligand on the magnesium compound, from low to high.

Reference Example I-1-2

Substantially the same as the Example I-1, except for the following changes:

The ratio by molar of TiCl4 to the magnesium compound was 1:1.

The catalyst obtained was named as CAT-I-B, in which the content by mass of Ti was 9.7%, and the content by mass of Mg was 11.6%.

As can be seen from this Reference Example, at the same amount of the nonmetallocene ligand introduced, the polymerization activity of the magnesium compound-supported nonmetallocene catalyst can be increased by increasing the content of Ti and decreasing the content of Mg therein, which indicates that by using the process according to this invention, it is possible to freely adjust (preferably, to a high degree) the polymerization activity of the resultant magnesium compound-supported nonmetallocene catalyst by altering the amount of the chemical treating agent to be used.

Example I-2

In the following examples, a composite chemical treating agent was used, which referred to the combination of a chemical treating agent and a pre-treating agent.

Anhydrous MgCl2 was used as the magnesium compound. The composite chemical treating agent was a combination of TiCl4 (as the chemical treating agent) and triethyl aluminum (as the pre-treating agent).

5 g of the anhydrous magnesium chloride was weighted, and 25 ml hexane was added thereto so as to have the magnesium chloride dispersed therein. Then, a solution of triethyl aluminum in hexane was dropwise added thereto over a period of 15 minutes under stirring, and the reaction continued for 1 hour. The resultant was then filtered, and washed by hexane for 1 time, so as to obtain a pre-treated magnesium compound. Then, TiCl4 was dropwise added thereto over a period of 30 minutes under stirring, and the reaction continued for 2 hours at 60° C. The resultant was then filtered, washed by hexane for 3 times (25 ml per time), and dried at 25° C. for 6 hours, so as to obtain a contact resultant.

In this step, the ratio by molar of the chemical treating agent to the magnesium compound was 1:2, and the ratio by molar of the magnesium compound to the pre-treating agent was 1:1.

A nonmetallocene ligand of the structure

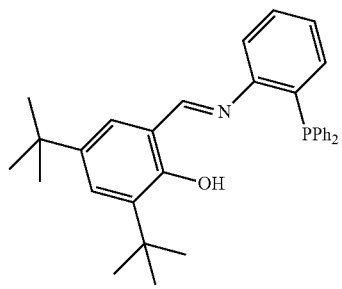

was dissolved in hexane (as the solvent for dissolving the nonmetallocene ligand), then the contact resultant was added thereto under stirring, and the reaction continued for 4 hours. After filtrated, washed by hexane for 2 times (25 ml per time), and dried at 25° C. for 6 hours, a magnesium compound-supported nonmetallocene catalyst was obtained.

In this step, the concentration by mass of the nonmetallocene ligand was 100 g/L, and the ratio by mass of the nonmetallocene ligand to the contact resultant was 0.11 to 1.

The catalyst obtained was named as CAT-I-2.

Example I-2-1

Substantially the same as the Example I-2, except for the following changes:

Magnesium bromide (MgBr$_2$) was used as the magnesium compound. The composite chemical treating agent was a combination of TiCl4 (as the chemical treating agent) and methyl aluminoxane (as the pre-treating agent).

A solution of methyl aluminoxane in toluene was dropwise added under stirring over a period of 15 minutes to react for 2 hours. The resultant was filtered, and washed by toluene for 1 time. Then, TiCl4 was dropwise added over a period of 30 minutes under stirring, and the reaction continued for 0.5 hour at 105° C. The resultant was filtered, and washed by toluene for 2 times.

In this step, the ratio by molar of the chemical treating agent to the magnesium compound was 1:4.5, and the ratio by molar of the magnesium compound to the pre-treating agent was 1:1.8.

The nonmetallocene ligand was changed to

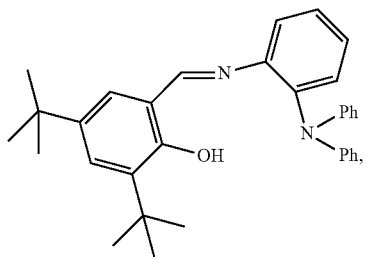 [SMILES: CC(C)(C)c1cc(/C=N/c2ccccc2N(c2ccccc2)c2ccccc2)c(O)c(C(C)(C)C)c1]

and the solvent for dissolving the nonmetallocene ligand was changed to toluene.

In this step, the concentration by mass of the nonmetallocene ligand was 50 g/L, and the ratio by mass of the nonmetallocene ligand to the contact resultant was 0.22 to 1.

Example I-2-2

Substantially the same as the Example I-2, except for the following changes:

Ethoxy magnesium chloride (MgCl(OC$_2$H$_5$)) was used as the magnesium compound. The composite chemical treating agent was a combination of ZrCl4 (as the chemical treating agent) and triethyl aluminum (as the pre-treating agent).

A solution of triethyl aluminum in heptane was dropwise added under stirring over a period of 15 minutes to react for 2 hours. The resultant was filtered, and washed by heptane for 2 times. Then, a solution of ZrCl4 in toluene was dropwise added under stirring over a period of 30 minutes, and the reaction continued for 4 hours at 100° C. The resultant was filtered, and washed by heptane for 1 time.

In this step, the ratio by molar of the chemical treating agent to the magnesium compound was 1:5, and the ratio by molar of the magnesium compound to the pre-treating agent was 1:1.

The nonmetallocene ligand was changed to

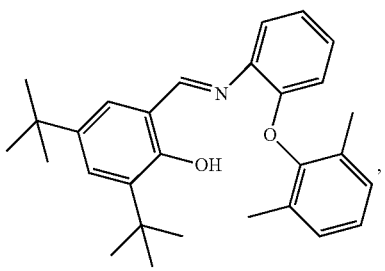

and the solvent for dissolving the nonmetallocene ligand was changed to heptane.

In this step, the concentration by mass of the nonmetallocene ligand was 170 g/L, and the ratio by mass of the nonmetallocene ligand to the contact resultant was 0.29 to 1.

Example I-2-3

Substantially the same as the Example I-2, except for the following changes:

The composite chemical treating agent was a combination of TiBr4 (as the chemical treating agent) and triethyl aluminum (as the pre-treating agent).

A solution of triethyl aluminum in decane was dropwise added under stirring over a period of 15 minutes to react for 1 hour. Then, a solution of TiBr4 in decane was dropwise added under stirring over a period of 30 minutes, and the reaction continued for 1 hour at 110° C. The resultant was filtered, and washed by decane for 1 time.

In this step, the ratio by molar of the chemical treating agent to the magnesium compound was 1:25.

The nonmetallocene ligand was changed to

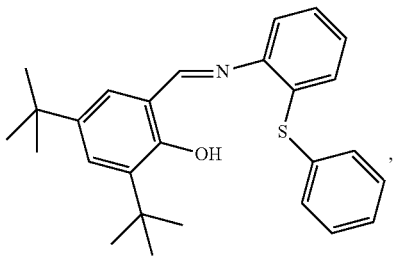 [SMILES: CC(C)(C)c1cc(/C=N/c2ccccc2Sc2ccccc2)c(O)c(C(C)(C)C)c1 ; ","]

and the solvent for dissolving the nonmetallocene ligand was changed to decane.

In this step, the concentration by mass of the nonmetallocene ligand was 79 g/L, and the ratio by mass of the nonmetallocene ligand to the contact resultant was 0.48 to 1.

Example I-2-4

Substantially the same as the Example I-2, except for the following changes:

The composite chemical treating agent was a combination of ZrBr4 (as the chemical treating agent) and triisobutyl aluminum (as the pre-treating agent).

A solution of triisobutyl aluminum in pentane was dropwise added under stirring over a period of 15 minutes to react for 1 hour. Then, a solution of ZrBr4 in pentane was dropwise added under stirring over a period of 30 minutes, and the reaction continued for 8 hours at 30° C. The resultant was filtered, and washed by pentane.

In this step, the ratio by molar of the chemical treating agent to the magnesium compound was 1:50, and the ratio by molar of the magnesium compound to the pre-treating agent was 1:6.

The nonmetallocene ligand was changed to

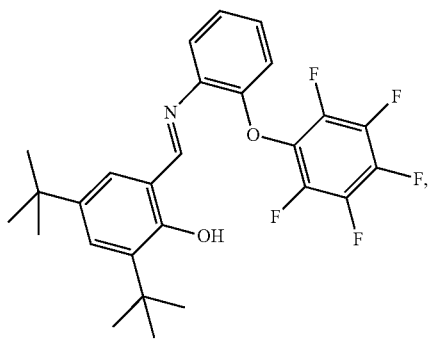 [SMILES: CC(C)(C)c1cc(/C=N/c2ccccc2Oc2c(F)c(F)c(F)c(F)c2F)c(O)c(C(C)(C)C)c1]

and the solvent for dissolving the nonmetallocene ligand was changed to dichloro methane.

In this step, the concentration by mass of the nonmetallocene ligand was 214 g/L, and the ratio by mass of the nonmetallocene ligand to the contact resultant was 0.15 to 1.

The drying is conducted by directly drying under vacuum.

Example I-2-5

Substantially the same as the Example I-2, except for the following changes:

Ethoxy magnesium was used as the magnesium compound. The composite chemical treating agent was a combination of TiCl4 (as the chemical treating agent) and trimethyl aluminum (as the pre-treating agent).

The washing was conducted by using ethyl benzene.

In this step, the ratio by molar of the chemical treating agent to the magnesium compound was 1:35, and the ratio by molar of the magnesium compound to the pre-treating agent was 1:1.2.

The nonmetallocene ligand was changed to

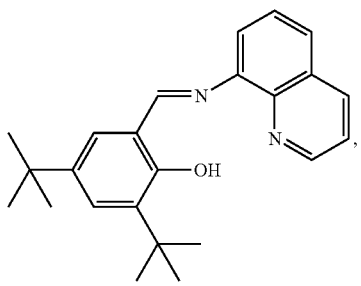

and the solvent for dissolving the nonmetallocene ligand was changed to ethyl benzene.

Example I-2-6

Substantially the same as the Example I-2, except for the following changes:

Isobutoxy magnesium (Mg(i-OC4H9)2) was used as the magnesium compound. The composite chemical treating agent was a combination of TiCl4 (as the chemical treating agent) and triethoxy aluminum (as the pre-treating agent).

In this step, the ratio by molar of the chemical treating agent to the magnesium compound was 1:14, and the ratio by molar of the magnesium compound to the pre-treating agent was 1:4.

The nonmetallocene ligand was changed to

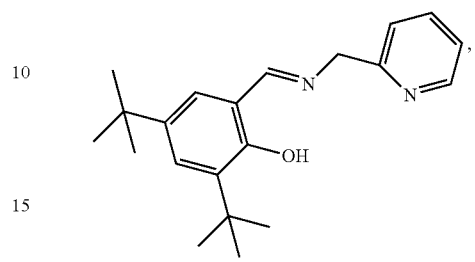

and the solvent for dissolving the nonmetallocene ligand was changed to cyclohexane.

Example I-2-7

Substantially the same as the Example I-2, except for the following changes:

Ethyl magnesium chloride (Mg(C2H5)Cl) was used as the magnesium compound. The composite chemical treating agent was a combination of TiCl4 (as the chemical treating agent) and isobutyl aluminoxane (as the pre-treating agent).

The nonmetallocene ligand was changed to

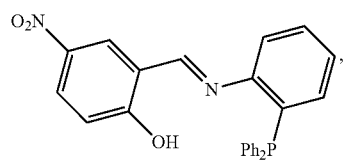

and the solvent for dissolving the nonmetallocene ligand was changed to methyl cyclohexane.

Example I-2-8

Substantially the same as the Example I-2, except for the following changes:

Butyl ethoxy magnesium (Mg(OC2H5)(C4H9)) was used as the magnesium compound.

The nonmetallocene ligand was changed to

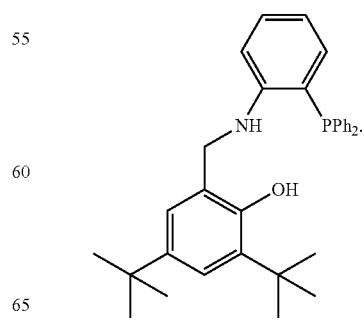

Example I-2-9

Substantially the same as the Example I-2, except for the following changes:

Butyl magnesium chloride (Mg(C₄H₉)Cl) was used as the magnesium compound.

The nonmetallocene ligand was changed to

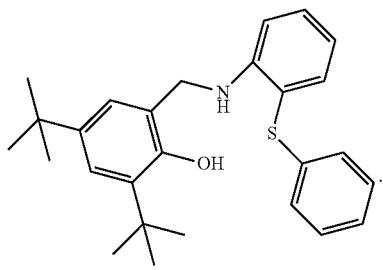 [SMILES: CC(C)(C)c1cc(CNc2ccccc2Sc2ccccc2)c(O)c(C(C)(C)C)c1]

Example I-2-10

Substantially the same as the Example I-2, except for the following changes:

A mixture of MgCl2 and ethoxy magnesium (Mg(OC₂H₅)₂) at a molar ratio of 1:2 was used as the magnesium compound.

The nonmetallocene ligand was changed to

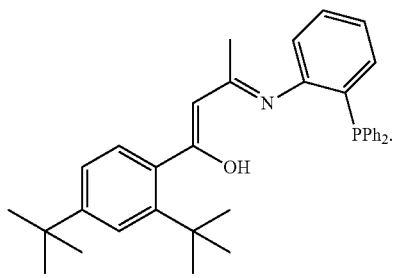

Example I-3

5 g of anhydrous magnesium chloride (as the magnesium compound) was weighted, and a mixed solvent of tetrahydrofuran and ethanol (as the alcohol) was added thereto. The mixture was heated to 60° C. under stirring for 1.5 hours to form a solution. Then, hexane (as the precipitating agent) was added thereto to precipitate the solid. The resultant was filtered, washed for 1 time by 25 ml hexane, and dried under vacuum at a temperature of 80° C. so as to obtain a modified magnesium compound.

50 ml of hexane was added to the modified magnesium compound. Then, TiCl4 (as the chemical treating agent) was dropwise added thereto over a period of 30 minutes under stirring, and was reacted for 4 hours at 60. The resultant was then filtered, washed by hexane for 3 times (25 ml per time), and dried at 90° C. for 2 hours, so as to obtain a contact resultant.

A nonmetallocene ligand of the structure

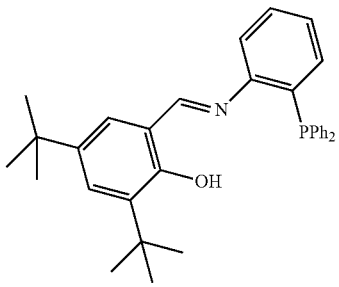

was dissolved in hexane (as the solvent for dissolving the nonmetallocene ligand), then the contact resultant was added thereto under stirring, and the reaction continued for 4 hours. After filtrated, washed by hexane for 2 times (25 ml per time), and dried at 25° C. for 2 hours, a magnesium compound-supported nonmetallocene catalyst was obtained.

In this example, the ratio by molar of the magnesium compound to tetrahydrofuran was 1:12, the ratio by molar of the magnesium compound to the alcohol was 1:4, the ratio by volume of the precipitating agent to tetrahydrofuran was 1:1.25, the ratio by molar of the chemical treating agent to the magnesium compound was 1:2, the concentration by mass of the nonmetallocene ligand was 100 g/L, and the ratio by mass of the nonmetallocene ligand to the contact resultant was 0.11:1.

The catalyst obtained was named as CAT-I-3.

Example I-3-1

Substantially the same as the Example I-3, except for the following changes:

The magnesium compound was changed to magnesium bromide, the alcohol was changed to propanol, the chemical treating agent was changed to TiBr4, and the precipitating agent was changed to decane. Then, the washing was performed by using decane for 2 times.

The nonmetallocene ligand was changed to

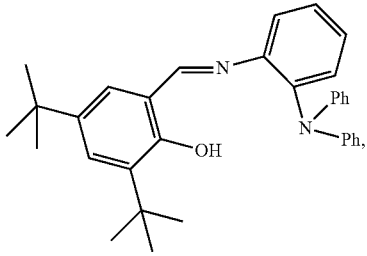 [SMILES: CC(C)(C)c1cc(/C=N/c2ccccc2N(c2ccccc2)c2ccccc2)c(O)c(C(C)(C)C)c1]

and the solvent for dissolving the nonmetallocene ligand was changed to decane.

In this example, the ratio by molar of the magnesium compound to tetrahydrofuran was 1:20, the ratio by molar of the magnesium compound to the alcohol was 1:3, the ratio by volume of the precipitating agent to tetrahydrofuran was 1:2, the ratio by molar of the chemical treating agent to the magnesium compound was 1:4.5, the concentration by mass of the nonmetallocene ligand was 50 g/L, and the ratio by mass of the nonmetallocene ligand to the contact resultant was 0.22:1.

Example I-3-2

Substantially the same as the Example I-3, except for the following changes:

The magnesium compound was changed to ethoxy magnesium chloride (MgCl(OC$_2$H$_5$)), the alcohol was changed to butanol, and the precipitating agent was changed to pentane. Then, the washing was performed by using pentane for 3 times.

The chemical treating agent was changed to ZrCl4, which was previously dissolved in toluene.

The nonmetallocene ligand was changed to

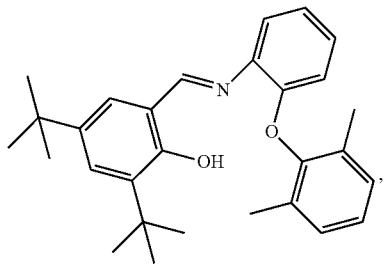

and the solvent for dissolving the nonmetallocene ligand was changed to toluene.

In this example, the ratio by molar of the magnesium compound to tetrahydrofuran was 1:20, the ratio by molar of the magnesium compound to the alcohol was 1:6, the ratio by volume of the precipitating agent to tetrahydrofuran was 1:4, the ratio by molar of the chemical treating agent to the magnesium compound (on the basis of Mg) was 1:1, the concentration by mass of the nonmetallocene ligand was 170 g/L, and the ratio by molar of the nonmetallocene ligand to the contact resultant was 0.29:1.

Example I-3-3

Substantially the same as the Example I-3, except for the following changes:

The magnesium compound was changed to butoxy magnesium bromide (MgBr(OC$_4$H$_9$)), the alcohol was changed to hexanol, and the precipitating agent was changed to cyclohexane. Then, the washing was performed by using cyclohexane.

The chemical treating agent was changed to ZrBr4.

The nonmetallocene ligand was changed to

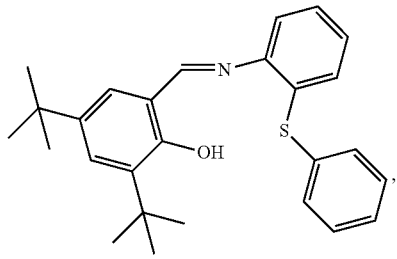 [SMILES: CC(C)(C)c1cc(/C=N/c2ccccc2Sc2ccccc2)c(O)c(C(C)(C)C)c1]

and the solvent for dissolving the nonmetallocene ligand was changed to cyclohexane.

In this example, the ratio by molar of the magnesium compound to tetrahydrofuran was 1:14, the ratio by molar of the magnesium compound to the alcohol was 1:15, the ratio by volume of the precipitating agent to tetrahydrofuran was 1:6, the ratio by molar of the chemical treating agent to the magnesium compound (on the basis of Mg) was 1:30, the concentration by mass of the nonmetallocene ligand was 79 g/L, and the ratio by molar of the nonmetallocene ligand to the contact resultant was 0.48:1.

Example I-3-4

Substantially the same as the Example I-3, except for the following changes:

The magnesium compound was changed to ethoxy magnesium (Mg(OC2H5)2), the ratio by molar of the magnesium compound to tetrahydrofuran was 1:10, the alcohol was changed to heptanol, the ratio by molar of the magnesium compound to the alcohol was 1:6.3, the chemical treating agent was changed to tetraethyl titanium, the ratio by molar of said tetraethyl titanium to the magnesium compound was 1:25, and the solvent for preparing the contact resultant was changed to dichloro methane.

The nonmetallocene ligand was changed to

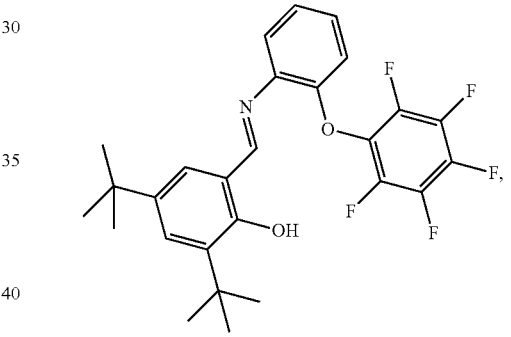

and the solvent for dissolving the nonmetallocene ligand was changed to dichloro methane.

In this example, the concentration by mass of the nonmetallocene ligand was 214 g/L, and the ratio by mass of the nonmetallocene ligand to the contact resultant was 0.15:1.

Upon finish of the reaction, the resultant was directly dried at 25° C. under vacuum without being subjected to a filtration.

Example I-3-5

Substantially the same as the Example I-3, except for the following changes:

The magnesium compound was changed to isobutoxy magnesium (Mg(i-OC4H9)2), the ratio by molar of the magnesium compound to tetrahydrofuran was 1:25, the alcohol was changed to cyclohexanol, the chemical treating agent was changed to tetrabutyl titanium (Ti(C$_4$H$_9$)$_4$), the ratio by molar of said tetrabutyl titanium to the magnesium compound was 1:7.5, and the solvent for preparing the contact resultant was changed to xylene.

The nonmetallocene ligand was changed to

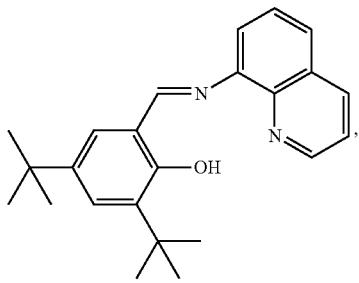 [SMILES: CC(C)(C)c1cc(/C=N/c2cccc3cccnc23)c(O)c(C(C)(C)C)c1]

and the solvent for dissolving the nonmetallocene ligand was changed to xylene.

Example I-3-6

Substantially the same as the Example I-3, except for the following changes:
The magnesium compound was changed to ethyl magnesium (Mg(C2H5)2), the alcohol was changed to phenyl butanol, the chemical treating agent was changed to tributyl titanium chloride (TiCl($C_4H_9$)$_3$), the ratio by molar of said chemical treating agent to the magnesium compound was 1:20, and the precipitating agent was changed to cyclohexane. Then, the washing was performed by using cyclohexane.
The nonmetallocene ligand was changed to

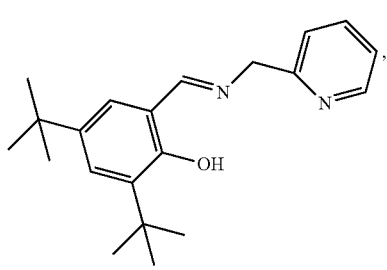 [SMILES: CC(C)(C)c1cc(/C=N/Cc2ccccn2)c(O)c(C(C)(C)C)c1]

and the solvent for dissolving the nonmetallocene ligand was changed to cyclohexane.

Example I-3-7

Substantially the same as the Example I-3, except for the following changes:
The magnesium compound was changed to isobutyl magnesium (Mg(i-C4H9)2), the chemical treating agent was changed to tetra isobutoxy titanium (Ti(i-$C_4H_9$)$_4$), and the solvent for preparing the contact resultant was changed to methyl cyclohexane.
The nonmetallocene ligand was changed to

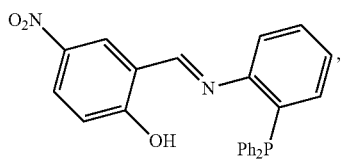

and the solvent for dissolving the nonmetallocene ligand was changed to methyl cyclohexane.

Example I-3-8

Substantially the same as the Example I-3, except for the following changes:
The magnesium compound was changed to ethyl magnesium chloride (Mg($C_2H_5$)Cl), the chemical treating agent was changed to triisobutoxy ethyl zirconium (Zr($CH_3CH_2$)(i-$C_4H_9$)$_3$), and the solvent for preparing the contact resultant was changed to chloro hexane.
The nonmetallocene ligand was changed to

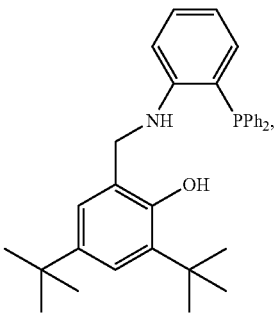

and the solvent for dissolving the nonmetallocene ligand was changed to chloro hexane.

Example I-4

Anhydrous MgCl2 was used as the magnesium compound. The modified magnesium compound was prepared according to Example I-3. The composite chemical treating agent was a combination of TiCl4 (as the chemical treating agent) and triethyl aluminum (as the pre-treating agent).
A solution of triethyl aluminum in hexane (at a concentration of 0.88 mol/L) was dropwise added under stirring to the modified magnesium compound over a period of 15 minutes, and the reaction continued for 1 hour. Then, TiCl4 was dropwise added thereto under stirring over a period of 30 minutes, and the reaction continued for 2 hours at 60° C. The resultant was then filtered, washed by hexane for 3 times (25 ml per time), and dried at 25° C. for 6 hours, so as to obtain a contact resultant.
In this step, the ratio by molar of the chemical treating agent to the magnesium compound was 1:2, and the ratio by molar of the magnesium compound to the pre-treating agent was 1:1.
A nonmetallocene ligand of the structure

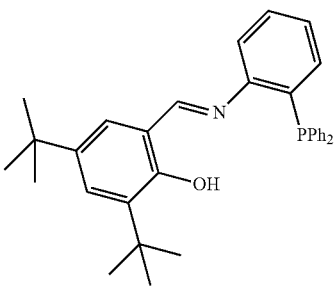

was dissolved in hexane (as the solvent for dissolving the nonmetallocene ligand), then the contact resultant was added thereto under stirring, and the reaction continued for 4 hours.

After filtrated, washed by hexane for 2 times (25 ml per time), and dried at 25° C. for 6 hours, a magnesium compound-supported nonmetallocene catalyst was obtained.

In this step, the concentration by mass of the nonmetallocene ligand was 100 g/L, and the ratio by mass of the nonmetallocene ligand to the contact resultant was 0.11 to 1.

The catalyst obtained was named as CAT-I-4.

Example I-4-1

Substantially the same as the Example I-4, except for the following changes:

The modified magnesium compound was prepared according to Example I-3-1. The composite chemical treating agent was a combination of TiCl4 (as the chemical treating agent) and methyl aluminoxane (as the pre-treating agent).

A solution of methyl aluminoxane in toluene (at a concentration of 10 wt %) was dropwise added under stirring over a period of 15 minutes to react for 4 hours. The resultant was filtered. Then, TiCl4 was dropwise added over a period of 30 minutes under stirring, and the reaction continued for 0.5 hour at 105° C. The resultant was filtered, and washed by decane for 2 times.

In this step, the ratio by molar of the chemical treating agent to the magnesium compound was 1:6, and the ratio by molar of the magnesium compound to the pre-treating agent was 1:2.

The nonmetallocene ligand was changed to

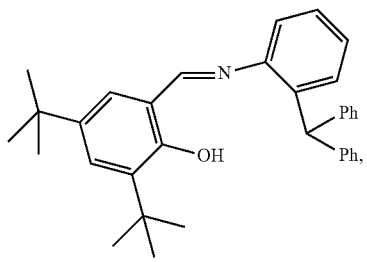

and the solvent for dissolving the nonmetallocene ligand was changed to decane.

In this step, the concentration by mass of the nonmetallocene ligand was 50 g/L, and the ratio by mass of the nonmetallocene ligand to the contact resultant was 0.22 to 1.

Example I-4-2

Substantially the same as the Example I-4, except for the following changes:

The modified magnesium compound was prepared according to Example I-3-2. The composite chemical treating agent was a combination of ZrCl4 (as the chemical treating agent) and triethyl aluminum (as the pre-treating agent).

A solution of triethyl aluminum in toluene was dropwise added under stirring over a period of 15 minutes to react for 2 hours. The resultant was filtered, and washed by toluene for 1 time. Then, a solution of ZrCl4 in toluene was dropwise added under stirring over a period of 30 minutes, and the reaction continued for 4 hours at 100° C. The resultant was filtered, and washed by toluene.

In this step, the ratio by molar of the chemical treating agent to the magnesium compound was 1:25, and the ratio by molar of the magnesium compound to the pre-treating agent was 1:0.5.

The nonmetallocene ligand was changed to

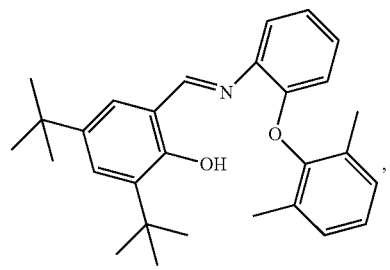

and the solvent for dissolving the nonmetallocene ligand was changed to toluene.

In this step, the concentration by mass of the nonmetallocene ligand was 170 g/L, and the ratio by mass of the nonmetallocene ligand to the contact resultant was 0.29 to 1.

Example I-4-3

Substantially the same as the Example I-4, except for the following changes:

The modified magnesium compound was prepared according to Example I-3-3. The precipitating agent was changed to cyclohexane. Then, the washing was performed by using cyclohexane. The composite chemical treating agent was a combination of TiBr4 (as the chemical treating agent) and triethyl aluminum (as the pre-treating agent).

A solution of triethyl aluminum in decane was dropwise added under stirring over a period of 15 minutes to react for 1 hour. Then, a solution of TiBr4 in decane was dropwise added under stirring over a period of 30 minutes, and the reaction continued for 1 hour at 110° C. The resultant was filtered, and washed by decane for 4 times.

In this step, the ratio by molar of the chemical treating agent to the magnesium compound was 1:35, and the ratio by molar of the magnesium compound to the pre-treating agent was 1:6.

The nonmetallocene ligand was changed to

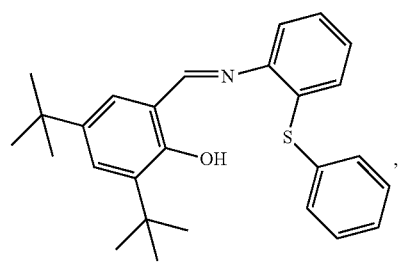

and the solvent for dissolving the nonmetallocene ligand was changed to decane.

In this step, the concentration by mass of the nonmetallocene ligand was 79 g/L, and the ratio by mass of the nonmetallocene ligand to the contact resultant was 0.48 to 1.

Example I-4-4

Substantially the same as the Example I-4, except for the following changes:

The modified magnesium compound was prepared according to Example I-3-4. The composite chemical treating agent was a combination of TiCl4 (as the chemical treating agent) and trimethyl aluminum (as the pre-treating agent).

A solution of trimethyl aluminum in pentane was dropwise added under stirring over a period of 15 minutes to react for 1 hour. Then, a solution of TiCl4 in pentane was dropwise added under stirring over a period of 30 minutes, and the reaction continued for 8 hours at 30° C. The resultant was filtered, and washed by dichloro methane.

In this step, the ratio by molar of the chemical treating agent to the magnesium compound was 1:12, and the ratio by molar of the magnesium compound to the pre-treating agent was 1:3.

The nonmetallocene ligand was changed to

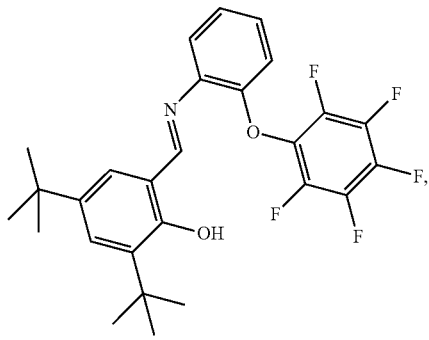 [SMILES: CC(C)(C)c1cc(/C=N/c2ccccc2Oc2c(F)c(F)c(F)c(F)c2F)c(O)c(C(C)(C)C)c1]

and the solvent for dissolving the nonmetallocene ligand was changed to dichloro methane.

In this step, the concentration by mass of the nonmetallocene ligand was 214 g/L, and the ratio by mass of the nonmetallocene ligand to the contact resultant was 0.15 to 1.

Upon finish of the reaction, the resultant was directly dried at 25° C. under vacuum without being subjected to a filtration.

Example I-4-5

Substantially the same as the Example I-4, except for the following changes:

The modified magnesium compound was prepared according to Example I-3-5. The composite chemical treating agent was a combination of ZrBr4 (as the chemical treating agent) and triisobutyl aluminum (as the pre-treating agent).

Triisobutyl aluminum was dropwise added under stirring over a period of 15 minutes to react for 1 hour. Then, a solution of ZrBr4 in xylene was dropwise added under stirring over a period of 30 minutes, and the reaction continued for 8 hours at 50° C. The resultant was filtered, and washed by xylene.

In this step, the ratio by molar of the chemical treating agent to the magnesium compound was 1:45, and the ratio by molar of the magnesium compound to the pre-treating agent was 1:1.4.

The nonmetallocene ligand was changed to

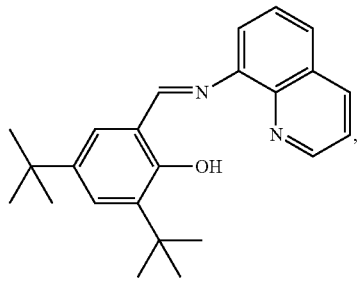

and the solvent for dissolving the nonmetallocene ligand was changed to xylene.

Example I-4-6

Substantially the same as the Example I-4, except for the following changes:

The modified magnesium compound was prepared according to Example I-3-6. The composite chemical treating agent was a combination of TiCl4 (as the chemical treating agent) and triethoxy aluminum (as the pre-treating agent).

In this step, the ratio by molar of the chemical treating agent to the magnesium compound was 1:60, and the ratio by molar of the magnesium compound to the pre-treating agent was 1:5.7.

The nonmetallocene ligand was changed to

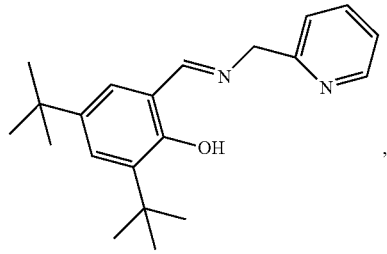 [SMILES: CC(C)(C)c1cc(/C=N/Cc2ccccn2)c(O)c(C(C)(C)C)c1 ; ","]

and the solvent for dissolving the nonmetallocene ligand was changed to cyclohexane.

Example I-4-7

Substantially the same as the Example I-4, except for the following changes:

The modified magnesium compound was prepared according to Example I-3-7. The composite chemical treating agent was a combination of TiCl4 (as the chemical treating agent) and isobutyl aluminoxane (as the pre-treating agent).

The nonmetallocene ligand was changed to

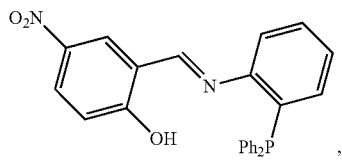

and the solvent for dissolving the nonmetallocene ligand was changed to methyl cyclohexane.

Example I-4-8

Substantially the same as the Example I-4, except for the following changes:
The modified magnesium compound was prepared according to Example I-3-8, and the solvent for preparing the contact resultant was changed to chloro hexane.
The nonmetallocene ligand was changed to

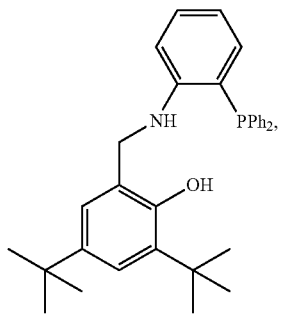

and the solvent for dissolving the nonmetallocene ligand was changed to chloro hexane.

Example I-5

Application

The catalysts CAT-I-1, CAT-I-2, CAT-I-3, and CAT-I-4 produced according to the Examples and the catalysts CAT-I-A and CAT-I-B produced according to the Reference Examples were each used for ethylene homopolymerization under the following conditions, in combination with methyl aluminoxane or triethyl aluminum as the co-catalyst, so as to investigate the influences of the change of the amount (ratio by molar of Al to Ti) or type of the co-catalyst to be used on the polymerization activity of the catalyst and the bulk density of the resultant polymer, which were listed in the following Table I-1.
Reactor: 2 L autoclave for polymerization;
Polymerization method: slurry polymerization;
Conditions: hexane as the solvent for polymerization, the total polymerization pressure of 0.8 MPa, the polymerization temperature of 85, the partial pressure of hydrogen gas of 0.2 MPa, and the polymerization time of 2 hours.

TABLE I-1

| No. | Catalyst No. | Co-catalyst | Ratio by molar of Al to Ti | Poly activity (kgPE/gCat) | Bulk density (g/cm³) |
|---|---|---|---|---|---|
| 1 | CAT-I-1 | triethyl aluminum | 90 | 4.34 | 0.274 |
| 2 | CAT-I-1 | triethyl aluminum | 500 | 4.47 | 0.275 |
| 3 | CAT-I-1 | methyl aluminoxane | 140 | 4.81 | 0.292 |
| 4 | CAT-I-1 | methyl aluminoxane | 500 | 4.93 | 0.294 |
| 5 | CAT-I-A | triethyl aluminum | 90 | 4.77 | 0.277 |
| 6 | CAT-I-B | triethyl aluminum | 90 | 6.42 | 0.313 |

TABLE I-1-continued

| No. | Catalyst No. | Co-catalyst | Ratio by molar of Al to Ti | Poly activity (kgPE/gCat) | Bulk density (g/cm³) |
|---|---|---|---|---|---|
| 7 | CAT-I-2 | triethyl aluminum | 90 | 6.79 | 0.334 |
| 8 | CAT-I-2 | methyl aluminoxane | 140 | 7.21 | 0.342 |
| 9 | CAT-I-3 | triethyl aluminum | 90 | 13.40 | 0.365 |
| 10 | CAT-I-3 | methyl aluminoxane | 140 | 14.16 | 0.350 |
| 11 | CAT-I-4 | triethyl aluminum | 90 | 15.93 | 0.352 |
| 12 | CAT-I-4 | methyl aluminoxane | 140 | 16.83 | 0.333 |

As can be seen from a comparison of the results obtained with the experiment Nos. 1 and 2 (or 3 and 4) in the Table I-1, when the amount of the co-catalyst to be used was increased, i.e., the ratio by molar of aluminum to titanium was increased, the polymerization activity of the magnesium compound-supported nonmetallocene catalyst and the bulk density of the polymer product did not change to a substantial degree. This fact indicates that, if the magnesium compound-supported nonmetallocene catalyst according to this invention is used for olefin polymerization, to increase the activity for this polymerization, it is not necessary to increase the amount of the co-catalyst to be used, that is, a high polymerization activity can be achieved at a comparatively less amount of the co-catalyst.

Further, as can be seen from a comparison of the results obtained with the experiment Nos. 1 with 5 and 6 in the Table I-1, by increasing the amount of the chemical treating agent or the amount of the nonmetallocene ligand to be used, the polymerization activity of the obtained magnesium compound-supported nonmetallocene catalyst can be increased and the polymer bulk density can be improved as well. This fact indicates that the magnesium compound-supported nonmetallocene catalyst according to this invention is characterized by a freely adjustable polymerization activity, thereby adapting same for different olefin polymerization requirements.

Still further, as can be seen from a comparison of the results obtained with the experiment Nos. 7 and 8 (or 9 and 10, or 11 and 12) in the Table I-1, the type of the co-catalyst to be used dos not significantly influent the polymerization activity of the catalyst and the bulk density of the polymer product. This fact indicates that the catalyst produced according to this invention is comparatively compatible with different types of the co-catalyst to be used.

Example II-1

Anhydrous magnesium chloride was used as the magnesium compound, and TiCl4 was used as the chemical treating agent.
A predetermined amount of the nonmetallocene ligand of the structure

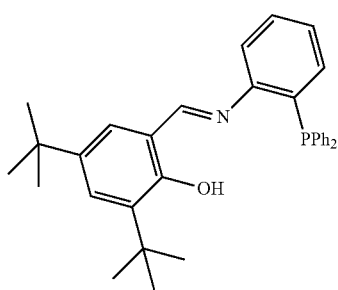

was dissolved in 25 ml dichloro methane (as the solvent for dissolving the nonmetallocene ligand), then 5 g of the anhydrous magnesium chloride was added thereto, and the reaction continued for 4 hours at 30° C. After filtrated, washed by hexane for 2 times (25 ml per time), and vacuum-dried, so as to obtain the contact resultant.

Then, 25 ml hexane was added to the contact resultant. Then, TiCl4 was dropwise added thereto over a period of 15 minutes under stirring, and was reacted for 4 hours at 30. The resultant was then filtered, washed by hexane for 3 times (25 ml per time), and vacuum-dried, so as to obtain the magnesium compound-supported nonmetallocene catalyst.

In this Example, the ratio by molar of the chemical treating agent to the nonmetallocene ligand was 1:0.5, and the ratio by molar of the nonmetallocene ligand to the magnesium compound was 1:5.

The catalyst obtained was named as CAT-II-1.

Example II-1-1

Substantially the same as the Example II-1, except for the following changes:

The magnesium compound was changed to magnesium bromide, the chemical treating agent was changed to ZrCl4.

The nonmetallocene ligand was changed to

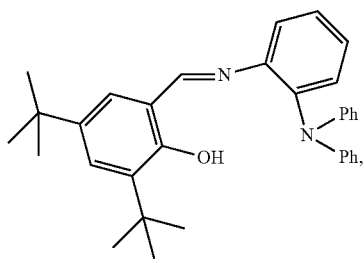 [SMILES: CC(C)(C)c1cc(/C=N/c2ccccc2N(c2ccccc2)c2ccccc2)c(O)c(C(C)(C)C)c1]

and the solvent for dissolving the nonmetallocene ligand was changed to toluene.

Washing was performed with toluene, and then vacuum-drying was conducted.

In this Example, the ratio by molar of the chemical treating agent to the nonmetallocene ligand was 1:0.3, and the ratio by molar of the nonmetallocene ligand to the magnesium compound was 1:3.

Example II-1-2

Substantially the same as the Example II-1, except for the following changes:

The magnesium compound was changed to ethoxy magnesium chloride (MgCl(OC2H5)), the chemical treating agent was changed to Ti(CH2CH3)4.

The nonmetallocene ligand was changed to

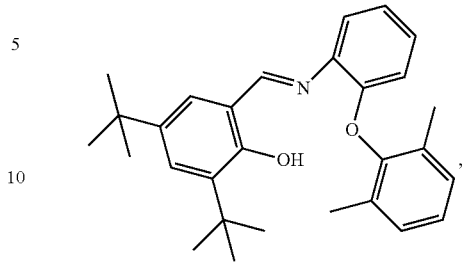

and the solvent for dissolving the nonmetallocene ligand was changed to hexane.

Washing was performed with hexane, and then vacuum-drying was conducted.

In this Example, the ratio by molar of the chemical treating agent to the nonmetallocene ligand was 1:0.9, and the ratio by molar of the nonmetallocene ligand to the magnesium compound was 1:7.

Example II-1-3

Substantially the same as the Example II-1, except for the following changes:

The magnesium compound was changed to butoxy magnesium bromide (MgBr(OC4H9)), the chemical treating agent was changed to tri-isobutyl titanium chloride (TiCl(i-C4H9)3).

The nonmetallocene ligand was changed to

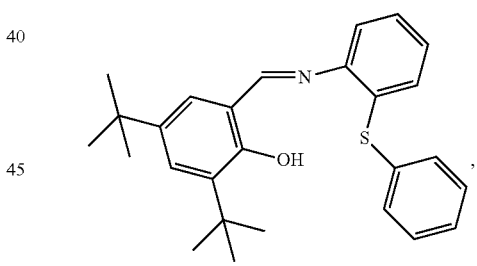

and the solvent for dissolving the nonmetallocene ligand was changed to dichloro methane.

Drying was conducted by a vacuum-drying process, without filtration and washing.

In this Example, the ratio by molar of the chemical treating agent to the nonmetallocene ligand was 1:0.7.

Example II-1-4

Substantially the same as the Example II-1, except for the following changes:

The magnesium compound was changed to ethoxy magnesium (Mg(OC2H5)2).

The nonmetallocene ligand was changed to

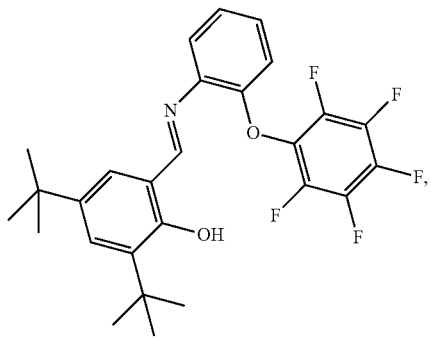 [SMILES: CC(C)(C)c1cc(/C=N/c2ccccc2Oc2c(F)c(F)c(F)c(F)c2F)c(O)c(C(C)(C)C)c1]

and the solvent for dissolving the nonmetallocene ligand was changed to chloro toluene.

Example II-1-5

Substantially the same as the Example II-1, except for the following changes:
The magnesium compound was changed to isobutoxy magnesium (Mg(i-OC4H9)2).
The nonmetallocene ligand was changed to

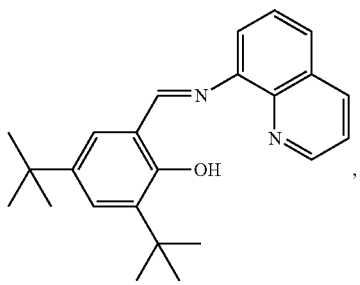

and the solvent for dissolving the nonmetallocene ligand was changed to cyclohexane.

Example II-1-6

Substantially the same as the Example II-1, except for the following changes:
The nonmetallocene ligand was changed to

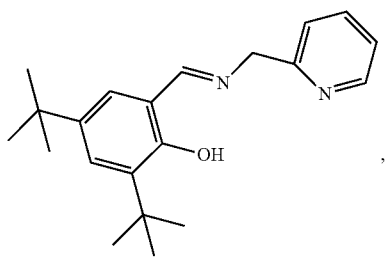

and the solvent for dissolving the nonmetallocene ligand was changed to chloro cyclohexane.

Example II-2

Anhydrous magnesium chloride was used as the magnesium compound, TiCl4 was used as the chemical treating agent, and a compound of the structure

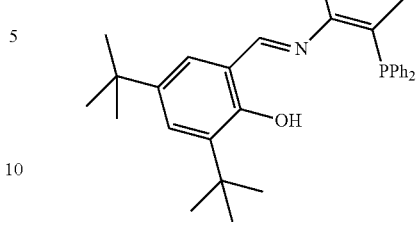

was used as the nonmetallocene ligand.
The modified magnesium compound was prepared according to Example I-3.
A determined amount of the nonmetallocene ligand was dissolved in 25 ml dichloro methane (as the solvent for dissolving the nonmetallocene ligand), then the modified magnesium compound was added thereto, and the reaction continued for 4 hours at 30° C. After filtrated, washed by hexane for 2 times (25 ml per time), and vacuum-dried, so as to obtain the contact resultant.
Then, 25 ml hexane was added to the contact resultant. Then, TiCl4 was dropwise added thereto over a period of 30 minutes under stirring, and was reacted for 4 hours at 30. The resultant was then filtered, washed by hexane for 3 times (25 ml per time), and vacuum-dried, so as to obtain the magnesium compound-supported nonmetallocene catalyst.
In this Example, the ratio by molar of the chemical treating agent to the nonmetallocene ligand was 1:0.5, and the ratio by molar of the nonmetallocene ligand to the magnesium compound was 1:5.
The catalyst obtained was named as CAT-II-2.

Example II-2-1

Substantially the same as the Example II-2, except for the following changes:
The modified magnesium compound was prepared according to Example I-3-1. The chemical treating agent was changed to ZrCl4.
The nonmetallocene ligand was changed to

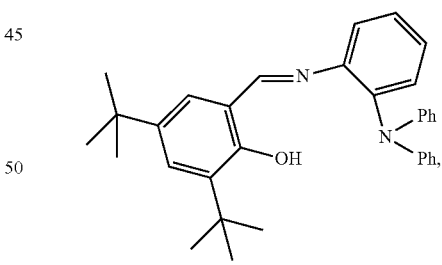

and the solvent for dissolving the nonmetallocene ligand was changed to toluene.
Washing was performed with toluene, and then vacuum-drying was conducted.
In this Example, the ratio by molar of the chemical treating agent to the nonmetallocene ligand was 1:0.3, and the ratio by molar of the nonmetallocene ligand to the magnesium compound was 1:3.

Example II-2-2

Substantially the same as the Example II-2, except for the following changes:

The modified magnesium compound was prepared according to Example I-3-2.

The nonmetallocene ligand was changed to

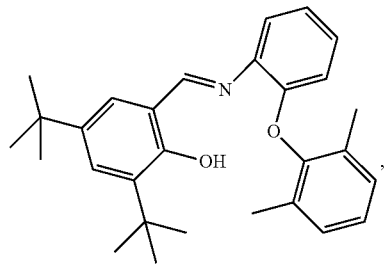

and the solvent for dissolving the nonmetallocene ligand was changed to hexane.

Washing was performed with hexane, and then vacuum-drying was conducted.

In this Example, the ratio by molar of the chemical treating agent to the nonmetallocene ligand was 1:0.9, and the ratio by molar of the nonmetallocene ligand to the magnesium compound was 1:7.

Example II-2-3

Substantially the same as the Example II-2, except for the following changes:

The modified magnesium compound was prepared according to Example I-3-3.

The nonmetallocene ligand was changed to

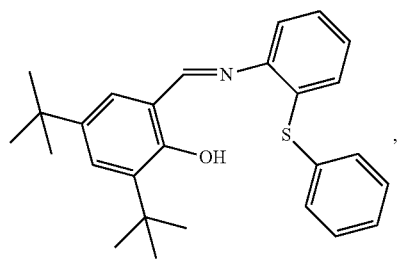

and the solvent for dissolving the nonmetallocene ligand was changed to dichloro methane.

Drying was conducted by a vacuum-drying process, without filtration and washing.

In this Example, the ratio by molar of the chemical treating agent to the nonmetallocene ligand was 1:0.7.

Example II-2-4

Substantially the same as the Example II-2, except for the following changes:

The modified magnesium compound was prepared according to Example I-3-4.

The nonmetallocene ligand was changed to

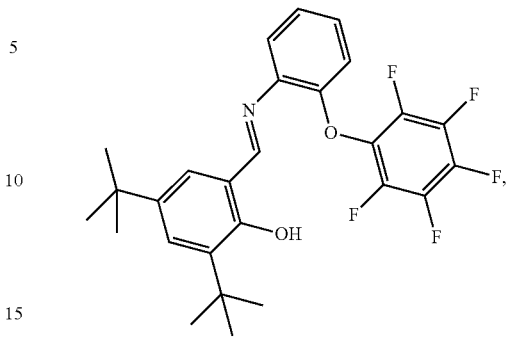

and the solvent for dissolving the nonmetallocene ligand was changed to chloro toluene.

Example II-2-5

Substantially the same as the Example II-2, except for the following changes:

The modified magnesium compound was prepared according to Example I-3-5.

The nonmetallocene ligand was changed to

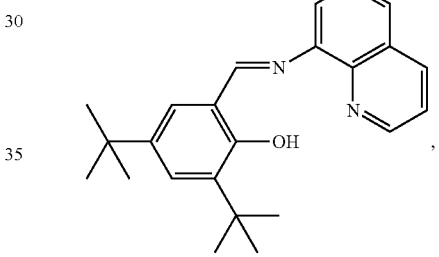

and the solvent for dissolving the nonmetallocene ligand was changed to cyclohexane.

Example II-2-6

Substantially the same as the Example II-2, except for the following changes:

The nonmetallocene ligand was changed to

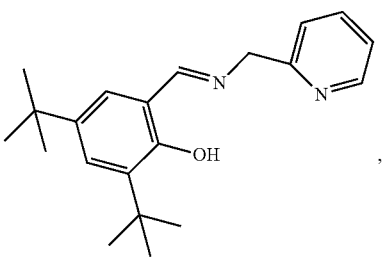

and the solvent for dissolving the nonmetallocene ligand was changed to chloro cyclohexane.

Example II-3

Anhydrous magnesium chloride was used as the magnesium compound, and TiCl4 was used as the chemical treating agent.

5 g of the anhydrous magnesium chloride was weighted, and 25 ml toluene was added thereto. Then, methyl aluminoxane was dropwise added thereto over a period of 15 minutes under stirring, and the reaction continued for 2 hour at 90° C. The resultant was then filtered, washed by toluene for 2 times (25 ml per time), and vacuum-dried at 90° C., so as to obtain a pre-treated magnesium compound.

A predetermined amount of a nonmetallocene ligand of the structure

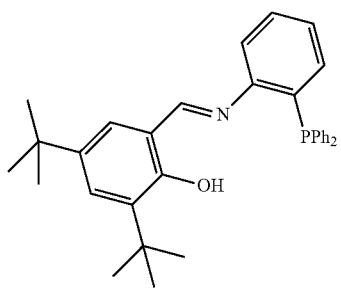

was dissolved in 25 ml dichloro methane (as the solvent for dissolving the nonmetallocene ligand), then 5 g of the pre-treated magnesium compound was added thereto, and the reaction continued for 4 hours at 30° C. After filtrated, washed by hexane for 2 times (25 ml per time), and vacuum-dried, a contact resultant was obtained.

Then, to the thus obtained contact resultant, 25 ml hexane was added as the solvent. Further, TiCl4 was dropwise added thereto over a period of 30 minutes under stirring, and the reaction continued for 4 hours at 30° C. under stirring. The resultant was then filtered, washed by hexane for 3 times (25 ml per time), and vacuum-dried, so as to obtain the supported nonmetallocene catalyst.

In this Example, the ratio by molar of the magnesium compound to the pre-treating agent was 1:1, the ratio by molar of the chemical treating agent to the nonmetallocene ligand was 1:0.5, and the ratio by molar of the nonmetallocene ligand to the magnesium compound was 1:5.

The catalyst obtained was named as CAT-II-3.

Example II-3-1

Substantially the same as the Example II-3, except for the following changes:

The magnesium compound was changed to magnesium bromide, the chemical treating agent was changed to ZrCl4, the nonmetallocene ligand was changed to

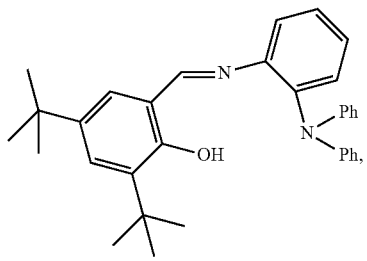

and the solvent for dissolving the nonmetallocene ligand was changed to toluene.

To the magnesium compound, ethyl benzene was added as the solvent. Then, isobutyl aluminoxane was dropwise added thereto over a period of 15 minutes under stirring, and the reaction continued for 2 hour at 100° C. The resultant was then filtered, washed by ethyl benzene, and vacuum-dried at 100° C., so as to obtain a pre-treated magnesium compound.

Washing was performed with toluene, and then vacuum-drying was conducted.

In this Example, the ratio by molar of the magnesium compound to the pre-treating agent was 1:3, the ratio by molar of the chemical treating agent to the nonmetallocene ligand was 1:0.3, and the ratio by molar of the nonmetallocene ligand to the magnesium compound was 1:3.

Example II-3-2

Substantially the same as the Example II-3, except for the following changes:

The magnesium compound was changed to ethoxy magnesium chloride ($MgCl(OC_2H_5)$), the chemical treating agent was changed to $Ti(CH_2CH_3)_4$.

The nonmetallocene ligand was changed to

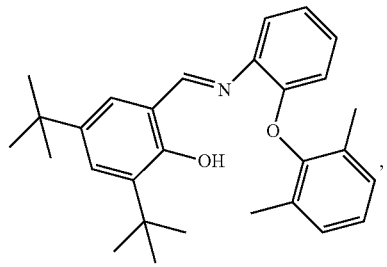

and the solvent for dissolving the nonmetallocene ligand was changed to hexane.

To the magnesium compound, hexane was added as the solvent. Then, triethyl aluminum was dropwise added thereto over a period of 15 minutes under stirring, and the reaction continued for 4 hour at 60° C. The resultant was then filtered, washed by hexane, and vacuum-dried at 90° C., so as to obtain a pre-treated magnesium compound.

Washing was performed with hexane, and then vacuum-drying was conducted.

In this Example, the ratio by molar of the magnesium compound to the pre-treating agent was 1:2, the ratio by molar of the chemical treating agent to the nonmetallocene ligand was 1:0.9, and the ratio by molar of the nonmetallocene ligand to the magnesium compound was 1:7.

Example II-3-3

Substantially the same as the Example II-3, except for the following changes:

The magnesium compound was changed to butoxy magnesium bromide ($MgBr(OC4H9)$), the chemical treating agent was changed to tri-isobutyl titanium chloride ($TiC(i-C_4H_9)_3$).

The nonmetallocene ligand was changed to

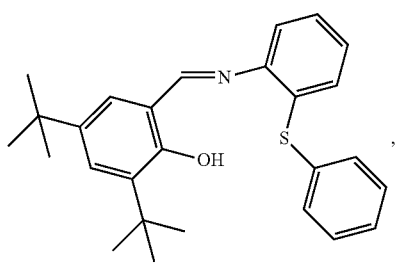

and the solvent for dissolving the nonmetallocene ligand was changed to dichloro methane.

To the magnesium compound, dichloro methane was added as the solvent. Then, tri-isobutyl aluminum was dropwise added thereto over a period of 15 minutes under stirring, and the reaction continued for 8 hour at 30° C. The resultant was then filtered, and directly vacuum-dried at 30° C., so as to obtain a pre-treated magnesium compound.

Drying was conducted by a vacuum-drying process, without filtration and washing.

In this Example, the ratio by molar of the magnesium compound to the pre-treating agent was 1:4, and the ratio by molar of the chemical treating agent to the nonmetallocene ligand was 1:0.7.

Example II-3-4

Substantially the same as the Example II-3, except for the following changes:

The magnesium compound was changed to ethoxy magnesium (Mg(OC2H5)2).

The nonmetallocene ligand was changed to

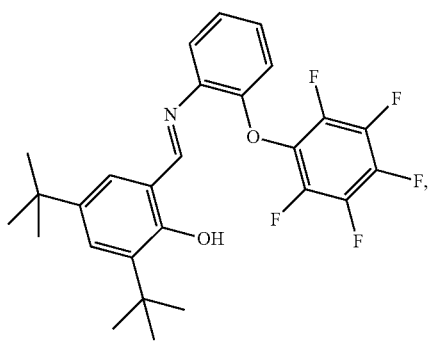 [SMILES: CC(C)(C)c1cc(/C=N/c2ccccc2Oc2c(F)c(F)c(F)c(F)c2F)c(O)c(C(C)(C)C)c1]

and the solvent for dissolving the nonmetallocene ligand was changed to chloro toluene.

To the magnesium compound, chloro toluene was added as the solvent. Then, triethyl aluminum and methyl aluminoxane was dropwise added thereto over a period of 15 minutes under stirring, and the reaction continued for 0.5 hour at 80° C. The resultant was then filtered, washed by chloro toluene, and vacuum-dried at 80° C., so as to obtain a pre-treated magnesium compound.

In this Example, the ratio by molar of methyl aluminoxane to triethyl aluminum was 1:1, and the ratio by molar of the magnesium compound to methyl aluminoxane was 1:0.5.

Example II-3-5

Substantially the same as the Example II-3, except for the following changes:

The magnesium compound was changed to isobutoxy magnesium (Mg(i-OC4H9)2).

The nonmetallocene ligand was changed to

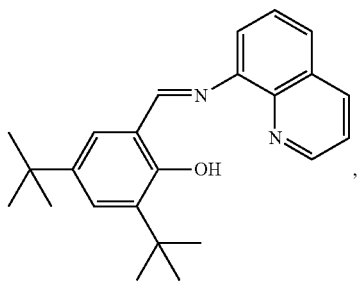

and the solvent for dissolving the nonmetallocene ligand was changed to cyclohexane.

Example II-3-6

Substantially the same as the Example II-3, except for the following changes:

The nonmetallocene ligand was changed to

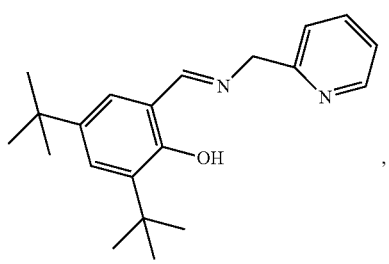

and the solvent for dissolving the nonmetallocene ligand was changed to chloro cyclohexane.

Example II-4

Anhydrous magnesium chloride was used as the magnesium compound, and TiCl4 was used as the chemical treating agent.

The modified magnesium compound was prepared according to Example I-3.

5 g of the modified magnesium compound was weighted, and 25 ml toluene was added thereto. Then, methyl aluminoxane was dropwise added thereto over a period of 15 minutes under stirring, and the reaction continued for 2 hour at 90° C. The resultant was then filtered, washed by toluene for 2 times (25 ml per time), and vacuum-dried at 90° C., so as to obtain a pre-treated magnesium compound.

A determined amount of a nonmetallocene ligand of the structure

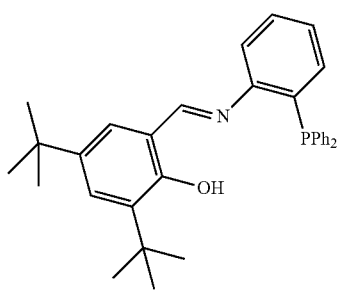

was dissolved in 25 ml dichloro methane (as the solvent for dissolving the nonmetallocene ligand), then the pre-treated magnesium compound was added thereto, and the reaction continued for 4 hours at 30° C. After filtrated, washed by hexane for 2 times (25 ml per time), and vacuum-dried, a contact resultant was obtained.

Then, to the thus obtained contact resultant, 25 ml hexane was added as the solvent. Further, TiCl4 was dropwise added thereto over a period of 30 minutes under stirring, and the reaction continued for 4 hours at 30° C. The resultant was then filtered, washed by hexane for 3 times (25 ml per time), and vacuum-dried, so as to obtain the supported nonmetallocene catalyst.

In this Example, the ratio by molar of the magnesium compound to the pre-treating agent was 1:1, the ratio by molar of the chemical treating agent to the nonmetallocene ligand was 1:0.5, and the ratio by molar of the nonmetallocene ligand to the magnesium compound was 1:5.

The catalyst obtained was named as CAT-II-4.

Example II-4-1

Substantially the same as the Example II-4, except for the following changes:

The modified magnesium compound was prepared according to Example I-3-1, the chemical treating agent was changed to ZrCl4, and the nonmetallocene ligand was changed to

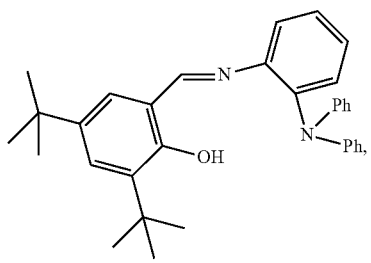 [SMILES: CC(C)(C)c1cc(/C=N/c2ccccc2N(c2ccccc2)c2ccccc2)c(O)c(C(C)(C)C)c1]

and the solvent for dissolving the nonmetallocene ligand was changed to toluene.

To the modified magnesium compound, ethyl benzene was added as the solvent. Then, isobutyl aluminoxane was dropwise added thereto over a period of 15 minutes under stirring, and the reaction continued for 2 hours at 100° C. The resultant was then filtered, washed by ethyl benzene, and vacuum-dried at 100° C., so as to obtain a pre-treated magnesium compound.

Washing was performed with toluene, and then vacuum-drying was conducted.

In this Example, the ratio by molar of the magnesium compound to the pre-treating agent was 1:3, the ratio by molar of the chemical treating agent to the nonmetallocene ligand was 1:0.3, and the ratio by molar of the nonmetallocene ligand to the magnesium compound was 1:3.

Example II-4-2

Substantially the same as the Example II-4, except for the following changes:

The modified magnesium compound was prepared according to Example I-3-2.

The nonmetallocene ligand was changed to

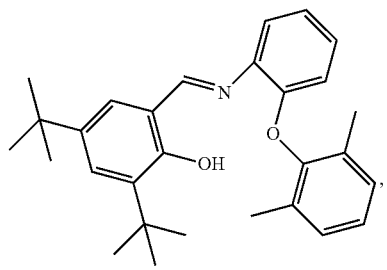

and the solvent for dissolving the nonmetallocene ligand was changed to hexane.

To the modified magnesium compound, hexane was added as the solvent. Then, triethyl aluminum was dropwise added thereto over a period of 15 minutes under stirring, and the reaction continued for 4 hour at 60° C. The resultant was then filtered, washed by hexane, and vacuum-dried at 90° C., so as to obtain a pre-treated magnesium compound.

Washing was performed with hexane, and then vacuum-drying was conducted.

In this Example, the ratio by molar of the magnesium compound to the pre-treating agent was 1:2, the ratio by molar of the chemical treating agent to the nonmetallocene ligand was 1:0.9, and the ratio by molar of the nonmetallocene ligand to the magnesium compound was 1:7.

Example II-4-3

Substantially the same as the Example II-4, except for the following changes:

The modified magnesium compound was prepared according to Example I-3-3.

The nonmetallocene ligand was changed to

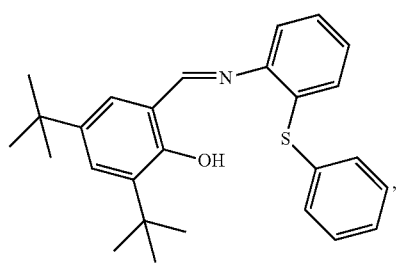

and the solvent for dissolving the nonmetallocene ligand was changed to dichloro methane.

To the modified magnesium compound, dichloro methane was added as the solvent. Then, tri-isobutyl aluminum was dropwise added thereto over a period of 15 minutes under stirring, and the reaction continued for 8 hour at 30° C. The resultant was then filtered, and vacuum-dried at 30° C., so as to obtain a pre-treated magnesium compound.

Drying was conducted by a vacuum-drying process, without filtration and washing.

In this Example, the ratio by molar of the magnesium compound to the pre-treating agent was 1:4, and the ratio by molar of the chemical treating agent to the nonmetallocene ligand was 1:0.7.

Example II-4-4

Substantially the same as the Example II-4, except for the following changes:

The modified magnesium compound was prepared according to Example I-3-4.

The nonmetallocene ligand was changed to

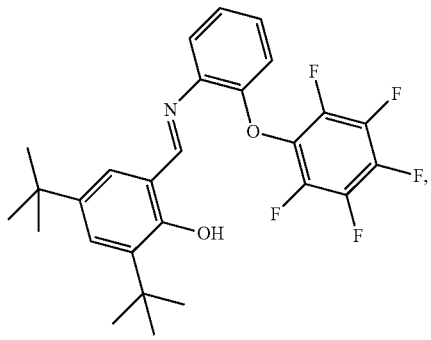 [SMILES: CC(C)(C)c1cc(/C=N/c2ccccc2Oc2c(F)c(F)c(F)c(F)c2F)c(O)c(C(C)(C)C)c1]

and the solvent for dissolving the nonmetallocene ligand was changed to chloro toluene.

To the modified magnesium compound, chloro toluene was added as the solvent. Then, triethyl aluminum and methyl aluminoxane was dropwise added thereto over a period of 15 minutes under stirring, and the reaction continued for 0.5 hour at 80° C. The resultant was then filtered, washed by chloro toluene, and vacuum-dried at 80° C., so as to obtain a pre-treated magnesium compound.

In this Example, the ratio by molar of methyl aluminoxane to triethyl aluminum was 1:1, and the ratio by molar of the magnesium compound to methyl aluminoxane was 1:0.5.

Example II-4-5

Substantially the same as the Example II-4, except for the following changes:

The modified magnesium compound was prepared according to Example I-3-5.

The nonmetallocene ligand was changed to

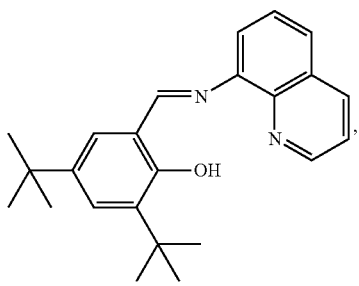 [SMILES: CC(C)(C)c1cc(/C=N/c2cccc3cccnc23)c(O)c(C(C)(C)C)c1]

and the solvent for dissolving the nonmetallocene ligand was changed to cyclohexane.

Example II-4-6

Substantially the same as the Example II-4, except for the following changes:

The nonmetallocene ligand was changed to

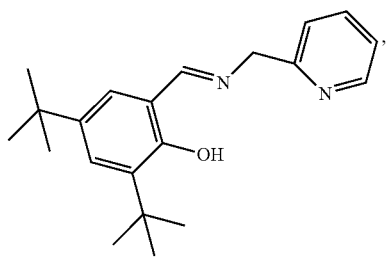 [SMILES: CC(C)(C)c1cc(/C=N/Cc2ccccn2)c(O)c(C(C)(C)C)c1]

and the solvent for dissolving the nonmetallocene ligand was changed to chloro cyclohexane.

Example II-5

Application 50 mg of each of the supported catalysts CAT-II-1 to CAT-II-4 in each case, in combination with a co-catalyst, was added to a 2 L autoclave. Then, 1 L hexane was added thereto, then the stirring was turned on at a speed of 250 rpm. When the temperature increased to 85° C., ethylene was continuously supplied thereto such that the total polymerization pressure in the autoclave was kept at 0.8 MPa. After reacting for 2 hours, the autoclave was vented to the atmosphere. The polymer product was discharged, and weighted after dried. The result was shown in the following Table II-1.

Example II-5-1

Substantially the same as the Example II-5, except for the following changes:

Before supplying ethylene, hydrogen gas was supplied till a pressure of 0.2 MPa. The result was shown in the following Table II-1.

Example II-5-2

Substantially the same as the Example II-5, except for the following changes:

Before supplying ethylene, hydrogen gas was supplied till a pressure of 0.2 MPa. After continuously supplying ethylene for 2 minutes, 50 g 1-hexene was added all at once by a metering pump as the comonomer. The result was shown in the following Table II-1.

Reference Example II-1-1

Substantially the same as the Example II-4, except for the following changes:

The ratio by molar of the chemical treating agent to the nonmetallocene ligand was changed to 1:0.25, and the catalyst obtained was named as CAT-II-A.

The polymerization process was conducted according to Example II-5-2. The result was shown in the following Table II-1.

Reference Example II-1-2

Substantially the same as the Example II-4, except for the following changes:

The ratio by molar of the chemical treating agent to the nonmetallocene ligand was changed to 1:0.75, and the catalyst obtained was named as CAT-II-B.

The polymerization process was conducted according to Example II-5-2. The result was shown in the following Table II-1.

As can be seen from a comparison of the results obtained with the experiment Nos. 13, 16 and 17 in the Table II-1, increasing or decreasing in the ratio by molar of the chemical treating agent to the nonmetallocene ligand will accordingly increase or decrease the polymerization activity of the catalyst, and broaden or narrow the molecular weight distribution to some degree as well.

The result indicates that by using the process according to this invention, it is possible to freely adjust the polymerization activity of the catalyst and the molecular weight distribution of the thus obtained polymer product by changing the amount of the chemical treating agent to be used or that of the nonmetallocene ligand to be used.

Reference Example II-1-3

Substantially the same as the Example II-4, except for the following changes:

The ratio by molar of the magnesium compound to methyl aluminoxane was changed to 1:2, and the catalyst obtained was named as CAT-II-C.

The polymerization process was conducted according to Example II-5-2. The result was shown in the following Table II-1.

Reference Example II-1-4

Substantially the same as the Example II-4, except for the following changes:

The ratio by molar of the magnesium compound to methyl aluminoxane was changed to 1:0.5, and the catalyst obtained was named as CAT-II-D.

The polymerization process was conducted according to Example II-5-2. The result was shown in the following Table II-1.

As can be seen from a comparison of the results obtained with the experiment Nos. 13, 18 and 19 in the Table II-1, increasing or decreasing in the ratio by molar of the magnesium compound to the aluminoxane will accordingly increase or decrease the polymerization activity of the catalyst, and broaden or narrow the molecular weight distribution to some degree as well.

The result indicates that by using the process according to this invention, it is possible to freely adjust the polymerization activity of the catalyst and the molecular weight distribution of the thus obtained polymer product by changing the amount of the pre-treating agent to be used.

As can be seen from a comparison of the results obtained with the experiment Nos. 4 and 5 (or 7 and 8, or 13 and 14) in the Table II-1, the catalyst showed enhanced polymerization activity and resulted in narrowed molecular weight distribution, in case of copolymerization. The fact indicates that the supported nonmetallocene catalyst according to this invention boasts a significant copolymerization effect.

TABLE II-1

| No. | Catalyst No. | Co-catalyst | $H_2$ pressure (MPa) | comonomer | Poly activity (kgPE/gCat) | Bulk density (g/cm$^3$) | Molecular weight distribution (Mw/Mn) |
|---|---|---|---|---|---|---|---|
| 1 | CAT-II-1 | triethyl aluminum | 0 | — | 12.70 | 0.26 | — |
| 2 | CAT-II-1 | methyl aluminoxane | 0 | — | 14.40 | 0.32 | — |
| 3 | CAT-II-2 | triethyl aluminum | 0 | — | 13.17 | 0.30 | — |
| 4 | CAT-II-2 | triethyl aluminum | 0.2 | — | 8.64 | 0.32 | 3.34 |
| 5 | CAT-II-2 | triethyl aluminum | 0.2 | 1-hexene | 10.33 | 0.33 | 3.17 |
| 6 | CAT-II-3 | triethyl aluminum | 0 | — | 18.01 | 0.31 | — |
| 7 | CAT-II-3 | triethyl aluminum | 0.2 | — | 10.27 | 0.33 | — |
| 8 | CAT-II-3 | triethyl aluminum | 0.2 | 1-hexene | 13.49 | 0.34 | 3.62 |
| 9 | CAT-II-4 | triethyl aluminum | 0 | — | 22.77 | 0.33 | — |
| 10 | CAT-II-4 | methyl aluminoxane | 0 | — | 24.52 | 0.34 | — |
| 11 | CAT-II-4 | triethyl boron | 0 | — | 19.44 | 0.32 | — |
| 12 | CAT-II-4 | diethyl aluminum chloride | 0 | — | 23.03 | 0.33 | — |
| 13 | CAT-II-4 | triethyl aluminum | 0.2 | — | 13.39 | 0.35 | 4.17 |
| 14 | CAT-II-4 | triethyl aluminum | 0.2 | 1-hexene | 15.65 | 0.35 | 3.84 |
| 15 | CAT-II-4 | methyl aluminoxane | 0.2 | 1-hexene | 17.14 | 0.35 | 3.01 |
| 16 | CAT-II-A | triethyl aluminum | 0.2 | — | 15.57 | 0.35 | 4.82 |
| 17 | CAT-II-B | triethyl aluminum | 0.2 | — | 10.44 | 0.35 | 3.69 |
| 18 | CAT-II-C | triethyl aluminum | 0.2 | — | 14.02 | 0.35 | 3.66 |
| 19 | CAT-II-D | triethyl aluminum | 0.2 | — | 13.12 | 0.35 | 4.34 |

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A process for producing a magnesium compound-supported nonmetallocene catalyst, which comprises:

a contacting step of contacting a magnesium compound with one of the two: a chemical treating agent and a nonmetallocene ligand to obtain a resultant mixture, upon finish of the reaction, the resultant mixture is subjected to filtration and washing, or to filtration, washing and drying, to obtain a contact resultant, wherein the chemical treating agent is a Group IVB metal compound; and a treating step of treating the contact resultant with the other of the two: the chemical treating agent and the nonmetallocene ligand, so as to obtain the magnesium compound-supported nonmetallocene catalyst, wherein the nonmetallocene ligand is a compound having the following structure:

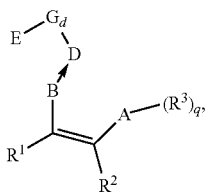

wherein:

q is 0 or 1;

d is 0 or 1;

A is selected from the group consisting of an oxygen atom, a sulfur atom, a selenium atom,

$-NR^{23}R^{24}$, $-N(O)R^{25}R^{26}$,

$-PR^{28}R^{29}$, $-P(O)R^{30}OR^{31}$, a sulfone group, a sulfoxide group and $-Se(O)R^{39}$;

B is selected from the group consisting of a nitrogen-containing group, a phosphor-containing group, and a $C_1$-$C_{30}$ hydrocarbyl;

D is selected from the group consisting of an oxygen atom, a sulfur atom, a selenium atom, a nitrogen-containing $C_1$-$C_{30}$ hydrocarbyl, a phosphor-containing $C_1$-$C_{30}$ hydrocarbyl, a sulfone group, a sulfoxide group,

$-N(O)R^{25}R^{26}$,

and $-P(O)R^{32}(OR^{33})$, wherein N, O, S, Se and P each represent a coordination atom;

E is selected from the group consisting of a nitrogen-containing group, an oxygen-containing group, a sulfur-containing group, a selenium-containing group and a phosphor-containing group, wherein N, O, S, Se and P each represent a coordination atom;

G is selected from the group consisting of a $C_1$-$C_{30}$ hydrocarbyl, a substituted $C_1$-$C_{30}$ hydrocarbyl and an inert functional group;

→ represents a single bond or a double bond;

— represents a covalent bond or an ionic bond;

$R^1$ to $R^3$, $R^{22}$ to $R^{33}$, and $R^{39}$ are each independently selected from the group consisting of hydrogen, a $C_1$-$C_{30}$ hydrocarbyl, a halogen atom, a substituted $C_1$-$C_{30}$ hydrocarbyl and an inert functional group, wherein these groups can be identical to or different with each other, and any adjacent groups can optionally form a bond or a ring altogether.

2. The process according to claim 1, comprising prior to the contacting step, pre-treating the magnesium compound with an pre-treating agent selected from the group consisting of an aluminoxane, an alkylaluminum and a combination thereof.

3. The process according to claim 1, wherein the magnesium compound is a modified magnesium compound produced by adding a precipitating agent to a solution of the magnesium compound in a mixed solvent consisting of tetrahydrofuran and an alcohol, to precipitate same.

4. The process according to claim 1, wherein the magnesium compound is one or more selected from the group consisting of magnesium halide, ethoxy magnesium halide, ethoxy magnesium, and butoxy magnesium.

5. The process according to claim 1, wherein the Group IVB metal compound is Group IVB metal halide.

6. The process according to claim 5, wherein the Group IVB metal halide is one or more selected from the group consisting of titanium tetrachloride and zirconium tetrachloride.

7. The process according to claim 1, wherein in case the contacting step is conducted with the nonmetallocene ligand, ratio by molar of the nonmetallocene ligand to the magnesium compound (based on Mg) is 1 to 1-10, and ratio by molar of the chemical treating agent (based on the Group IVB metal) to the nonmetallocene ligand is 1 to 0.1-1.

8. The process according to claim 7, wherein the ratio by molar of the nonmetallocene ligand to the magnesium compound (based on Mg) is 1 to 3-7, and the ratio by molar of the chemical treating agent (based on the Group IVB metal) to the nonmetallocene ligand is 1 to 0.3-0.9.

9. The process according to claim 1, wherein in case the contacting step is conducted with the chemical treating agent, ratio by molar of the chemical treating agent (based on the Group IVB metal) to the magnesium compound (based on Mg) is 1 to 0.1-100, and ratio by mass of the nonmetallocene ligand to the contact resultant is 0.01-0.50 to 1.

10. The process according to claim 9, wherein the ratio by molar of the chemical treating agent (based on the Group IVB metal) to the magnesium compound (based on Mg) is 1 to 0.5-50, and the ratio by mass of the nonmetallocene ligand to the contact resultant is 0.10-0.30 to 1.

11. The process according to claim 3, wherein the alcohol is an aliphatic alcohol.

12. The process according to claim 11, wherein the aliphatic alcohol is one or more selected from the group consisting of ethanol and butanol.

13. The process according to claim 3, wherein ratio by molar of the magnesium compound (based on Mg) to tetrahydrofuran is 1 to 5-100, and ratio by molar of the magnesium compound (based on Mg) to the alcohol is 1 to 0.5-20.

14. The process according to claim 13, wherein the ratio by molar of the magnesium compound (based on Mg) to tetrahydrofuran is 1 to 10-30, and the ratio by molar of the magnesium compound (based on Mg) to the alcohol is 1 to 1-8.

15. The process according to claim 3, wherein ratio by volume of the precipitating agent to tetrahydrofuran is 1 to 0.5-6.

16. The process according to claim 15, wherein the ratio by volume of the precipitating agent to tetrahydrofuran is 1 to 1-4.

17. The process according to claim 3, wherein the precipitating agent is one or more selected from the group consisting of an alkane and a cyclic alkane.

18. The process according to claim 17, wherein the precipitating agent is one or more selected from the group consisting of pentane, hexane, heptane, decane and cyclohexane.

19. The process according to claim 1, wherein the nonmetallocene ligand is selected from the group consisting of the following structures (A) and (B),

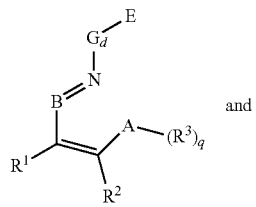
(A)

and

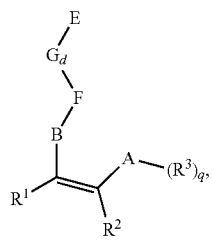
(B)

wherein:
F is selected from the group consisting of a nitrogen-containing group, an oxygen-containing group, a sulfur-containing group, a selenium-containing group and a phosphor-containing group, wherein N, O, S, Se and P each represent a coordination atom.

20. The process according to claim 19, wherein the non-metallocene ligand is selected from the group consisting of the following structures A-1 to A-4 and B-1 to B-4,

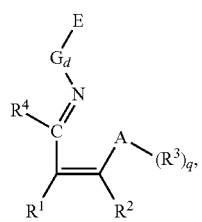
A-1

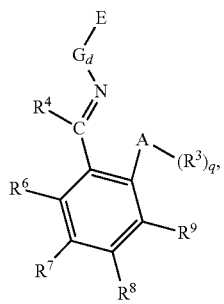
A-2

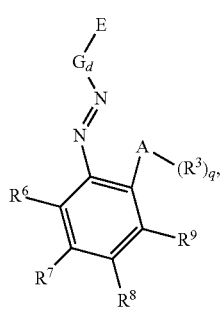
A-3

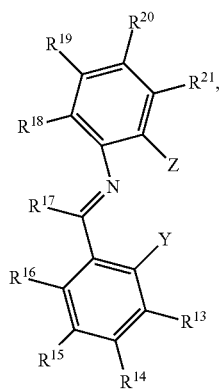
A-4

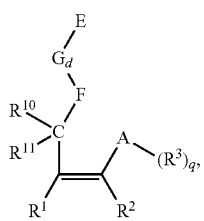
B-1

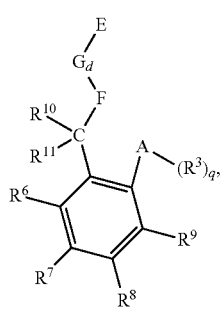
B-2

-continued

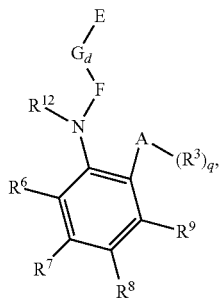

B-3

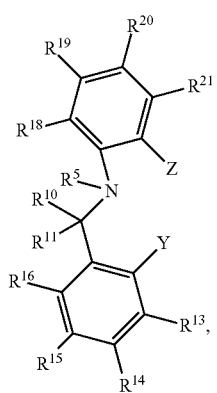

B-4 wherein:
Y and Z are each independently selected from the group consisting of a nitrogen-containing group, an oxygen-containing group, a sulfur-containing group, a selenium-containing group and a phosphor-containing group, wherein N, O, S, Se and P each represent a coordination atom;

$R^4$ and $R^6$ to $R^{21}$ are each independently selected from the group consisting of hydrogen, a $C_1$-$C_{30}$ hydrocarbyl, a halogen atom, a substituted $C_1$-$C_{30}$ hydrocarbyl and an inert functional group, wherein these groups can be identical to or different with each other, and any adjacent groups can optionally form a bond or a ring altogether; and $R^5$ is selected from the group consisting of the lone pair electron on nitrogen atom, hydrogen, a $C_1$-$C_{30}$ hydrocarbyl, a substituted $C_1$-$C_{30}$ hydrocarbyl, an oxygen-containing group, a sulfur-containing group, a selenium-containing group, a nitrogen-containing group, and a phosphor-containing group, with the proviso that when $R^5$ is selected from the group consisting of the oxygen-containing group, the sulfur-containing group, the nitrogen-containing group, the selenium-containing group and the phosphor-containing group, N, O, S, P and Se in the group $R^5$ each represent a coordination atom.

21. The process according to claim 20, wherein,
the halogen atom is selected from the group consisting of F, Cl, Br and I,
the nitrogen-containing group is selected from the group consisting of

—NR$^{23}$R$^{24}$, -T-NR$^{23}$R$^{24}$ and —N(O)R$^{25}$R$^{26}$, the phosphor-containing group is selected from the group consisting of

—PR$^{28}$R$^{29}$, —P(O)R$^{30}$R$^{31}$, —O(O)R$^{32}$(OR$^{33}$), -T-PR$^{28}$(OR$^{29}$), -T-P(O)R$^{30}$R$^{31}$ and -T-P(O)R$^{32}$(OR$^{33}$), the oxygen-containing group is selected from the group consisting of hydroxy, —OR$^{34}$ and -T-OR$^{34}$, the sulfur-containing group is selected from the group consisting of —SR$^{35}$, -T-SR$^{35}$, —S(O)R$^{36}$ and -T-SO$_2$R$^{37}$, the selenium-containing group is selected from the group consisting of —SeR$^{35}$, -T-SeR$^{38}$, —Se(O)R$^{39}$ and -T-Se(O)R$^{39}$, the group T is selected from the group consisting of a $C_1$-$C_{30}$ hydrocarbyl, a substituted $C_1$-$C_{30}$ hydrocarbyl and an inert functional group, the $C_1$-$C_{30}$ hydrocarbyl is selected from the group consisting of a $C_1$-$C_{30}$ alkyl group, a $C_2$-$C_{30}$ cyclic alkyl group, a $C_2$-$C_{30}$ alkenyl group, a $C_2$-$C_{30}$ alkynyl group, a $C_6$-$C_{30}$ aryl group, a $C_8$-$C_{30}$ fused-ring group and a $C_4$-$C_{30}$ heterocycle group, the substituted $C_1$-$C_{30}$ hydrocarbyl is selected from the group consisting of a halogenated $C_1$-$C_{30}$ hydrocarbyl group, a halogenated $C_6$-$C_{30}$ aryl group, a halogenated $C_8$-$C_{30}$ fused-ring group and a halogenated $C_4$-$C_{30}$ heterocycle group, the inert functional group is selected from the group consisting of the halogen atom, the oxygen-containing group, the nitrogen-containing group, a silicon-containing group, a germanium-containing group, the sulfur-containing group and a tin-containing group, the silicon-containing group is selected from the group consisting of —SiR$^{42}$R$^{43}$R$^{44}$ and -T-SiR$^{45}$, the germanium-containing group is selected from the group consisting of —GeR$^{46}$R$^{47}$R$^{48}$ and -T-GeR$^{49}$, the tin-containing group is selected from the group consisting of —SnR$^{50}$R$^{51}$R$^{52}$, -T-SnR$^{53}$ and -T-Sn(O)R$^{54}$, and $R^{34}$ to $R^{38}$ and $R^{42}$ to $R^{54}$ are each independently selected from the group consisting of hydrogen, the $C_1$-$C_{30}$ hydrocarbyl, the halogen atom, the substituted $C_1$-$C_{30}$ hydrocarbyl and the inert functional group.

22. The process according to claim 1, wherein the nonmetallocene ligand is selected from the group consisting of the following compounds,

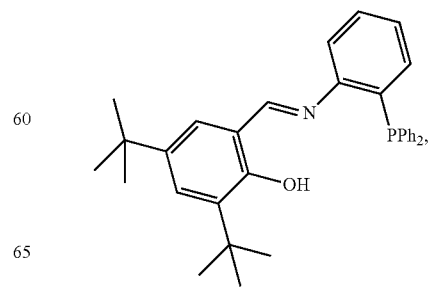

-continued

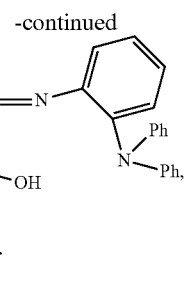

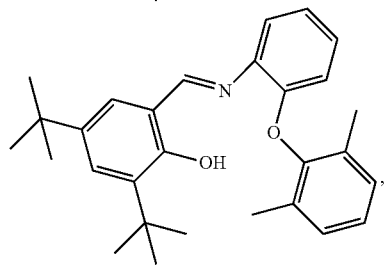

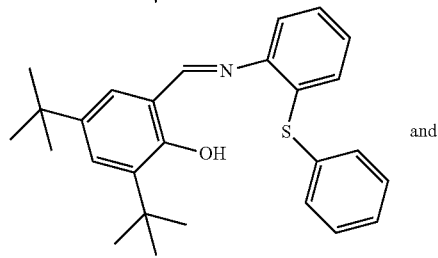

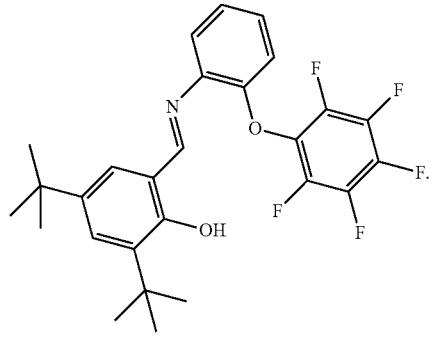

and

23. A magnesium compound-supported nonmetallocene catalyst, comprising a magnesium compound and a nonmetallocene catalyst supported thereon, wherein the magnesium compound-supported nonmetallocene catalyst is produced by the process according to claim 1.

24. A magnesium compound-supported nonmetallocene catalyst, comprising a magnesium compound and a nonmetallocene catalyst supported thereon, wherein the magnesium compound-supported nonmetallocene catalyst is produced by the process according to claim 3.

25. The process according to claim 2, wherein the magnesium compound is a modified magnesium compound produced by adding a precipitating agent to a solution of the magnesium compound in a mixed solvent consisting of tetrahydrofuran and an alcohol, to precipitate same.

26. A magnesium compound-supported nonmetallocene catalyst, comprising a magnesium compound and a nonmetallocene catalyst supported thereon, wherein the magnesium compound-supported nonmetallocene catalyst is produced by the process according to claim 25.

27. An olefin homopolymerization/copolymerization process, wherein the magnesium-compound supported nonmetallocene catalyst according to claim 23 is used as the main catalyst, in combination of one or more selected from the group consisting of an aluminoxane, an alkylaluminum, a halogenated alkyl aluminum, a fluoroborane, an alkylboron and an alkylboron ammonium salt as a co-catalyst, to catalyze homopolymerization/copolymerization of the olefin.

28. An olefin homopolymerization/copolymerization process, wherein the magnesium-compound supported nonmetallocene catalyst according to claim 24 is used as the main catalyst, in combination of one or more selected from the group consisting of an aluminoxane, an alkylaluminum, a halogenated alkyl aluminum, a fluoroborane, an alkylboron and an alkylboron ammonium salt as a co-catalyst, to catalyze homopolymerization/copolymerization of the olefin.

* * * * *